US012694710B2

(12) United States Patent
Banerjee et al.

(10) Patent No.: US 12,694,710 B2
(45) Date of Patent: Jul. 28, 2026

(54) ARTIFICIAL INTELLIGENCE FOR PASSIVE LIVENESS DETECTION

(71) Applicant: IDMISSION LLC, Boulder, CO (US)

(72) Inventors: Ashim Banerjee, Boulder, CO (US); Sandeep Gandhi, San Ramon, CA (US); Goran Rauker, Lyons, CO (US)

(73) Assignee: IDmission LLC, Boulder, CO (US)

( * ) Notice: Subject to any disclaimer, the term of this patent is extended or adjusted under 35 U.S.C. 154(b) by 949 days.

(21) Appl. No.: 17/875,274

(22) Filed: Jul. 27, 2022

(65) Prior Publication Data

US 2022/0375259 A1      Nov. 24, 2022

Related U.S. Application Data

(63) Continuation-in-part of application No. PCT/US2021/072328, filed on Nov. 10, 2021, and a
(Continued)

(51) Int. Cl.
*G06V 40/16* (2022.01)
*G06V 10/82* (2022.01)

(52) U.S. Cl.
CPC ............ *G06V 40/171* (2022.01); *G06V 10/82* (2022.01)

(58) Field of Classification Search
CPC .... G06V 10/7715; G06V 10/82; G06V 10/98; G06V 10/454; G06V 40/45; G06V 40/16;
(Continued)

(56) References Cited

U.S. PATENT DOCUMENTS 6,990,588 B1     1/2006  Yasukura
7,231,657 B2     6/2007  Honarvar et al.
(Continued)

FOREIGN PATENT DOCUMENTS

AU      2014265558 A1     11/2015
AU      2014388268 A1      7/2016
(Continued)

OTHER PUBLICATIONS

Yang, Xiao, et al. "Face Anti-Spoofing: Model Matters, so Does Data." 2019 IEEE/CVF Conference on Computer Vision and Pattern Recognition (CVPR). IEEE, 2019. (Year: 2019).*
(Continued)

*Primary Examiner* — Tracy Mangialaschi
(74) *Attorney, Agent, or Firm* — Banner & Witcoff, Ltd.

(57)      ABSTRACT

Methods, systems, and storage media are disclosed for passive liveness detection using artificial intelligence. Example implementations may receive an image of a person's face; generate a cropped version of that image; generate two different embeddings using two convolutional neural networks that are fed the image and the cropped image, respectively; generate a combined embedding that is a concatenation of the two embeddings; and generate, based on the combined embedding, an output indicating whether the facial portion corresponds to a live person. In addition, systems, devices, and methods for multi-factor authentication for transaction processing are provided. A point-of-transaction device captures customer information, biometric data, and images of identification documents and transmits the information to a transaction information server which receives the transaction request, queries one or more storage records to confirm the identity of the customer to the transaction and to determine whether the customer is authorized to engage in the transaction. The point-of-transaction device communicates a transaction identifier code and at least a portion of the transaction request to a transaction authority. The transaction authority transmits a confirmation signal to the point-of-transaction device based on the transaction identifier code and the transaction request.

16 Claims, 22 Drawing Sheets

Related U.S. Application Data continuation-in-part of application No. 14/988,730, filed on Jan. 5, 2016, now abandoned, which is a continuation-in-part of application No. 13/907,306, filed on May 31, 2013, now abandoned, and a continuation-in-part of application No. 13/907,314, filed on May 31, 2013, now abandoned.

(60) Provisional application No. 63/112,129, filed on Nov. 10, 2020.

(58) Field of Classification Search
CPC ............. G06V 40/171; G06Q 20/4014; G06Q 40/40145; G06Q 20/02; G06Q 20/20
See application file for complete search history.

(56) References Cited

U.S. PATENT DOCUMENTS

| | | | |
|---|---|---|---|
| 7,761,381 | B1 | 7/2010 | Fitch et al. |
| 7,814,024 | B2 | 10/2010 | Ching |
| 8,006,300 | B2 | 8/2011 | Mizrah |
| 8,195,576 | B1 | 6/2012 | Grigg et al. |
| 8,443,202 | B2 | 5/2013 | White et al. |
| 8,762,276 | B2 | 6/2014 | Lepisto et al. |
| 8,977,010 | B2 | 3/2015 | Frischholz et al. |
| 9,003,196 | B2 | 4/2015 | Hoyos et al. |
| 9,075,975 | B2 | 7/2015 | Bud |
| 9,171,415 | B2 | 10/2015 | Adams et al. |
| 9,208,492 | B2 | 12/2015 | Hoyos |
| 9,294,475 | B2 | 3/2016 | Hoyos |
| 9,313,200 | B2 | 4/2016 | Hoyos |
| 9,338,161 | B2 | 5/2016 | Hoyos et al. |
| 9,361,507 | B1 | 6/2016 | Hoyos et al. |
| 9,380,052 | B2 | 6/2016 | Hoyos et al. |
| D763,872 | S | 8/2016 | Tussy |
| 9,412,169 | B2 | 8/2016 | Bud et al. |
| 9,424,458 | B1 | 8/2016 | Mather et al. |
| 9,471,919 | B2 | 10/2016 | Hoyos et al. |
| 9,479,500 | B2 | 10/2016 | Bud |
| 9,563,998 | B2 | 2/2017 | Hoyos et al. |
| 9,621,548 | B2 | 4/2017 | Bud |
| 9,767,358 | B2 | 9/2017 | Xue et al. |
| 9,773,180 | B2 | 9/2017 | Bud |
| 9,783,162 | B2 | 10/2017 | Hoyos et al. |
| 9,785,823 | B2 | 10/2017 | Mather et al. |
| 9,838,388 | B2 | 12/2017 | Mather et al. |
| D813,264 | S | 3/2018 | Tussy |
| 9,953,149 | B2 | 4/2018 | Tussy |
| 9,996,684 | B2 | 6/2018 | Hoyos et al. |
| 10,131,322 | B2 | 11/2018 | Hoyos et al. |
| 10,133,943 | B2 | 11/2018 | Bud |
| 10,250,597 | B2 | 4/2019 | Hoyos |
| 10,255,040 | B2 | 4/2019 | Streit |
| 10,262,126 | B2 | 4/2019 | Tussy |
| 10,339,362 | B2 | 7/2019 | Othman et al. |
| 10,414,377 | B2 | 9/2019 | Hoyos et al. |
| 10,521,643 | B2 | 12/2019 | Mather et al. |
| 10,536,454 | B2 | 1/2020 | Mather et al. |
| 10,614,204 | B2 | 4/2020 | Tussy |
| 2004/0019570 | A1 | 1/2004 | Bolle et al. |
| 2005/0177750 | A1 | 8/2005 | Gasparini et al. |
| 2009/0276347 | A1 | 11/2009 | Kargman |
| 2011/0071914 | A1 | 3/2011 | Beasley et al. |
| 2012/0110341 | A1 | 5/2012 | Beigi |
| 2013/0173466 | A1 | 7/2013 | Lepisto et al. |
| 2013/0219480 | A1 | 8/2013 | Bud |
| 2014/0294257 | A1 | 10/2014 | Tussy |
| 2014/0337221 | A1 | 11/2014 | Hoyos |
| 2014/0337930 | A1 | 11/2014 | Hoyos |
| 2014/0337948 | A1 | 11/2014 | Hoyos |
| 2014/0337949 | A1 | 11/2014 | Hoyos |
| 2014/0351163 | A1 | 11/2014 | Tussy |
| 2015/0188911 | A1 | 7/2015 | Hoyos et al. |
| 2015/0188912 | A1 | 7/2015 | Hoyos et al. |
| 2015/0195288 | A1 | 7/2015 | Hoyos et al. |
| 2015/0227780 | A1 | 8/2015 | Tussy |
| 2015/0363986 | A1 | 12/2015 | Hoyos et al. |
| 2016/0019539 | A1 | 1/2016 | Hoyos et al. |
| 2016/0057138 | A1 | 2/2016 | Hoyos et al. |
| 2016/0065571 | A1 | 3/2016 | Hoyos et al. |
| 2016/0072802 | A1 | 3/2016 | Hoyos |
| 2016/0117544 | A1 | 4/2016 | Hoyos et al. |
| 2016/0132671 | A1 | 5/2016 | Bud |
| 2016/0132890 | A1 | 5/2016 | Banerjee et al. |
| 2016/0148384 | A1 | 5/2016 | Bud et al. |
| 2016/0154953 | A1 | 6/2016 | Bud |
| 2016/0182505 | A1 | 6/2016 | Hoyos |
| 2016/0182506 | A1 | 6/2016 | Hoyos |
| 2016/0191518 | A1 | 6/2016 | Bud |
| 2016/0205096 | A1 | 7/2016 | Hoyos et al. |
| 2016/0232401 | A1 | 8/2016 | Hoyos et al. |
| 2016/0321496 | A1 | 11/2016 | Mather et al. |
| 2016/0337350 | A1 | 11/2016 | Bud |
| 2016/0342832 | A1 | 11/2016 | Bud et al. |
| 2016/0373440 | A1 | 12/2016 | Mather et al. |
| 2016/0379211 | A1 | 12/2016 | Hoyos et al. |
| 2017/0053175 | A1 | 2/2017 | Tussy |
| 2017/0174180 | A1 | 6/2017 | Hoyos et al. |
| 2017/0200053 | A1 | 7/2017 | Bud |
| 2017/0344793 | A1 | 11/2017 | Xue et al. |
| 2018/0009417 | A1 | 1/2018 | Hoyos et al. |
| 2018/0018501 | A1 | 1/2018 | Mather et al. |
| 2018/0060681 | A1 | 3/2018 | Bud |
| 2018/0165508 | A1 | 6/2018 | Othman et al. |
| 2018/0176216 | A1 | 6/2018 | Mather et al. |
| 2018/0260553 | A1 | 9/2018 | Hoyos et al. |
| 2018/0276488 | A1 | 9/2018 | Yoo et al. |
| 2018/0330179 | A1 | 11/2018 | Streit |
| 2019/0034746 | A1* | 1/2019 | Feng .................... G06T 7/0002 |
| 2019/0054899 | A1 | 2/2019 | Hoyos et al. |
| 2019/0130168 | A1 | 5/2019 | Khitrov et al. |
| 2019/0199717 | A1 | 6/2019 | Hoyos |
| 2019/0207932 | A1 | 7/2019 | Bud et al. |
| 2019/0213311 | A1 | 7/2019 | Tussy |
| 2019/0213312 | A1 | 7/2019 | Tussy |
| 2019/0213316 | A1 | 7/2019 | Tussy |
| 2019/0236738 | A1 | 8/2019 | Lebel et al. |
| 2019/0286242 | A1 | 9/2019 | Ionescu et al. |
| 2019/0303551 | A1 | 10/2019 | Tussy |
| 2019/0311102 | A1 | 10/2019 | Tussy |
| 2019/0325880 | A1 | 10/2019 | Khitrov et al. |
| 2019/0332756 | A1 | 10/2019 | Khitrov et al. |
| 2019/0332876 | A1 | 10/2019 | Khitrov et al. |
| 2019/0362130 | A1 | 11/2019 | Othman et al. |
| 2020/0036707 | A1 | 1/2020 | Callahan et al. |
| 2020/0042685 | A1 | 2/2020 | Tussy et al. |
| 2020/0110921 | A1 | 4/2020 | Mather et al. |

FOREIGN PATENT DOCUMENTS

| | | | |
|---|---|---|---|
| AU | 2015274445 | A1 | 2/2017 |
| AU | 2016214084 | A1 | 8/2017 |
| AU | 2014265558 | B2 | 3/2018 |
| AU | 2016311166 | A1 | 4/2018 |
| AU | 2018203747 | A1 | 6/2018 |
| AU | 2014388268 | B2 | 4/2019 |
| AU | 2015274445 | B2 | 5/2019 |
| AU | 2017370720 | A1 | 6/2019 |
| AU | 2019203222 | A1 | 6/2019 |
| AU | 2019206006 | A1 | 8/2019 |
| AU | 2018266602 | A1 | 12/2019 |
| AU | 2018203747 | B2 | 1/2020 |
| AU | 2020201558 | A1 | 3/2020 |
| BR | 112015028511 | A2 | 7/2017 |
| BR | 112016015458 | A2 | 8/2017 |
| BR | 112016029038 | A2 | 8/2017 |
| BR | 112017016942 | A2 | 4/2018 |
| BR | 112018003390 | A2 | 9/2018 |
| BR | 112019011205 | A2 | 10/2019 |
| CA | 2909788 | A1 | 11/2014 |
| CA | 2935688 | A1 | 10/2015 |
| CA | 2952084 | A1 | 12/2015 |
| CA | 2976049 | A1 | 8/2016 |
| CA | 2996296 | A1 | 3/2017 |

(56) References Cited

FOREIGN PATENT DOCUMENTS

| | | | |
|---|---|---|---|
| CA | 3044063 A1 | 6/2018 | |
| CA | 3063126 A1 | 11/2018 | |
| CN | 105453524 A | 3/2016 | |
| CN | 106063219 A | 10/2016 | |
| CN | 106575454 A | 4/2017 | |
| CN | 107438854 A | 12/2017 | |
| CN | 108475309 A | 8/2018 | |
| CN | 110326001 A | 10/2019 | |
| CN | 110892693 A | 3/2020 | |
| CO | 2019005833 A2 | 10/2019 | |
| CO | 2019013817 A2 | 1/2020 | |
| EP | 2997719 A1 | 3/2016 | |
| EP | 3090525 A2 | 11/2016 | |
| EP | 2997719 A4 | 2/2017 | |
| EP | 3154830 A2 | 4/2017 | |
| EP | 3254232 A2 | 12/2017 | |
| EP | 3154830 A4 | 6/2018 | |
| EP | 3338157 A1 | 6/2018 | |
| EP | 3338157 A4 | 4/2019 | |
| EP | 2997719 B1 | 8/2019 | |
| EP | 3552150 A1 | 10/2019 | |
| EP | 3576382 A1 | 12/2019 | |
| EP | 3635937 A1 | 4/2020 | |
| GB | 2570581 A | 7/2019 | |
| GB | 201821279 | 7/2019 | |
| HK | 1222489 A1 | 6/2017 | |
| IN | 201847027653 | 8/2018 | |
| JP | 64-26189 B2 | 11/2018 | |
| JP | 2019021327 A | 2/2019 | |
| JP | 2019109919 A | 7/2019 | |
| JP | 66-41511 B2 | 2/2020 | |
| JP | 66-50946 B2 | 2/2020 | |
| KR | 20160006772 A | 1/2016 | |
| KR | 20160111940 A | 9/2016 | |
| KR | 20170028357 A | 3/2017 | |
| KR | 20170134356 A | 12/2017 | |
| KR | 20180080183 A | 7/2018 | |
| KR | 20190094352 A | 8/2019 | |
| KR | 20200007010 A | 1/2020 | |
| MX | 2015015547 A | 8/2016 | |
| MX | 2017010166 A | 3/2018 | |
| MX | 356039 B | 5/2018 | |
| MX | 2018002190 A | 7/2018 | |
| MX | 2019006480 A | 8/2019 | |
| PL | 2997719 T3 | 4/2020 | |
| WO | 2014186374 A1 | 11/2014 | |
| WO | 2015147945 A2 | 10/2015 | |
| WO | 2015147945 A3 | 12/2015 | |
| WO | 2015191913 A2 | 12/2015 | |
| WO | 2015191913 A3 | 3/2016 | |
| WO | 2016033184 A1 | 3/2016 | |
| WO | 2016033208 A1 | 3/2016 | |
| WO | 2016037050 A1 | 3/2016 | |
| WO | 2016079464 A1 | 5/2016 | |
| WO | 2016125030 A2 | 8/2016 | |
| WO | 2016125030 A3 | 11/2016 | |
| WO | 2017035085 A1 | 3/2017 | |
| WO | 2017035085 A9 | 8/2017 | |
| WO | 2018106987 A1 | 6/2018 | |
| WO | 2019023606 A1 | 1/2019 | |
| WO | 2018208661 A9 | 5/2019 | |
| WO | 2019129881 A1 | 7/2019 | |
| WO | WO-2020252740 A1 * | 12/2020 | .............. G06N 3/02 |
| ZA | 201509067 B | 3/2017 | |
| ZA | 201605228 B | 9/2017 | |
| ZA | 201700082 A | 1/2018 | |
| ZA | 201705814 A | 8/2018 | |
| ZA | 201903326 A | 1/2020 | |
| ZA | 201903326 B | 1/2020 | |

OTHER PUBLICATIONS

Zhang, Peng, et al. "FeatherNets: Convolutional Neural Networks as Light as Feather for Face Anti-spoofing." arXiv preprint arXiv: 1904.09290 (2019). (Year: 2019).*

Liu, Yaojie, Amin Jourabloo, and Xiaoming Liu. "Learning Deep Models for Face Anti-Spoofing: Binary or Auxiliary Supervision." arXiv preprint arXiv:1803.11097 (2018). (Year: 2018).*

Feb. 8, 2022—(WO) International Search Report and Written Opinion—App PCT/US2021/072328.

Yang et al. "Face Anti-Spoofing: Model Matters, So Does Data" pp. 3507-3511. Computer Vision Foundation. Online. Oct. 29, 2019; [retrieved Jan. 15, 2022].

Yuan et al. "Fingerprint Liveness Detection Using an Improved CNN With Image Scale Equalization" pp. 26953-26964. IEEE Access, vol. 7, 2019. Online. Mar. 12, 2019; [retrieved Jan. 15, 2022]. Retrieved from the Internet—DOI:10.1109/ACCESS.2019. 2901235.

"What does presentation attack detection and liveness actually mean?", Biometrics Institute, 4 pages, retrieved Nov. 9, 2020.

Jia, Yangqing, et al., "Caffe: Convolutional Architecture for Fast Feature Embedding", Jun. 20, 2014, 4 pages.

Hinton, Geoffrey, et al., "Distilling the Knowledge in a Neural Network," Mar. 9, 2015, 9 pages.

"Anti-Spoofing for Authentication", downloaded from https://www. idrnd.ai/anti-spoofing-for-authentication, 3 pages, retrieved Aug. 16, 2020.

"The Important Role of Liveness Detection In Face Biometric Authentication,-Whitepaper" ID R&D, Year 2020, 14 pages.

"ID R&D's Passive Facial Liveness Achieves ISO 30107-3 Compliance with Perfect Scores," Jan. 8, 2020, 4 pages.

IDmission Completes ISO Compliance Testing for Proprietary Biometric Technologies, Jun. 30, 2020, 3 pages.

"ID Proofing, Identity Verification & eKYC", 15 pages, retrieved Nov. 10, 2020.

ISO/IEC 30107-4:2020, "Information Technology - Biometric presentation attack detection—Part 4: Profile for testing of mobile devices", downloaded from https://www.iso.org/standard/75301. html, 6 pages, retrieved Aug. 16, 2020.

ISO 30107-3 Presentation Attack Detection Confirmation Letters, downloaded from https://www.ibeta.com/iso-30107-3-presentation-attack-detection-confirmation-letters, 9 pages, retrieved Aug. 16, 2020.

Howard, Andrew G., et al., "Mobile Nets: Efficient Convolutional Neural Networks for Mobile Vision Applications", Apr. 17, 2017, 9 pages.

IDLive Face, The world's first passive facial liveness detection, downloaded from https://www.idmd.ai/passive-facial-liveness, 6 pages, retrieved Aug. 16, 2020.

Newton, Elaine, "Overview of the ISO/IEC 30107 Project Anti-Spoofing and Liveness Detection Techniques," National Institute of Standards and Technology, 13 pages, retrieved Nov. 9, 2020.

Johnson, Peter, et al., "Biometric Liveness Detection: Framework and Metrics," presented at International Biometric Performance Conference, Mar. 2012, 29 pages.

Breithaupt, Ralph, "Need and perspectives to realize liveness detection", IBPC, Mar. 9, 2012, 18 pages.

Wen, Di, et al., "Face Spoof Detection With Image Distortion Analysis", IEEE Transaction on Information Forensics and Security, Apr. 2015, 17 pages.

"Zoloz biometric authentication system compliant with ISO presentation attack detection standard,", downloaded from https://www. biometricupdate.com/202003/zoloz-biometric-authentication-system-compliant-with-iso-presentation-attack-detection-standard, 5 pages, retrieved Aug. 16, 2020.

"The importance of passive facial liveness detection," Mar. 27, 2020, downloaded from https://www.finextra.com/blogposting/18585/the-importance-of-passive-facial-liveness-detection, 4 pages.

Busch, Christoph, et al., "What Is a Presentation Attack? And how do we detect it?", Biometric Systems and PAD, Jan. 16, 2018 , 63 pages.

* cited by examiner

Figure 5:
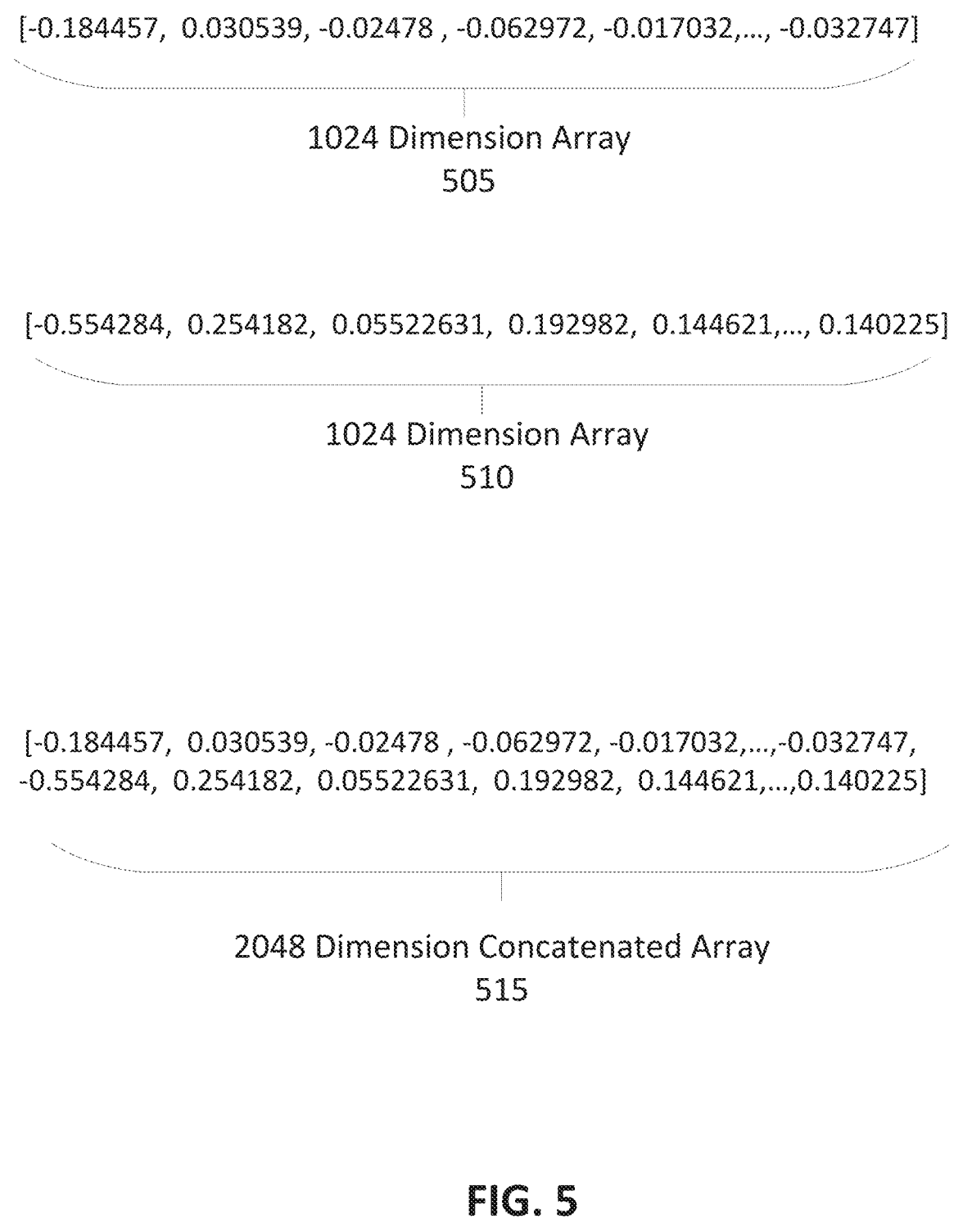

[-0.184457,  0.030539, -0.02478 , -0.062972, -0.017032,..., -0.032747]

1024 Dimension Array
505

[-0.554284,  0.254182,  0.05522631,  0.192982,  0.144621,..., 0.140225]

1024 Dimension Array
510

[-0.184457,  0.030539, -0.02478 , -0.062972, -0.017032,...,-0.032747,
-0.554284,  0.254182,  0.05522631,  0.192982,  0.144621,...,0.140225]

2048 Dimension Concatenated Array
515

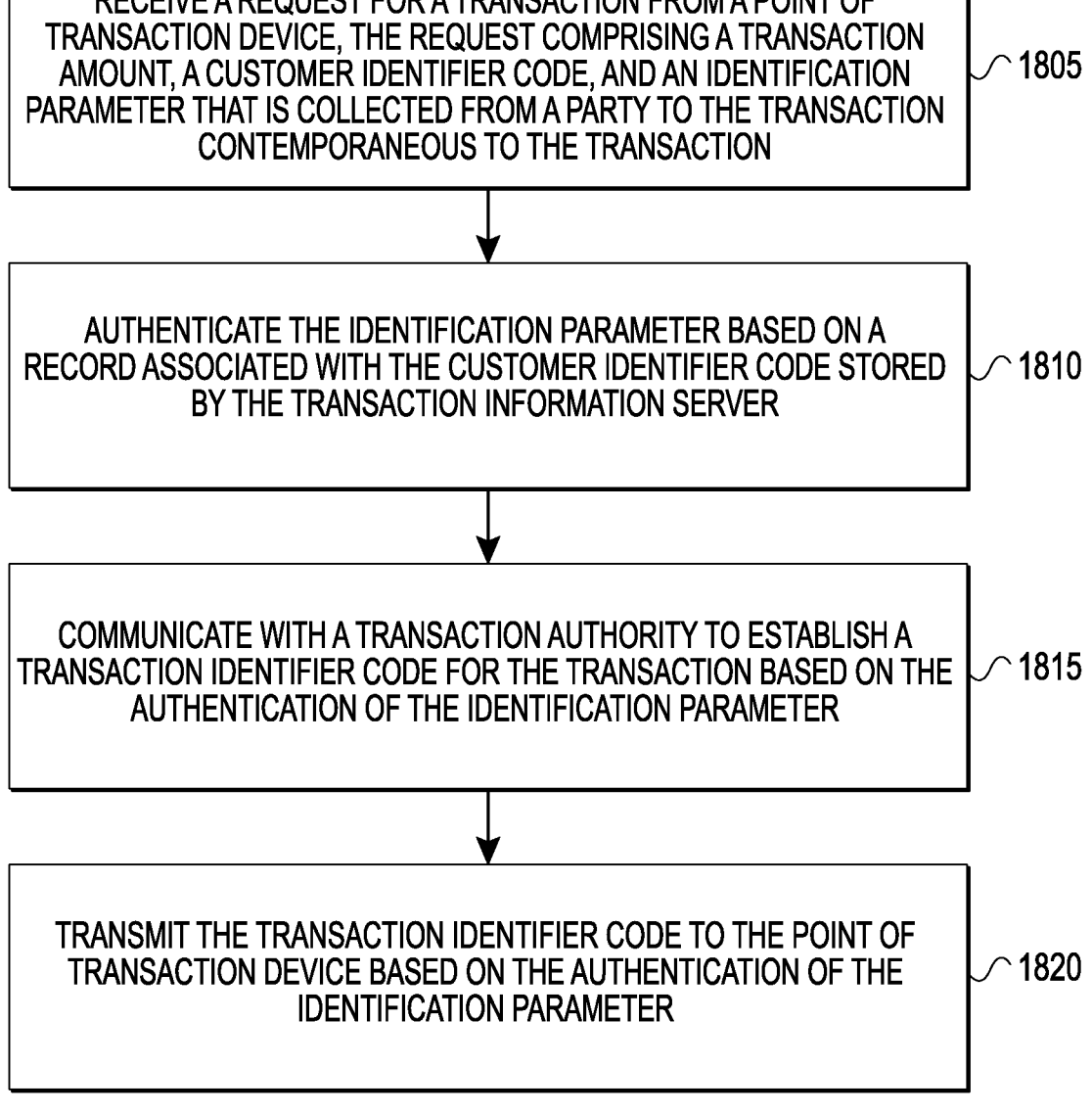

RECEIVE A REQUEST FOR A TRANSACTION FROM A POINT OF TRANSACTION DEVICE, THE REQUEST COMPRISING A TRANSACTION AMOUNT, A CUSTOMER IDENTIFIER CODE, AND AN IDENTIFICATION PARAMETER THAT IS COLLECTED FROM A PARTY TO THE TRANSACTION CONTEMPORANEOUS TO THE TRANSACTION ⌒1805

AUTHENTICATE THE IDENTIFICATION PARAMETER BASED ON A RECORD ASSOCIATED WITH THE CUSTOMER IDENTIFIER CODE STORED BY THE TRANSACTION INFORMATION SERVER ⌒1810

COMMUNICATE WITH A TRANSACTION AUTHORITY TO ESTABLISH A TRANSACTION IDENTIFIER CODE FOR THE TRANSACTION BASED ON THE AUTHENTICATION OF THE IDENTIFICATION PARAMETER ⌒1815

TRANSMIT THE TRANSACTION IDENTIFIER CODE TO THE POINT OF TRANSACTION DEVICE BASED ON THE AUTHENTICATION OF THE IDENTIFICATION PARAMETER ⌒1820

FIG. 19     1800

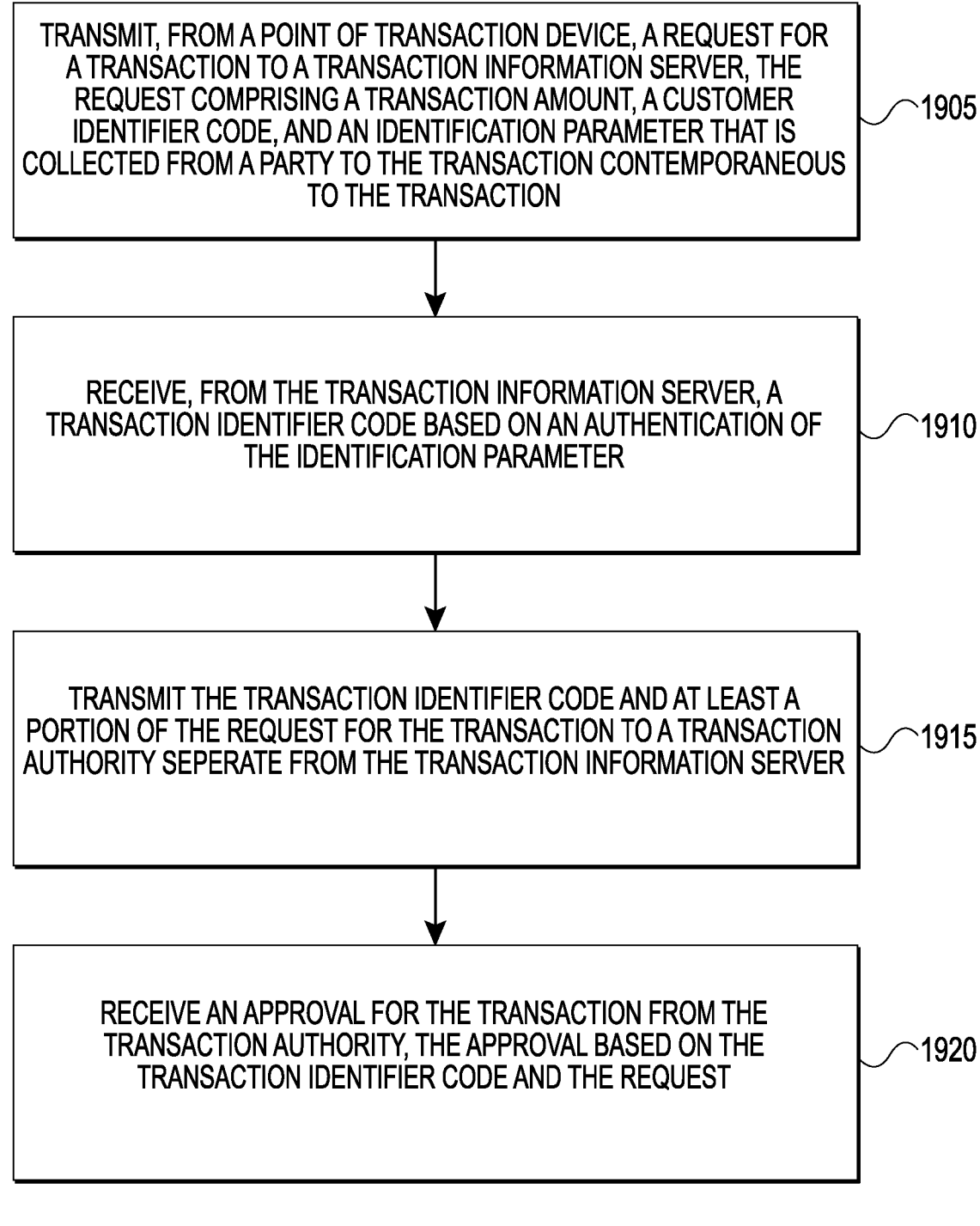

TRANSMIT, FROM A POINT OF TRANSACTION DEVICE, A REQUEST FOR A TRANSACTION TO A TRANSACTION INFORMATION SERVER, THE REQUEST COMPRISING A TRANSACTION AMOUNT, A CUSTOMER IDENTIFIER CODE, AND AN IDENTIFICATION PARAMETER THAT IS COLLECTED FROM A PARTY TO THE TRANSACTION CONTEMPORANEOUS TO THE TRANSACTION ⁓1905

RECEIVE, FROM THE TRANSACTION INFORMATION SERVER, A TRANSACTION IDENTIFIER CODE BASED ON AN AUTHENTICATION OF THE IDENTIFICATION PARAMETER ⁓1910

TRANSMIT THE TRANSACTION IDENTIFIER CODE AND AT LEAST A PORTION OF THE REQUEST FOR THE TRANSACTION TO A TRANSACTION AUTHORITY SEPERATE FROM THE TRANSACTION INFORMATION SERVER ⁓1915

RECEIVE AN APPROVAL FOR THE TRANSACTION FROM THE TRANSACTION AUTHORITY, THE APPROVAL BASED ON THE TRANSACTION IDENTIFIER CODE AND THE REQUEST ⁓1920

FIG. 20          ⁓1900

ARTIFICIAL INTELLIGENCE FOR PASSIVE LIVENESS DETECTION

CROSS-REFERENCE TO RELATED APPLICATIONS

This application is a US bypass continuation-in-part of PCT Application Serial No. PCT/US21/72328, filed Nov. 10, 2021, which claims the benefit of priority from U.S. Provisional Patent Application Ser. No. 63/112,129, filed on Nov. 10, 2020. Also, this application is a continuation-in-part of U.S. patent application Ser. No. 14/988,730 entitled "Point of Transaction Device with Multi-factor Authentication, filed Jan. 5, 2016 (and published as US 2016/0132890 on May 12, 2016), which is a continuation-in-part of both U.S. patent application Ser. No. 13/907,306, filed on May 31, 2013 and U.S. patent application Ser. No. 13/907,314, filed on May 31, 2013. All of the aforementioned applications are hereby incorporated by reference as if set forth in full in this application in their entireties for all purposes.

FIELD OF THE DISCLOSURE

The present disclosure generally relates to artificial intelligence, machine learning, computer vision, computer networking, and hardware and software related thereto. More specifically, one or more aspects described herein relates to artificial intelligence for passive liveness detection.

BACKGROUND

An image showing the face of a user may be used by a system to verify the user's identity. However, an imposter may attempt a presentation attack to trick the system into granting access, despite the imposter not being authorized access. It may be difficult for a system to determine whether a presentation attack has occurred or not.

As avid author Aurelien Geron of "Hands-on Machine Learning with Scikit-Learn . . . ," teaches: "the flexibility of neural networks is also one of their main drawbacks: there are many hyperparameters to tweak. Not only can you use any imaginable network architecture, but even in a simple MLP you can change the number of layers, the number of neurons per layer, the type of activation function to use in each layer, the weight initialization logic, and much more." Moreover, "[a] common mistake is to use convolution kernels that are too large. For example, instead of using a convolutional layer with a 5×5 kernel, stack two layers with 3×3 kernels: it will use fewer parameters and require fewer computations, and it will usually perform better. One exception is for the first convolutional layer: it can typically have a large kernel (e.g., 5×5), usually with a stride of 2 or more: this will reduce the spatial dimension of the image without losing too much information, and since the input image only has three channels in general, it will not be too costly." The features disclosed herein overcome one or more problems that exist in the art.

SUMMARY

To overcome limitations in the prior art described above, and to overcome other limitations that will be apparent upon reading and understanding the present specification, aspects described herein are directed towards passive liveness detection. An image and one or more cropped images of a user may be used as input into one or more neural networks. The one or more cropped images may show only the regions of interest (ROI) of the image (e.g., the user's face, eyes, etc.). The one or more neural networks may generate a first embedding for the image and a different embedding for the one or more cropped images. The embeddings may be combined and used in one or more neural networks to generate a prediction of liveness or whether a presentation attack has occurred.

In one aspect, a computer implemented method for passive liveness detection may include receiving, by a computing device, an input image, wherein the image comprises a facial portion and a first background portion; generating, based on the input image, a cropped image, wherein the cropped image comprises the facial portion and a second background portion that is a subset of the first background portion; generating, based on the input image and via a first convolutional neural network, a first image embedding, wherein the first convolutional neural network comprises an average pooling layer, a fully connected layer, and a plurality of depthwise convolutional layers; generating, based on the cropped image and via a second convolutional neural network, a second image embedding; generating, via a concatenation of the first image embedding and the second image embedding, a combined embedding; generating, based on the combined embedding, output indicating whether the facial portion corresponds to a live person; and denying, based on the output indicating whether the facial portion corresponds to a live person, access to a computer system. The first convolutional neural network may comprise a first plurality of layers and a first plurality of input channels, wherein each input channel of the first plurality of input channels corresponds to a layer of the first plurality of layers. The second convolutional neural network may comprise a second plurality of input channels, wherein each input channel of the second plurality of input channels is determined by reducing a corresponding input channel of the first plurality of input channels. A first width parameter corresponding to input channels of the first convolutional neural network may be greater than a second width parameter corresponding to input channels of the second convolutional neural network. The generating the cropped image may include removing, from the input image, pixels corresponding to the background portion.

The method may further comprise training, based on a first plurality of images and a second plurality of cropped images, the first convolutional neural network and the second convolutional neural network, to output information that indicates liveness of each person in the first plurality of images.

The method may further comprise receiving an additional image for liveness detection, wherein the additional image comprises a person; and determining, based on facial features of the person, that the additional image is not suitable for liveness detection. The generating, based on the first image embedding and the second image embedding, output may comprise generating the output via a sigmoid function.

In one aspect a computer implemented method may comprise generating, by a computing device and via a camera, a plurality of images, wherein each image of the plurality of images indicates a same person, and wherein each image of the plurality of images is generated within a threshold time of each other; generating, via a neural network and based on the plurality of images, an image embedding; generating, based on the image embedding and via a fully connected layer of the neural network, an output value; and granting, to a user device and based on the output value, access to a computing system. The neural network may comprise a recurrent convolutional neural network.

Generating the image embedding may comprise generating, via the neural network and based on a first image, a first image embedding; and generating, via the neural network and based on both the first image embedding and a second image of the plurality of images, the image embedding. The method of claim 8, wherein at least one of the plurality of images comprises a cropped image.

The method may further comprise generating the cropped image by removing, from a first image of the plurality of images, one or more pixels corresponding to a background portion of the first image.

The method may further comprise training, based on a first plurality of images and a second plurality of cropped images, the neural network, to output information that indicates liveness of each person in the first plurality of images.

The method may further comprise receiving an additional image for liveness detection, wherein the additional image comprises a person; and determining, based on facial features of the person, that the additional image is not suitable for liveness detection. Generating an output value may comprise generating the output value via a sigmoid function.

In one aspect a computer implemented method may comprise receiving, by a computing device, an input image, wherein the input image comprises a facial portion and a first background portion; generating, based on the input image, a cropped image, wherein the cropped image comprises a subset of pixels of the input image; generating, based on the input image and via a first neural network, a first image embedding; generating, based on the cropped image and via a second neural network, a second image embedding; generating, based on the first image embedding and the second image embedding, output indicating whether the facial portion corresponds to a live person; and granting, based on the output, access to a computing system.

The method may further comprise training, based on a first plurality of images and a second plurality of cropped images, the first neural network and the second neural network, to output information that indicates liveness of a person in each image of the first plurality of images.

The method may further comprise receiving an additional image for liveness detection, wherein the additional image indicates a person; and determining, based on facial features of the person, that the additional image is not suitable for liveness detection. Generating output may comprise generating the output via a sigmoid function. The first convolutional neural network may comprise a first plurality of layers and a first plurality of input channels, wherein each input channel of the first plurality of input channels corresponds to a layer of the first plurality of layers. The second convolutional neural network may comprise a second plurality of input channels, wherein each input channel of the second plurality of input channels is determined by reducing a corresponding input channel of the first plurality of input channels.

In other aspects, a system may be configured to perform one or more aspects and/or methods described herein. In some aspects, an apparatus may be configured to perform one or more aspects and/or methods described herein. In some aspects, one or more computer readable media may store computer executed instructions that, when executed, configure a system to perform one or more aspects and/or methods described herein. These and additional aspects will be appreciated with the benefit of the disclosures discussed in further detail below.

BRIEF DESCRIPTION OF THE DRAWINGS

FIG. 5 shows example arrays or image embeddings that may be used for passive liveness detection.

FIG. 19 is a flowchart diagram of an example method of conducting a transaction according to various embodiments of the invention.

FIG. 20 is a flowchart diagram of another example method of conducting a transaction according to various embodiments of the invention.

DETAILED DESCRIPTION OF ARTIFICIAL INTELLIGENCE FOR PASSIVE LIVENESS DETECTION

Figure 1:
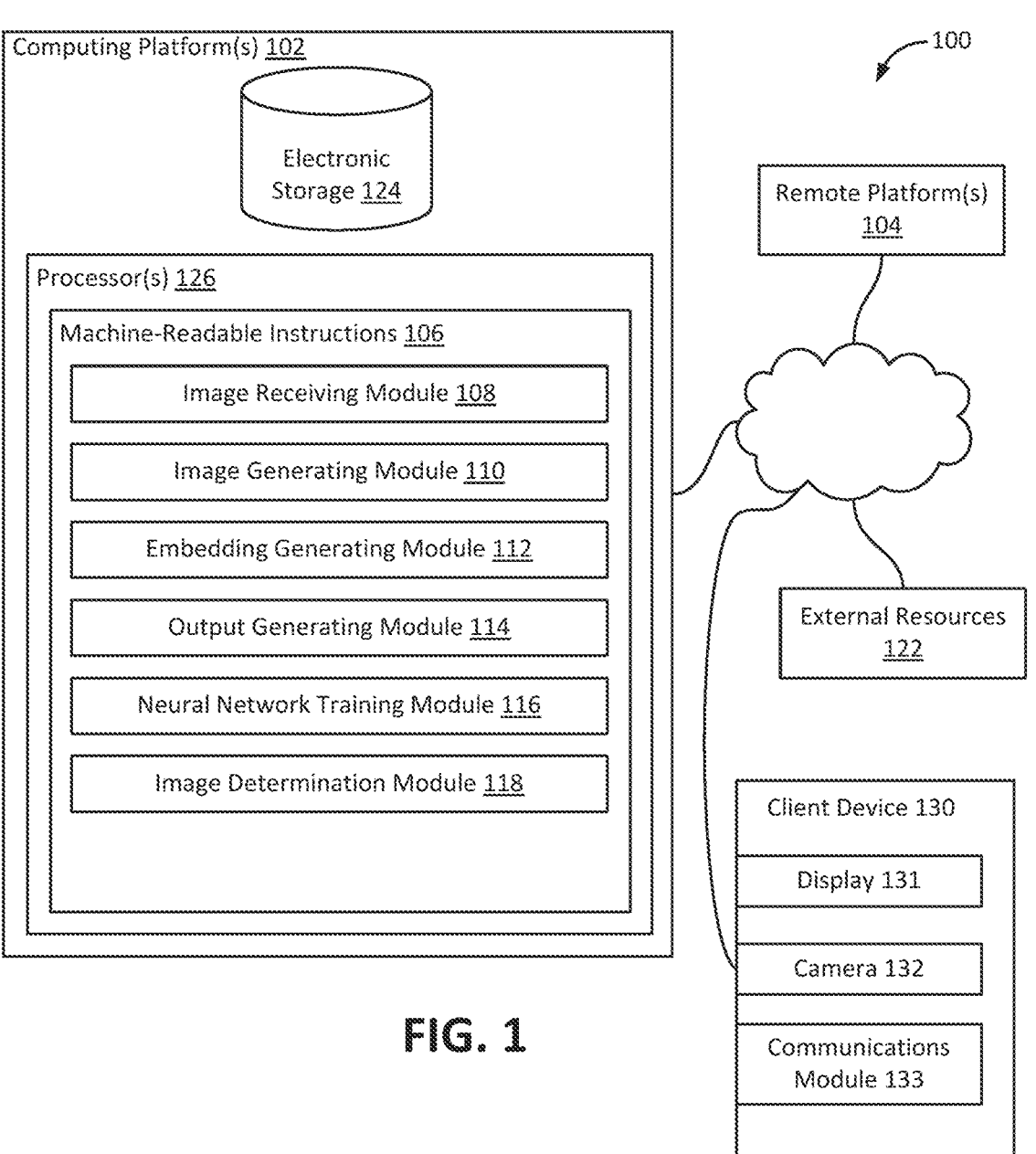
FIG. 1 shows an example system configured for passive liveness detection.

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways. It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equiva- lents thereof as well as additional items and equivalents thereof.

A framework for machine learning algorithm may involve a combination of one or more components, sometimes three components: (1) representation, (2) evaluation, and (3) opti- mization components. Representation components refer to computing units that perform steps to represent knowledge in different ways, including but not limited to as one or more decision trees, sets of rules, instances, graphical models, neural networks, support vector machines, model ensembles, and/or others. Evaluation components refer to computing units that perform steps to represent the way hypotheses (e.g., candidate programs) are evaluated, includ- ing but not limited to as accuracy, prediction and recall, squared error, likelihood, posterior probability, cost, margin, entropy k-L divergence, and/or others. Optimization com- ponents refer to computing units that perform steps that generate candidate programs in different ways, including but not limited to combinatorial optimization, convex optimi- zation, constrained optimization, and/or others. In some embodiments, other components and/or sub-components of the aforementioned components may be present in the system described herein to further enhance and supplement the aforementioned machine learning functionality.

Machine learning algorithms sometimes rely on unique computing system structures. Machine learning algorithms may leverage neural networks. Such structures, while sig- nificantly more complex than conventional computer sys- tems, are beneficial in implementing machine learning. For example, an artificial neural network may be comprised of a large set of nodes, which may be dynamically configured to effectuate learning and decision-making.

Machine learning tasks are sometimes broadly catego- rized as either unsupervised learning or supervised learning. In unsupervised learning, a machine learning algorithm is left to generate any output (e.g., to label as desired) without feedback. The machine learning algorithm may teach itself (e.g., observe past output), but otherwise operates without (or mostly without) feedback from, for example, a human administrator. An embodiment involving unsupervised machine learning is described herein.

Meanwhile, in supervised learning, a machine learning algorithm is provided feedback on its output. Feedback may be provided in a variety of ways, including via active learning, semi-supervised learning, and/or reinforcement learning. In active learning, a machine learning algorithm is allowed to query answers from an administrator. For example, the machine learning algorithm may make a guess in a face detection algorithm, ask an administrator to identify the photo in the picture, and compare the guess and the administrator's response. In semi-supervised learning, a machine learning algorithm is provided a set of example labels along with unlabeled data. For example, the machine learning algorithm may be provided a data set of 100 photos with labeled human faces and 10,000 random, unlabeled photos. In reinforcement learning, a machine learning algo- rithm is rewarded for correct labels, allowing it to iteratively observe conditions until rewards are consistently earned. For example, for every face correctly identified, the machine learning algorithm may be given a point and/or a score (e.g., "75% correct"). An embodiment involving supervised machine learning is described herein.

One theory underlying supervised learning is inductive learning. In inductive learning, a data representation is provided as input samples data (x) and output samples of the function (f(x)). The goal of inductive learning is to learn a good approximation for the function for new data (x), i.e., to estimate the output for new input samples in the future. Inductive learning may be used on functions of various types: (1) classification functions where the function being learned is discrete; (2) regression functions where the func- tion being learned is continuous; and (3) probability esti- mations where the output of the function is a probability.

As elaborated herein, in practice, machine learning sys- tems and their underlying components are tuned by data scientists to perform numerous steps to perfect machine learning systems. The process is sometimes iterative and may entail looping through a series of steps: (1) understand- ing the domain, prior knowledge, and goals; (2) data inte- gration, selection, cleaning, and pre-processing; (3) learning models; (4) interpreting results; and/or (5) consolidating and deploying discovered knowledge. This may further include conferring with domain experts to refine the goals and make the goals more clear, given the many variables that can be optimized in the machine learning system. Meanwhile, one or more of data integration, selection, cleaning, and/or pre-processing steps can sometimes be the most time con- suming because the old adage, "garbage in, garbage out," also reigns true in machine learning systems.

Once data for machine learning has been created, an optimization process may be used to transform the machine learning model. The optimization process may include (1) training the data to predict an outcome, (2) defining a loss function that serves as an accurate measure to evaluate the machine learning model's performance, (3) minimizing the loss function, such as through a gradient descent algorithm or other algorithms, and/or (4) optimizing a sampling method, such as using a stochastic gradient descent (SGD) method where instead of feeding an entire dataset to the machine learning algorithm for the computation of each step, a subset of data is sampled sequentially. In one example, optimization comprises minimizing the number of false positives to maximize a user's experience. Alterna- tively, an optimization function may minimize the number of missed positives to optimize minimization of losses from exploits.

FIG. 1 illustrates a system 100 configured for liveness detection, in accordance with one or more implementations. Any module or device within system 100 may use any of the machine learning techniques described above, or described in connection with FIG. 2 below, for liveness detection. Biometrics such as faces, fingerprints, retina, voice, and others may be used to identify or verify a user and can be useful for many applications where authentication is neces- sary. However, biometrics are also susceptible to presenta- tion attacks, where an impersonator may obtain a biometric sample from an authorized user, present it to a system, and gain access to the system despite not being authorized. A presentation attack may include an impersonator using a biometric sample without the support of the user to whom the biometric sample belongs. For example, an impersonator may obtain an image of an authorized user's face and present it to a facial recognition system to gain unauthorized access to a system. Liveness detection may help prevent presentation attacks by detecting whether a biometric sample is being used in an authentic manner (e.g., the authorized user corresponding to the biometric sample is actually present and/or intends to gain access a system). For example, when given an image of a user's face, liveness detection may be used to determine whether the user was actually present when the image was taken or whether the image is simply a picture of an image of the user or some other type of presentation attack (e.g., a mask that looks like the authorized user, etc.). Liveness detection may include determining whether a biometric corresponds to a live person, or a representation of the person. Liveness detection may include determining whether an image authentically shows a live person or a spoof of the person. For example, a spoof may comprise presenting (e.g., to a camera) one or more of the following (e.g., which may be designed to look like an authorized user): high resolution glossy printed photographs, high resolution matte printed photographs, paper cutout masks, paper cutout masks with eyes cut out worn on an imposter's face, 3D layered printed paper masks, 3D layered printed masks with eyes cut out and worn on an imposter's face, use of hair (e.g., a wig), electronic still photo on a laptop or mobile device, video on a laptop or mobile device, latex masks, silicone masks, mannequins, 3d printed face busts, etc. One or more neural networks described herein may be configured to distinguish between the above mentioned spoofs and a live user (e.g., an authorized user).

Liveness detection may include active liveness detection and passive liveness detection. In active liveness detection the user may be presented with a challenge. For example, the user may be prompted to blink, move a device, nod the user's head, smile, or perform other actions to pass a liveness detection test. Active liveness can lead to a poor user experience because it requires extra time and effort to perform a challenge to verify liveness. Another drawback to active liveness detection is that a system may need to instruct a user to perform an action. This may signal to an imposter that a liveness detection is being performed and may assist the imposter in learning how to thwart or spoof the liveness detection. On the other hand, passive liveness detection may be done without requiring any special challenge or action by the user. For example, a system may take a picture of a user as the user enters their log in information and may use the picture to determine liveness. Alternatively, for passive liveness detection the system may simply take a picture of the user's face without requiring the user to perform a special action (e.g., such as smiling or blinking). The system may use the picture to determine whether the user is authentic or if a presentation attack is being used by an imposter.

The system, methods, and techniques described herein may be used for passive liveness detection and may provide a number of benefits over other liveness detection techniques. One benefit is that the features described herein may require minimal effort from a user and thus improve user experience. For example, a user may need to simply be located in front of a camera without having to perform any special actions. This may reduce the time and effort required by the user to access a system. In addition, passive liveness detection techniques described herein may allow a system to better protect against identity theft and presentation attacks. Techniques for passive liveness detection described herein may provide an improvement over active liveness detection or other liveness detection techniques by improving abilities to detect spoofs and/or by improving the user experience. Active liveness detection requires the user to respond to instructions from a computing device (e.g., instructions to smile, blink, turn the user's head, etc.). Requiring the user to perform an action adds friction to the process and results in significantly increased user frustration and abandonment of the process. Additionally, active liveness detection is easy to spoof using animated deep fake images created by a computing device. Passive liveness detection techniques described herein may make it more difficult to spoof using animated and/or deep fake images. Passive liveness detection techniques described herein may use an input image and one or more cropped images to train one or more neural networks to determine whether the input image corresponds to a presentation attack. Using one or more cropped images may allow the one or more neural networks to more accurately predict whether the input image corresponds to a presentation attack (e.g., by allowing the one or more neural networks to focus on one or more portions of a face).

In some implementations, system 100 may include one or more computing platforms 102. Computing platform(s) 102 may be configured to communicate with one or more remote platforms 104 according to a client/server architecture, a peer-to-peer architecture, and/or other architectures. For example, computing platform(s) 102 may communicate with a client device 130 and receive an image taken by a camera 132 of the client device 130. The image may show a user and one or more devices in the system 100 may determine whether the user shown in the image is live or not. The client device 130 may include a display 131 that may be configured to display an image taken using the camera 132. A communications module 133 of the client device 130 may be configured to send one or more images captured by the camera 132 to computing platform 102. For example, a user may use the client device 130 to log in to a system. As part of the login process, the camera 132 may take a picture of the user (the user may or may not be aware of the time at which the picture is taken). The communications module 133 may send the picture to computing platform 102 (e.g., the image receiving module 108) where it may undergo a liveness detection test as described herein. The image receiving module 108 may format the image and/or otherwise process the image so that it may be used in a liveness detection test. The communications module 133 may receive the result and/or an indication of the result of the liveness detection test from the computing platform 102 (e.g., the client device 130 may be granted access to the system or may be denied access to the system). Remote platform(s) 104 may be configured to communicate with other remote platforms via computing platform(s) 102 and/or according to a client/server architecture, a peer-to-peer architecture, and/or other architectures. Users may access system 100 via remote platform(s) 104.

Computing platform(s) 102 may be configured by machine-readable instructions 106. Machine-readable instructions 106 may include one or more instruction modules. The instruction modules may include computer program modules. The instruction modules may include one or more of image receiving module 108, image generating module 110, embedding generating module 112, output generating module 114, neural network training module 116, image determination module 118, and/or other instruction modules.

Figure 7:
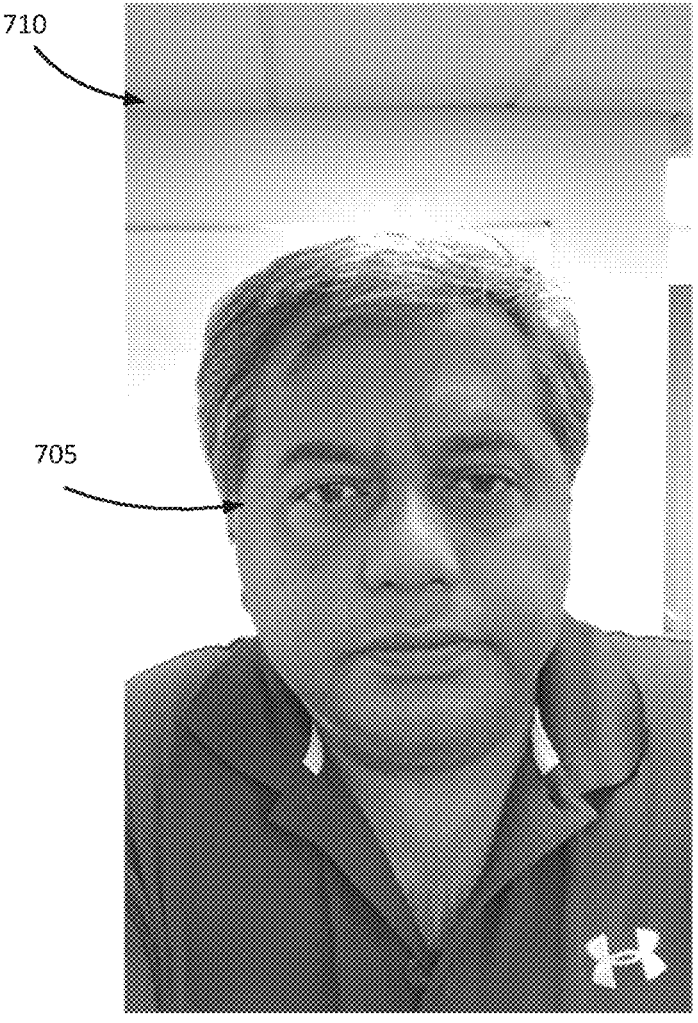
FIG. 7 shows an example image that may be used for passive liveness detection.

Image receiving module 108 may be configured to receive, by a computing device, an image. The image may depict a user, and the computing platform(s) 102 may be tasked with determining whether the user shown is live or not (e.g., whether a presentation attack is being used by an imposter, whether the image is a fake, whether the depicted user was in front of the camera when the image was taken, etc.). The image may include a facial portion and a background portion. For example, as shown in FIG. 7, the image may include a facial portion 705 and a background portion 710. The facial portion may include any portion of the user's face (e.g., eyes, ears, nose, mouth, etc.). The background portion may include any portion of the image that does not include the user.

Figure 8:
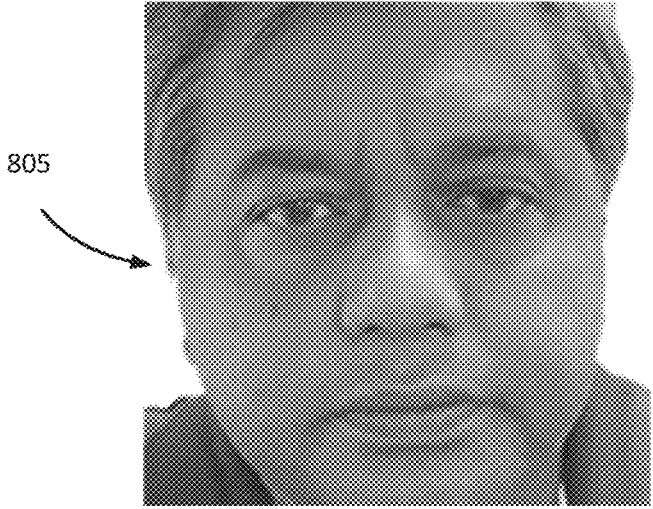
FIG. 8 shows an example cropped image that may be used for passive liveness detection.

Image generating module 110 may be configured to generate, based on the image, one or more cropped images. For example, the generating module 110 may crop an image received from the user. A cropped image may include the facial portion and a subset of the background portion of the image. For example, as shown in FIG. 8, a portion of the background may be removed from the image received by the image receiving module 108 to generate the cropped image. As shown in FIG. 8, the cropped image may comprise a facial portion 805. The image generating module 110 may crop the image so that the cropped image includes only the user's face (e.g., the cropped image may omit any part of the user that is not the user's face and/or the cropped image may omit the background portion of the image). Image generating module 110 may be configured to generate the cropped image by removing one or more pixels corresponding to a background portion of the image received from the user. For example, the image generating module 110 may use machine learning (e.g., object detection techniques, face detection techniques, etc.) to determine pixels corresponding to the user and/or the user's face and may crop the image such that only the portion of the image that corresponds to the user and/or user's face remain in the cropped image.

The computing platform 102 may use the image received from the user and the one or more cropped images to determine liveness of a user shown in the image. For example, the image and the cropped image may be input into one or more neural networks (e.g., as described in more detail below) to generate a prediction of liveness of a user shown in the image. Using one or more cropped images in addition to the image may improve the ability (e.g., accuracy may be improved) of computing platform 102 to determine liveness of the user shown in the image or whether a presentation attack is occurring.

Image generating module 110 may be configured to generate, by a computing device and via a camera, a plurality of images. For example, the computing platform 102 may cause a camera of a client device to take a plurality of images of a user (e.g., each image in the plurality of images may show the same user). Each image in the plurality of images may be taken within a threshold period of time (e.g., there may be a period of time between the time at which each image is taken). For example, the period of time between when each image is taken may be 200 ms (other amounts of time may be used such as 500 ms, 1 second, or any other amount of time). Alternatively, the threshold period of time may indicate a time period that each image of the plurality of images must be taken within. For example, if the threshold time period is 800 milliseconds, the camera may be required to take each image of the plurality of images within 800 milliseconds seconds. One or more of the plurality of images may include a cropped image.

Image generating module 110 may cause a camera to capture one or more images and/or video of a user while the user logs into an account or device. For example, image generating module 110 may cause a camera to capture a plurality of images of a user (e.g., 5 images, 10 images, 20 images, etc.). The image generating module 110 may determine a liveness score from each image of the plurality of images. The liveness score may comprise an indication of how open the user's eyes are in the image. The image with the highest liveness score (e.g., the image showing the user's eyes being the most open) may be used as the input image (e.g., the input image discussed below in connection with any of FIGS. 3-8).

Embedding generating module 112 may be configured to generate, based on the image and via a neural network (e.g., a convolutional neural network or any other type of neural network), an embedding (e.g., an image embedding). The neural network may include any component of the neural network described in connection with FIG. 2 or the convolutional neural network described in connection with FIG. 3. The neural network may be used to generate an image embedding of an image received from a user. The embedding may be a representation of the image with reduced dimensionality. For example a 12 megapixel image may be reduced to an embedding of 1024 dimensions. Additionally or alternatively, a neural network may be used to generate an image embedding using a cropped version of the input image. An image embedding may be a vector representation of the image. For example, the image embedding may be vector of numbers, where the vector has size N (e.g., 200, 500, 1024, 2028, 4056, or any other size). The image embedding may be the output of a layer within a neural network. For example, the image embedding may be the output of a fully connected layer, a pooling layer (e.g., average pooling, max pooling, etc.), or other layer of a neural network (e.g., a convolutional neural network).

One or more neural networks used to generate an embedding may include a plurality of layers and/or a plurality of input channels. The plurality of layers may include any type of layer described in more detail in connection with FIG. 2 below (e.g., convolutional layer, pooling layer, fully connected layer, etc.). By way of non-limiting example, one or more neural networks may comprise an average pooling layer, a fully connected layer, and/or a plurality of depthwise convolutional layers (e.g., as explained in more detail in connection with FIGS. 2-3 below).

The plurality of input channels may correspond to the type of images the neural network receives as input. For example, an image may comprise three dimensions. The dimensions or shape of an image may be c×h×w, where c is the number of input channels, h is the height (e.g., the number of rows of pixels), and w is width (e.g., the number of columns). For example, if the image is in RGB color model format, the input channels, c may be three and the number of input channels at the input layer of the neural network may be three. Subsequent layers of the neural network may have different numbers of input channels. For example, a second layer in the neural network may generate an output that has more or less than the number of input channels of a previous first layer of the neural network. A third layer that follows the second layer may have a number of input channels that equals the number of input channels generated in the output of the second layer.

A width parameter may be used to modify the number of input channels that are used in each layer in a neural network. Modifying or reducing the number of input channels using the width parameter may cause the neural network to reduce in size (e.g., the number of trainable parameters of the neural network may be reduced). This may increase the speed at which the neural network may be used (e.g., reduce time needed to make a prediction, reduce time needed to train, etc.) and/or may reduce the amount of computer processing power needed to use the neural network. The width parameter may be a value $\partial$, that is between 0 and 1. The width parameter may be multiplied with the number of input channels at each layer so that the number of input channels at each layer becomes $\partial \cdot c$. The product $\partial \cdot c$ may be rounded to the nearest integer. For example, if the width parameter is $\partial=0.4$ and the number of input channels is $c=2$, then the product may be rounded up to 1. In another example, if the width parameter is $\partial=0.25$ and the number of input channels is $c=3$, then the product may be rounded up to 1. In yet another example, if the width parameter is $\partial=0.55$ and the number of input channels is $c=3$, then the product may be rounded up to 2. The width parameter may be different for different neural networks. For example, the width parameter for a first neural network that takes a full (e.g., uncropped) image as input may be a first value (e.g., 1.75, etc.), and the width parameter for a second neural network that takes a cropped image as input may be a second value (e.g., 0.25, 0.5, 0.6, etc.).

Embedding generating module 112 may generate an embedding using a plurality of images (e.g., a plurality of images taken within a threshold time as discussed above). Embedding generating module 112 may be configured to generate, via a neural network and based on a plurality of images of a user, an embedding. For example, a recurrent neural network (RNN) (e.g., a recurrent convolutional neural network) may be used to generate, based on the plurality of images, the embedding. The plurality of images may be in order of when each image in the plurality of images was taken. At a first time step, the RNN may take as input the first image of the plurality of images and generate an embedding. At each subsequent time step, the RNN may use as input, the embedding generated at the previous time step as well as the next image in the plurality of images.

One or more embeddings may be used to determine a liveness prediction. A first embedding of an image and a second embedding of a cropped version of the image may be concatenated (e.g., by the embedding generating module 112). Embedding generating module 112 may be configured to generate, via a concatenation of the first embedding and the second embedding, a combined embedding (e.g., as discussed in more detail in connection with FIG. 4 below). Output generating module 114 may be configured to generate, based on the combined embedding, a prediction of liveness corresponding to the input image (e.g., a prediction whether a presentation attack is being used). For example, output generating module 114 may output information indicating whether a user shown in an image corresponds to a live person (e.g., as discussed in more detail in connection with FIG. 4 below). In the case of passive liveness detection, the step of generating, based on the combined embedding, a prediction of liveness is without requiring any special challenge or action by the user; for example, the system may simply take a photo/video of the user's face without requiring the user to perform a special action (e.g., such as smiling or blinking). The system may then perform the aforementioned steps using the photo/video to determine whether the user is authentic or if a presentation attack is being used by an imposter.

Neural network training module 116 may be configured to train one or more neural networks to detect liveness (e.g., whether a presentation attack is being attempted). Neural network training module 116 may use training data comprising a plurality of images. The images in the training data may be labeled with an indication of whether a user shown in each image is live and/or whether the image corresponds to a presentation attack. The images in the training data may comprise cropped versions of each image (e.g., the cropped version may show just the face of the user). The neural network may be trained using any technique (e.g., back-propagation, regularization, etc.) described in connection with FIG. 2 below.

Image determination module 118 may be configured to determine whether an image is suitable for liveness detection. There may be one or more criteria that are checked as part of an initial determination of liveness. The initial determination of liveness may be performed before a neural network is used to generate information indicating liveness as described above. For example, the initial determination may be performed prior to generating one or more embeddings and making a prediction of whether the image includes a live person (e.g., that the image is not a spoof or that the image does not correspond to a presentation attack). Image determination module 118 may analyze an input image and may determine whether the image is suitable for liveness detection. Image determination module 118 may be configured to determine, based on facial features of the person, that the additional image is not suitable for liveness detection. For example, image determination module 118 may use image processing techniques to determine whether the user's eyes are open or closed. If the user's eyes are closed, the image determination module 118 may determine that the image is not suitable for liveness detection and/or may determine that a user shown in the image is not a live user. Image determination module 118 may use image processing techniques to determine focus of a camera or blurriness of a captured image. If the blurriness of a captured image satisfies a blurriness threshold, the image determination module 118 may cause an additional image to be captured. Image determination module 118 may use image processing techniques to determine a glare level within a captured image. If the glare level of a captured image satisfies a threshold, the image determination module 118 may cause an additional image to be captured. Image determination module 118 may use image processing techniques to determine a head angle of a captured image. If the head angle in a captured image fails to satisfy one or more thresholds or criteria (e.g., the image is taken from too high of an angle above the user's head, too low of an angle below the user's head, etc.), the image determination module 118 may cause an additional image to be captured. Image determination module 118 may use image processing techniques to determine a distance between the user's face and the camera. If the distance fails to satisfy one or more thresholds (e.g., the user is too far away from the camera, or the user is too close to the camera), the image determination module 118 may cause an additional image to be captured.

In some implementations, computing platform(s) 102, remote platform(s) 104, and/or external resources 122 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 102, remote platform(s) 104, and/or external resources 122 may be operatively linked via some other communication media.

A given remote platform 104 may include one or more processors configured to execute computer program modules. The computer program modules may be configured to enable an expert or user associated with the given remote platform 104 to interface with system 100 and/or external resources 122, and/or provide other functionality attributed herein to remote platform(s) 104. By way of non-limiting example, a given remote platform 104 and/or a given computing platform 102 may include one or more of a server, a desktop computer, a laptop computer, a handheld computer, a tablet computing platform, a NetBook, a Smartphone, a gaming console, and/or other computing platforms.

External resources 122 may include sources of information outside of system 100, external entities participating with system 100, and/or other resources. In some implementations, some or all of the functionality attributed herein to external resources 122 may be provided by resources included in system 100.

Computing platform(s) 102 may include electronic storage 124, one or more processors 126, and/or other components. Computing platform(s) 102 may include communication lines, or ports to enable the exchange of information with a network and/or other computing platforms. Illustration of computing platform(s) 102 in FIG. 1 is not intended to be limiting. Computing platform(s) 102 may include a plurality of hardware, software, and/or firmware components operating together to provide the functionality attributed herein to computing platform(s) 102. For example, computing platform(s) 102 may be implemented by a cloud of computing platforms operating together as computing platform(s) 102.

Electronic storage 124 may comprise non-transitory storage media that electronically stores information. The electronic storage media of electronic storage 124 may include one or both of system storage that is provided integrally (i.e., substantially non-removable) with computing platform(s) 102 and/or removable storage that is removably connectable to computing platform(s) 102 via, for example, a port (e.g., a USB port, a firewire port, etc.) or a drive (e.g., a disk drive, etc.). Electronic storage 124 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 124 may include one or more virtual storage resources (e.g., cloud storage, a virtual private network, and/or other virtual storage resources). Electronic storage 124 may store software algorithms, information determined by processor(s) 126, information received from computing platform(s) 102, information received from remote platform(s) 104, and/or other information that enables computing platform(s) 102 to function as described herein.

Processor(s) 126 may be configured to provide information processing capabilities in computing platform(s) 102. As such, processor(s) 126 may include one or more of a digital processor, an analog processor, a digital circuit designed to process information, an analog circuit designed to process information, a state machine, and/or other mechanisms for electronically processing information. Although processor(s) 126 is shown in FIG. 1 as a single entity, this is for illustrative purposes only. In some implementations, processor(s) 126 may include a plurality of processing units. These processing units may be physically located within the same device, or processor(s) 126 may represent processing functionality of a plurality of devices operating in coordination. Processor(s) 126 may be configured to execute modules 108, 110, 112, 114, 116, and/or 118, and/or other modules. Processor(s) 126 may be configured to execute modules 108, 110, 112, 114, 116, and/or 118, and/or other modules by software; hardware; firmware; some combination of software, hardware, and/or firmware; and/or other mechanisms for configuring processing capabilities on processor(s) 126. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 108, 110, 112, 114, 116, and/or 118, are illustrated in FIG. 1 as being implemented within a single processing unit, in implementations in which processor(s) 126 includes multiple processing units, one or more of modules 108, 110, 112, 114, 116, and/or 118, may be implemented remotely from the other modules. The description of the functionality provided by the different modules 108, 110, 112, 114, 116, and/or 118, described below is for illustrative purposes, and is not intended to be limiting, as any of modules 108, 110, 112, 114, 116, and/or 118, may provide more or less functionality than is described. For example, one or more of modules 108, 110, 112, 114, 116, and/or 118, may be eliminated, and some or all of its functionality may be provided by other ones of modules 108, 110, 112, 114, 116, and/or 118. As another example, processor(s) 126 may be configured to execute one or more additional modules that may perform some or all of the functionality attributed below to one of modules 108, 110, 112, 114, 116, and/or 118.

Figure 2:
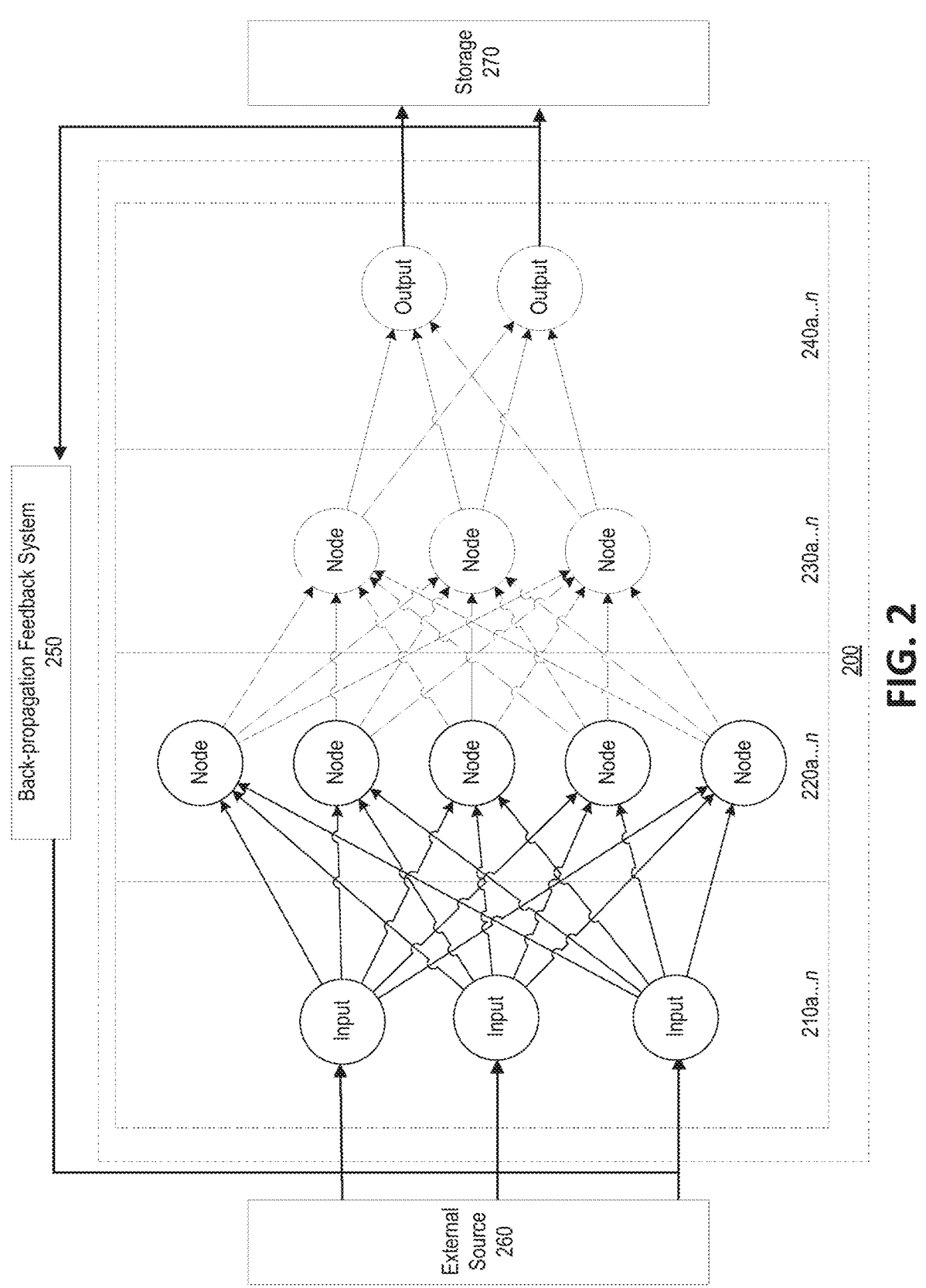
FIG. 2 shows an example neural network that may be used for passive liveness detection.

By way of example, FIG. 2 illustrates a simplified artificial neural network (e.g., neural network) 200 on which a machine learning algorithm may be executed. The artificial neural network shown in FIG. 2 may be used for liveness detection as described in connection with FIGS. 1, and 3-5. FIG. 2 is merely an example of an artificial neural network; other forms of nonlinear processing may be used to implement a machine learning algorithm in accordance with features described herein.

In FIG. 2, each of input nodes 210$a$-$n$ is connected to a first set of processing nodes 220$a$-$n$. Each of the first set of processing nodes 220$a$-$n$ is connected to each of a second set of processing nodes 230$a$-$n$. Each of the second set of processing nodes 230$a$-$n$ is connected to each of output nodes 240$a$-$n$. Though only two sets of processing nodes are shown, any number of processing nodes may be implemented. Similarly, though only four input nodes, five processing nodes, and two output nodes per set are shown in FIG. 2, any number of nodes may be implemented per set. Data flows in FIG. 2 are depicted from left to right: data may be input into an input node, may flow through one or more processing nodes, and may be output by an output node. Input into the input nodes 210$a$-$n$ may originate from an external source 260. Output may be sent to a feedback system 250 and/or to storage 270. The feedback system 250 may send output to the input nodes 210$a$-$n$ for successive processing iterations with the same or different input data.

In one illustrative method using feedback system 250, the system may use machine learning to determine an output. The output may include anomaly scores, heat scores/values, confidence values, and/or classification output. The system may use any machine learning model including xgboosted decision trees, auto-encoders, perceptron, decision trees, support vector machines, regression, and/or a neural network. The neural network may be any type of neural network including a feed forward network, radial basis network, recurrent neural network, long/short term memory, gated recurrent unit, auto encoder, variational autoencoder, convolutional network, residual network, Kohonen network, MobileNet, GoogleNet, VGG 16, Squeezenet, AlexNet, and/or other type of network. For example, the neural network may comprise a depthwise, separable convolution such as a MobileNet architecture. In one example, the output data in the machine learning system may be represented as multi-dimensional arrays, an extension of two-dimensional tables (such as matrices) to data with higher dimensionality.

The neural network may include an input layer, a number of intermediate layers, and an output layer. Each layer may have its own weights. The input layer may be configured to receive as input one or more feature vectors described herein. The intermediate layers may be convolutional layers, pooling layers, dense (fully connected) layers, and/or other types. The input layer may pass inputs to the intermediate layers. In one example, each intermediate layer may process the output from the previous layer and then pass output to the next intermediate layer. The output layer may be configured to output a classification or a real value. The layers may include convolutional layers, pooling layers, depthwise convolutional layers, and/or any other type of layer.

In one example, the layers in the neural network may use an activation function such as a sigmoid function, a Tanh function, a ReLu function, and/or other functions. Moreover, the neural network may include a loss function. A loss function may, in some examples, measure a number of missed positives; alternatively, it may also measure a number of false positives. The loss function may be used to determine error when comparing an output value and a target value. For example, when training the neural network the output of the output layer may be used as a prediction and may be compared with a target value of a training instance to determine an error. The error may be used to update weights in each layer of the neural network.

In one example, the neural network may include a technique for updating the weights in one or more of the layers based on the error. The neural network may use gradient descent to update weights. Alternatively, the neural network may use an optimizer to update weights in each layer. For example, the optimizer may use various techniques, or combination of techniques, to update weights in each layer. When appropriate, the neural network may include a mechanism to prevent overfitting—regularization (such as L1 or L2), dropout, and/or other techniques. The neural network may also increase the amount of training data used to prevent overfitting.

In one example, FIG. 2 depicts nodes that may perform various types of processing, such as discrete computations, computer programs, and/or mathematical functions implemented by a computing device. For example, the input nodes 210*a-n* may comprise logical inputs of different data sources, such as one or more data servers. The processing nodes 220*a-n* may comprise parallel processes executing on multiple servers in a data center. And, the output nodes 240*a-n* may be the logical outputs that ultimately are stored in results data stores, such as the same or different data servers as for the input nodes 210*a-n*. Notably, the nodes need not be distinct. For example, two nodes in any two sets may perform the exact same processing. The same node may be repeated for the same or different sets.

Each of the nodes may be connected to one or more other nodes. The connections may connect the output of a node to the input of another node. A connection may be correlated with a weighting value. For example, one connection may be weighted as more important or significant than another, thereby influencing the degree of further processing as input traverses across the artificial neural network. Such connections may be modified such that the artificial neural network 200 may learn and/or be dynamically reconfigured. Though nodes are depicted as having connections only to successive nodes in FIG. 2, connections may be formed between any nodes. For example, one processing node may be configured to send output to a previous processing node.

Input received in the input nodes 210*a-n* may be processed through processing nodes, such as the first set of processing nodes 220*a-n* and the second set of processing nodes 230*a-n*. The processing may result in output in output nodes 240*a-n*. As depicted by the connections from the first set of processing nodes 220*a-n* and the second set of processing nodes 230*a-n*, processing may comprise multiple steps or sequences. For example, the first set of processing nodes 220*a-n* may be a rough data filter, whereas the second set of processing nodes 230*a-n* may be a more detailed data filter.

The artificial neural network 200 may be configured to effectuate decision-making. As a simplified example for the purposes of explanation, the artificial neural network 200 may be configured to detect faces in photographs. The input nodes 210*a-n* may be provided with a digital copy of a photograph. The first set of processing nodes 220*a-n* may be each configured to perform specific steps to remove non-facial content, such as large contiguous sections of the color red. The second set of processing nodes 230*a-n* may be each configured to look for rough approximations of faces, such as facial shapes and skin tones. Multiple subsequent sets may further refine this processing, each looking for further more specific tasks, with each node performing some form of processing which need not necessarily operate in the furtherance of that task. The artificial neural network 200 may then predict the location on the face. The prediction may be correct or incorrect.

The feedback system 250 may be configured to determine whether or not the artificial neural network 200 made a correct decision. Feedback may comprise an indication of a correct answer and/or an indication of an incorrect answer and/or a degree of correctness (e.g., a percentage). For example, in the facial recognition example provided above, the feedback system 250 may be configured to determine if the face was correctly identified and, if so, what percentage of the face was correctly identified. The feedback system 250 may already know a correct answer, such that the feedback system may train the artificial neural network 200 by indicating whether it made a correct decision. The feedback system 250 may comprise human input, such as an administrator telling the artificial neural network 200 whether it made a correct decision. The feedback system may provide feedback (e.g., an indication of whether the previous output was correct or incorrect) to the artificial neural network 200 via input nodes 210*a-n* or may transmit such information to one or more nodes. The feedback system 250 may additionally or alternatively be coupled to the storage 270 such that output is stored. The feedback system may not have correct answers at all, but instead base feedback on further processing: for example, the feedback system may comprise a system programmed to identify faces, such that the feedback allows the artificial neural network 200 to compare its results to that of a manually programmed system.

The artificial neural network 200 may be dynamically modified to learn and provide better input. Based on, for example, previous input and output and feedback from the feedback system 250, the artificial neural network 200 may modify itself. For example, processing in nodes may change and/or connections may be weighted differently. Following on the example provided previously, the facial prediction may have been incorrect because the photos provided to the algorithm were tinted in a manner which made all faces look red. As such, the node which excluded sections of photos containing large contiguous sections of the color red could be considered unreliable, and the connections to that node may be weighted significantly less. Additionally or alternatively, the node may be reconfigured to process photos differently. The modifications may be predictions and/or guesses by the artificial neural network 200, such that the artificial neural network 200 may vary its nodes and connections to test hypotheses.

The artificial neural network 200 need not have a set number of processing nodes or number of sets of processing nodes, but may increase or decrease its complexity. For example, the artificial neural network 200 may determine that one or more processing nodes are unnecessary or should be repurposed, and either discard or reconfigure the processing nodes on that basis. As another example, the artificial neural network 200 may determine that further processing of all or part of the input is required and add additional processing nodes and/or sets of processing nodes on that basis.

The feedback provided by the feedback system 250 may be mere reinforcement (e.g., providing an indication that output is correct or incorrect, awarding the machine learning algorithm a number of points, or the like) or may be specific (e.g., providing the correct output). For example, the machine learning algorithm 200 may be asked to detect faces in photographs. Based on an output, the feedback system 250 may indicate a score (e.g., 75% accuracy, an indication that the guess was accurate, or the like) or a specific response (e.g., specifically identifying where the face was located).

The artificial neural network 200 may be supported or replaced by other forms of machine learning. For example, one or more of the nodes of artificial neural network 200 may implement a decision tree, associational rule set, logic programming, regression model, cluster analysis mechanisms, Bayesian network, propositional formulae, generative models, and/or other algorithms or forms of decision-making. The artificial neural network 200 may effectuate deep learning.

Figure 3:
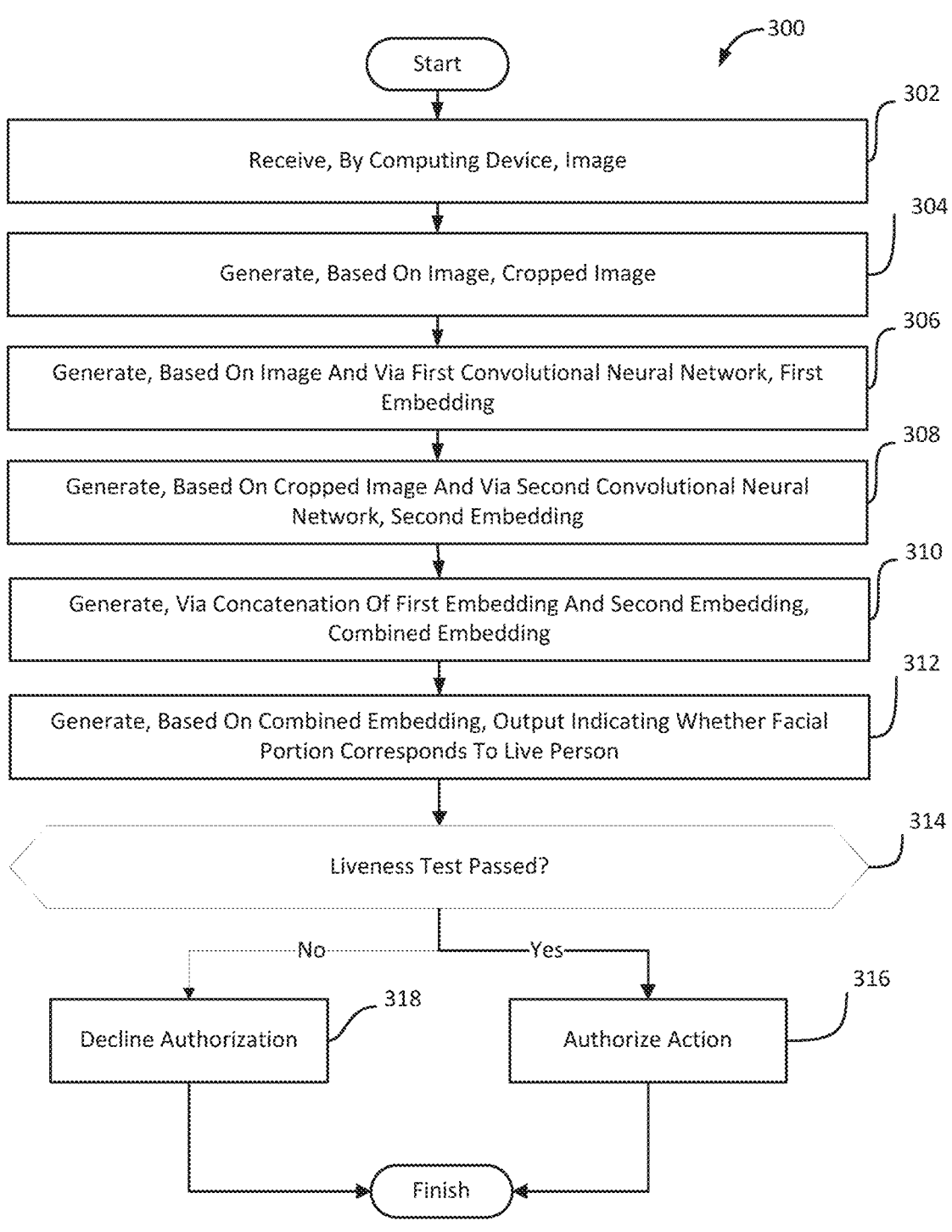
FIG. 3 shows an example method for passive liveness detection.

FIG. 3 illustrates a method 300 for liveness detection, in accordance with one or more implementations. The operations of method 300 presented below are intended to be illustrative. In some implementations, method 300 may be accomplished with one or more additional operations not described, and/or without one or more of the operations discussed. Additionally, the order in which the operations of method 300 are illustrated in FIG. 3 and described below is not intended to be limiting.

In some implementations, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

An operation 302 may include receiving, by a computing device, an image. The image may include a facial portion and a first background portion. Operation 302 may be performed by one or more hardware processors configured by machine-readable instructions including a module that is the same as or similar to image receiving module 108, in accordance with one or more implementations.

An operation 304 may include generating, based on the image, a cropped image. The cropped image may include the facial portion and a second background portion that is a subset of the first background portion. Operation 304 may be performed by one or more hardware processors configured by machine-readable instructions including a module that is the same as or similar to image generating module 110, in accordance with one or more implementations.

An operation 306 may include generating, based on the image and via a first convolutional neural network, a first embedding. The first convolutional neural network may include an average pooling layer, a fully connected layer, and a plurality of depthwise convolutional layers. Operation 306 may be performed by one or more hardware processors configured by machine-readable instructions including a module that is the same as or similar to embedding generating module 112, in accordance with one or more implementations.

An operation 308 may include generating, based on the cropped image and via a second convolutional neural network, a second embedding. Operation 308 may be performed by one or more hardware processors configured by machine-readable instructions including a module that is the same as or similar to embedding generating module 112, in accordance with one or more implementations.

An operation 310 may include generating, via a concatenation of the first embedding and the second embedding, a combined embedding. Operation 310 may be performed by one or more hardware processors configured by machine-readable instructions including a module that is the same as or similar to embedding generating module 112, in accordance with one or more implementations.

An operation 312 may include generating, based on the combined embedding, output indicating whether the facial portion corresponds to a live person. Operation 312 may be performed by one or more hardware processors configured by machine-readable instructions including a module that is the same as or similar to output generating module 114, in accordance with one or more implementations.

An operation 314 may include determining whether the image received in step 302 passes a liveness test. Operation 314 may be performed as described in connection with step 450 in FIG. 4 below. For example, the output generated in step 312 may be used to determine whether the image passes a liveness test and/or corresponds to a presentation attack. Operation 314 may be performed by the computing platform 102 or one or more hardware processors configured by machine-readable instructions. If it is determined that the image passes the liveness test, an operation 316 may be performed. If it is determined that the image does not pass the liveness test, an operation 318 may be performed. Operation 316 may include authorizing an action. Authorizing an action is described in more detail below in connection with step 455 of FIG. 4. Operation 318 may include declining authorization. Declining authorization is described in more detail below in connection with step 460 of FIG. 4.

Figure 4:
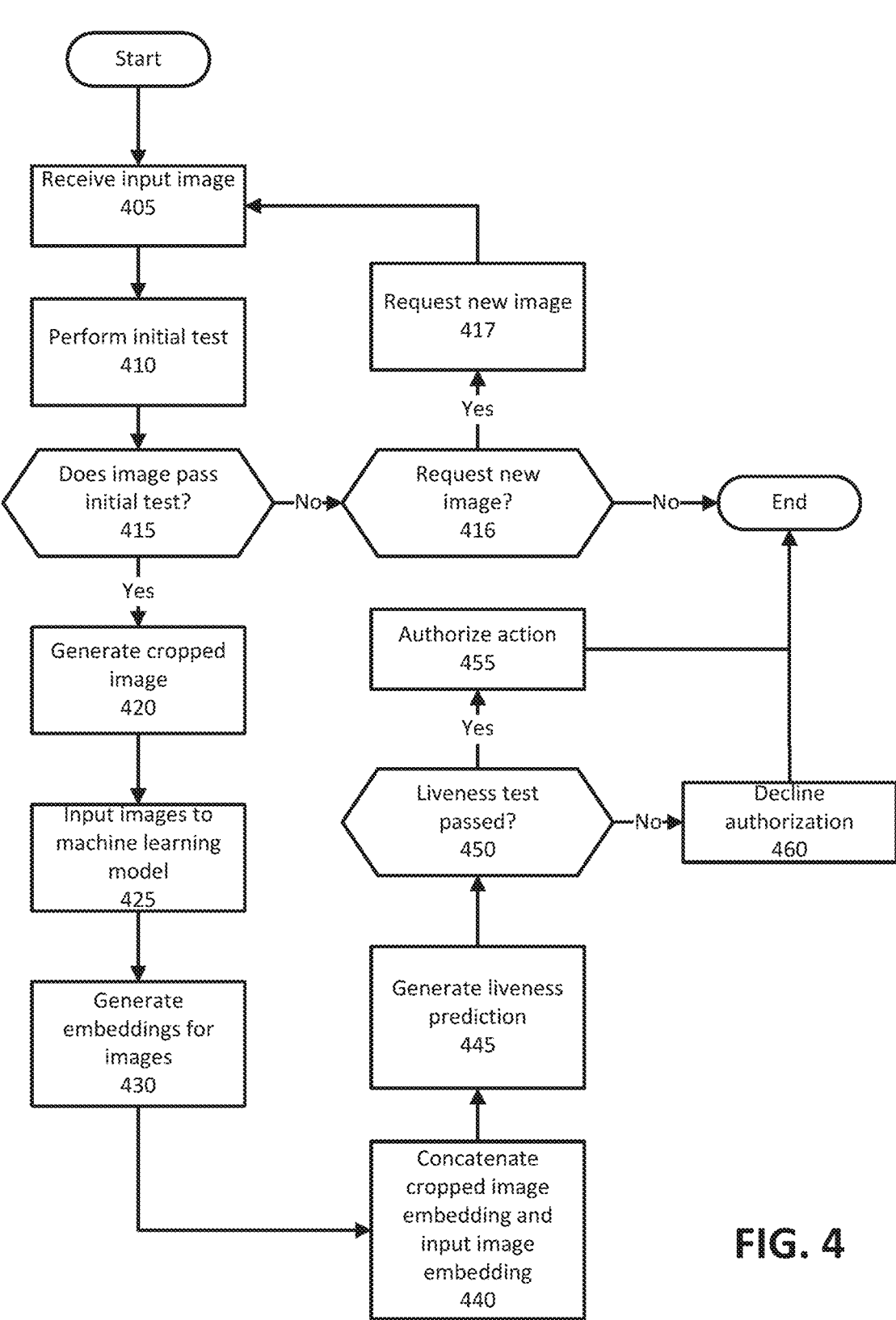
FIG. 4 shows an additional example method for detecting liveness in an image.

FIG. 4 shows an example method 400 for detecting liveness of a user in an image. The example method 400 may be performed using any device, module, and/or component described in connection with FIGS. 1-3 and/or other device(s). Although one or more steps of the example method of FIG. 4 are described for convenience as being performed by the computing platform 102, one, some, or all of such steps may be performed by one or more other devices, and steps may be distributed among one or more devices, including any devices such as those described in connection with FIGS. 1-3. One or more steps of the example method of FIG. 4 may be rearranged, modified, repeated, and/or omitted.

At step 405, the computing platform 102 may receive an input image. The input image may show a user for whom liveness should be detected. For example, the input image may show a user and the computing platform 102 may be tasked with determining whether the user was physically present when the image was taken or whether the image contains a spoof (e.g., the image is a picture of an image of the user, the image contains a computer generated image of the user, etc.).

At step 410, the computing platform 102 may perform an initial test on the image. The initial test may comprise determining whether the image is suitable for use in a machine learning model to detect liveness. The computing platform 102 may determine a location of the user's face within the image. The computing platform 102 may determine regions of interest corresponding to the image and/or the user's face shown in the image. For example, the computing platform 102 may determine a location of facial features such as the user's eyes, nose, mouth, ears, and/or any other facial feature. The computing platform 102 may analyze the regions of interests (e.g., the facial features). For example, the computing platform 102 may analyze the regions of interests to determine whether the eyes of a user shown in the image are open or closed. The initial test may include checking for any suitability criteria described above in connection with FIG. 1. Additionally or alternatively, the computing platform 102 may use facial recognition to verify the face of the user in the image. For example, the computing platform 102 may use user in image matches a name and face in database.

At step 415, the computing platform 102 may determine whether the image passed the initial test. The computing platform 102 may use any information or determinations made in step 410 as input. to determining whether the initial test is passed. The computing platform 102 may determine that one or more criteria are satisfied (e.g., the user's eyes are open in the image, etc.). The criteria may include whether the user has one or more expected facial features. For example, the computing platform 102 may determine whether shows a nose, one or more eyes, or any other facial feature. If one or more criteria are satisfied, step 420 may be performed. If one or more criteria are not satisfied, step 416 may be performed. At step 416, the computing platform 102 may determine whether to request a new image. For example, there may be a threshold number of attempts that a user is allowed to submit an image for liveness detection (e.g., the threshold may be 3, 5, 10, etc.). The threshold number of attempts may be used to limit an imposter's ability to try to circumvent the system or make an unlimited number of presentation attacks. The computing platform 102 may determine how many times the user that sent the input image received in step 405 has submitted an image. If the threshold is satisfied, the method 400 may end. If the threshold is not satisfied, step 417 may be performed. At step 417, the computing platform 102 may send a request to the user for one or more new images. For example, the computing platform 102 may send a message to a user device corresponding to the user to request one or more new images of the user be taken.

Step 420 may be performed if it is determined that the image passes the initial test in step 415. At step 420, the computing platform 102 may generate a cropped image. The computing platform 102 may crop the image received in step 405 so that only the user's face remains. Alternatively the computing platform 102 may crop the image to remove a threshold portion of the background (e.g., the portion of the image that does not show the user). Additionally or alternatively, the cropped image may be generated as described above in connection with FIG. 1.

At step 425, the computing platform 102 may use the input image and the cropped image as input into one or more machine learning models. For example, the input image may be input into a first neural network and the cropped image may be input into a second neural network. Each neural network may have been trained separately for liveness detection. For example, the first neural network may have been trained for liveness detection using input images showing the user and the background of the user, while the second neural network may have been trained for liveness detection using cropped images showing only the user's face. Alternatively, the input image and the cropped image may be input into the same neural network. For example, one convolutional neural network may take both the input image and the cropped image as input (e.g., the convolutional neural network may generate a first embedding for the input image and a second embedding for the cropped image).

At step 430, the computing platform 102 may generate an embedding for the input image and the cropped image as described above in connection with FIG. 1. The embedding for the input image may be the output of a layer of a first neural network and the embedding for the cropped image may be the output of a layer of a second neural network. Alternatively, the same neural network may be used to generate both embeddings. For example, the embedding for the input image may be the output of a layer of a neural network and the embedding for the cropped image may be the output of a layer of the same neural network.

Figure 6:
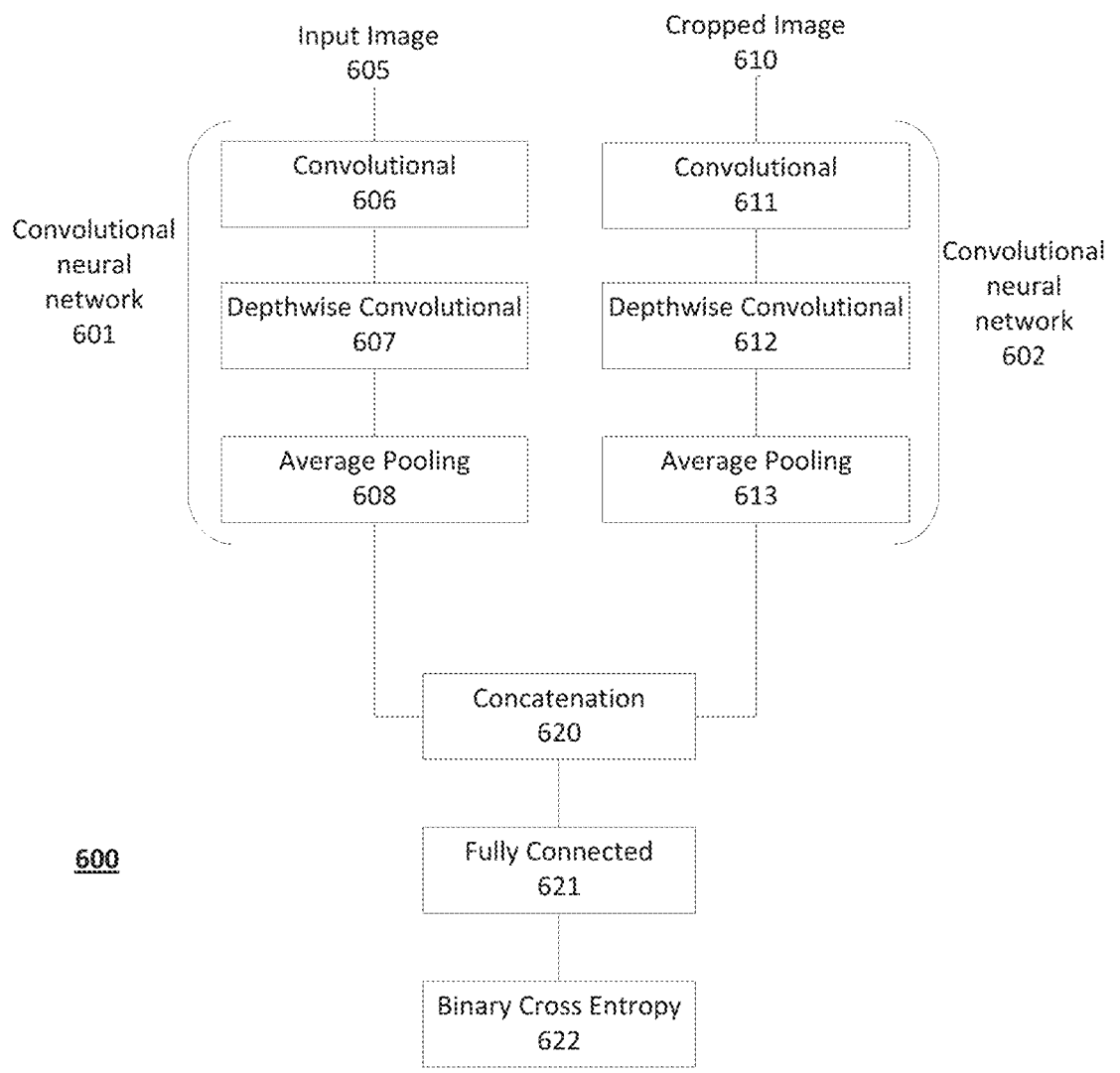
FIG. 6 shows an example neural network architecture that may be used for passive liveness detection.

At step 440, the computing platform 102 may concatenate the embedding of the cropped image and the embedding of the input image. The computing platform may append the embedding of the cropped image onto the end of the embedding of the input image. For example, if each embedding was of size 1024 (e.g., the embedding comprises 1024 values), the concatenated embedding would be of size 2028. By combining both embeddings, the computing platform 102 may be able to use both embeddings to more accurately detect liveness of a user in an image. Any number of cropped images may be used by the computing platform 102. For example, the computing platform may generate a first cropped image that contains the area just around a user's eyes (e.g., an area that contains the user's eyes and eyebrows but excludes the user's mouth, ears, hair, etc.), a second cropped image that is limited to the user's face, and/or any other number of cropped images that contain any portion of the user's face (e.g., a cropped image corresponding to the nose, a cropped image corresponding to the ears, etc.). Embeddings for any of these cropped images may be generated by a neural network and concatenated. Referring to FIG. 6, a 1024 dimension array 505 may be an embedding of the input image. The array 505 may comprise 1024 values generated by a neural network. A 1024 dimension array 510 may be an embedding of the cropped image. The array 505 and the array 510 may be concatenated to form a 2048 dimension array 515. The values in each array 505-515 may indicate to a neural network or may be used by a neural network to make a liveness prediction for the input image.

At step 445, the computing platform 102 may generate a liveness prediction. The computing platform 102 may use the concatenated embedding as input into a fully connected layer of a neural network. The fully connected layer may use a function (e.g., a sigmoid function, a ReLU function, or other function) that indicates whether the image contains a live user or not. For example, the function may be used by the computing platform 102 to generate an output value that is between 0 and 1.

At step 450, the computing platform 102 may determine whether the liveness test is passed (e.g., whether the image received in step 405 corresponds to a presentation attack or not). The computing platform may use the output value generated in step 445 to determine whether the liveness test has been passed or not. For example, if the value is above 0.5 the computing platform 102 may determine that the image contains a live user. If the value is at or below 0.5, the computing platform 102 may determine that the image does not contain a live user (e.g., computing platform 102 may determine that a presentation attack has occurred). Step 455 may be performed if it is determined that the liveness test is passed.

At step 455, the computing platform 102 may authorize an action. A user and/or user device corresponding to the input image received in step 405 may be authorized access to one or more computer systems (e.g., the user may be allowed to login to a system). A user and/or user device may be authorized to perform one or more actions such as depositing a check, transferring money, opening an account, etc. Passive liveness detection techniques described herein may allow a bank to operate without a branch office, because it may allow the bank to verify the identity of a user electronically (e.g., over the Internet). The one or more actions may comprise validating a user identification (e.g., driver's license, passport, etc.) of the user corresponding to the input image. The one or more actions may comprise verifying that the user does not have duplicate accounts or policies (e.g., insurance). For example, by verifying each user through passive liveness detection, the computing platform 102 may prevent a user from opening multiple accounts or policies. The one or more actions may comprise authorizing a payment (e.g., using a credit card or any other means). For example, using passive liveness detection, the computing platform 102 may determine that the user making a purchase is the user that is associated with the credit card being used for the purchase. The computing platform 102 may use passive liveness detection to prevent fraud by impersonation. The computing platform 102 may use passive liveness detection in a digital environment, where users are enrolling for services remotely (and subsequently accessing the services remotely). The computing platform 102 may use passive liveness detection (e.g., as described in connection with FIGS. 1-8) to prevent an imposter from gaining access (e.g., to information, to a computer system, etc.) using previously captured (e.g., paper and/or electronic) images (e.g., images from social media, publicly available photographs, etc.).

Step 460 may be performed, for example, if it is determined that the liveness test is not passed in step 450. At step 460, the computing platform 102 may decline authorization to the user device that sent the input image in step 405. For example, the computing platform 102 may prevent a user device from accessing a system (e.g., via a login), and/or may prevent any of the actions described in connection with step 455 above.

FIG. 6 shows an example neural network architecture 600 that may be used for passive liveness detection. The neural network architecture 600 may be used for passive liveness detection as described in any of FIGS. 1-5. The neural network architecture 600 may include a convolutional neural network 601 and a convolutional neural network 602. The convolutional neural network 601 may be configured to receive as input an input image (e.g., an image of a user as described above). The convolutional neural network 602 may be configured to receive a cropped image as input (e.g., an image that has been cropped to show only a user's face as described above). Although only convolutional neural networks 601 and 602 are shown in FIG. 6, the neural network architecture 600 may comprise any number of convolutional neural networks. The neural network architecture 600 may comprise a neural network corresponding to the input image and one or more neural networks corresponding to one or more cropped images. For example, if three cropped images are used by the computing platform 102, the neural network architecture 600 may comprise four neural networks (e.g., one for the input image 605, and one for each cropped image). The number of convolution neural networks contemplated by this disclosure is not limited by the illustrative diagram in FIG. 6. The convolutional neural network 601 may include a convolutional layer 606, a depthwise convolutional layer 607, and/or an average pooling layer 608. The convolutional neural network 602 may include a convolutional layer 611, a depthwise convolutional layer 612, and/or an average pooling layer 613. Although only three layers are shown in each of convolutional neural networks 601-602, each convolutional neural network may include any number of convolutional, depthwise convolutional, or any other type of layer such as those described above in connection with FIG. 2.

The neural network architecture 600 may comprise a concatenation layer 620, which may be configured to concatenate or otherwise combine two or more image embeddings (e.g., an image embedding generated for the input image 605, an image embedding generated for the cropped image 610, and an image embedding for each additional cropped image if additional cropped images are used). The neural network architecture may comprise a fully connected layer 621 and/or a binary cross entropy layer which may be configured to generate a liveness prediction for one or more images (e.g., the input image 605).

The disclosure contemplates not only the one or more method claimed below, but also the one or more corresponding systems and/or devices that are configured to perform the steps of the methods described herein. In some aspects, an apparatus may be configured accordingly; in other aspects, one or more computer readable media may store computer executed instructions that, when executed, configure a system to perform accordingly. For example, the disclosure contemplates a system with one or more convolution neural networks; a first module for receiving an input image comprising a facial portion and a first background portion; a second module for generating, based on the input image, a cropped image; a third module for generating, based on the input image and via a first convolutional neural network, a first image embedding, wherein the first convolutional neural network comprises an average pooling layer, a fully connected layer, and a plurality of depthwise convolutional layers; a fourth module for generating, based on the cropped image and via a second convolutional neural network, a second image embedding; a fifth module for generating, via a concatenation of the first image embedding and the second image embedding, a combined embedding; and a sixth module for generating, based on the combined embedding, output indicating whether the facial portion corresponds to a live person. One or more of the first to sixth modules may be combined, consolidated, or divided into more or less modules for executing the operations described herein. The modules may comprise computer-executable instructions (e.g., compiled software code) that executes in a computer processor. In other examples, the modules may be implemented as hardware in an integrated circuit or as firmware or other hardware-software combination. Moreover, the other methods and steps described herein may be performed by one or more of the first to sixth module, or other modules. In some examples, one or more modules may be integrated into the convolutional neural network.

Many illustrative embodiments are listed below in accordance with one or more aspects disclosed herein. Although many of the embodiments listed below are described as depending from other embodiments, the dependencies are not so limited. For example, embodiment #5 (below) is expressly described as incorporating the features of embodiment #1 (below), however, the disclosure is not so limited. For example, embodiment #5 may depend any one or more of the preceding embodiments (i.e., embodiment #1, embodiment #2, embodiment #3, and/or embodiment #4). Moreover, that any one or more of embodiments #2-#5 may be incorporated into embodiment #1 is contemplated by this disclosure.

Embodiment #1. A point of transaction device configured for performing multi-factor authentication before approving a transaction originating from a sender party without subjecting the sender party to memorizing a reusable, non-one-time-use PIN, the point of transaction device comprising:

a user input module configured to receive the sender party input regarding the transaction and to receive a selection of a transaction type, a triggering transaction amount, and a selection of at least one transaction parameter;

a module configured to pre-register the sender party with a transaction information server by storing a stored image of an identification document of the sender party, wherein the identification document comprises at least a facial image of the sender party;

a communications module;

an identification capture module, in operative communication with an image capture device and a biometric capture device;

a processor;

a memory in electronic communication with the processor and configured to store a security rule that associates the selected at least one transaction parameter with the selected transaction type and the selected triggering transaction amount; and instructions stored in the memory, which when executed by the processor, cause the point of transaction device to:

capture, using the image capture device, an image of the identification document received from the sender party to the transaction contemporaneous to the transaction, wherein the captured image of the identification document matches the stored image of the identification document;

transmit, from the point of transaction device, a request for the transaction to the transaction information server, the request comprising a transaction amount, a customer identifier code, and an identification parameter, wherein the identification parameter is collected using the identification capture module, and wherein the identification parameter comprises the captured image of the identification document;

causing the transaction information server to transmit a one-time-use identification code to a smartphone of the sender party;

transmit, through the communications module to the transaction information server, a temporary one-time-use identification code provided through the user input module by the sender party to the transaction contemporaneously with the transaction, for authentication before receiving the transaction identifier code;

receive, from the transaction information server, a transaction identifier code based on an authentication of the identification parameter, wherein the authentication of the identification parameter is performed by an approving authority, separate from the transaction information server, and wherein the authentication of the identification parameter is based on data maintained by one or more government agencies;

transmit, from the point of transaction device, the transaction identifier code and at least a portion of the request for the transaction to a transaction authority separate from the transaction information server; and receive an approval for the transaction from the transaction authority, the approval based on the transaction identifier code and the request; wherein the authentication of the identification parameter by an approving authority further comprises:

forwarding at least a portion of the request for the transaction to a plurality of approving authorities in an order associated with a hierarchy of the approving authorities, wherein a first approving authority confirms a first aspect before a second approving authority confirms a second aspect; and receiving confirmation from a first approving authority that the identification parameter is associated with the customer identifier code, wherein the security rule further configures the point of transaction device to capture, using the biometric capture device, a photo image of the sender party contemporaneous to the transaction at a location of the point of transaction device for all transactions where the selection of the transaction type is cash.

Embodiment #2. The point of transaction device of Embodiment #1, wherein the identification capture module is in operative communication with the biometric capture device configured to capture biometric data selected from iris, fingerprint, face and voice.

Embodiment #3. The point of transaction device of claim 1, further comprising instructions to:

receive, from the transaction information server, a second identification parameter from the record associated with the customer identifier code stored by the transaction information server; and provide an indication of whether the sender party to the transaction matches the second identification parameter.

Embodiment #4. The point of transaction device of Embodiment #1, wherein the transmission to and receipt from the transaction information server is via a wireless communications channel and transmission to and receipt from the transaction authority is via a wired communications channel.

Embodiment #5. The point of transaction device of Embodiment #1, wherein the identification parameter comprises a biometric data and the point of transaction device further comprises:

a biometric capture device configured to capture the biometric data from the sender party to the transaction contemporaneous to the transaction.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

Description of a Point of Transaction Device with Multi-Factor Authentication Systems, devices, and methods for multi-factor authentication for transaction processing are provided. A point-of-transaction device captures customer information, biometric data, and images of identification documents and transmits the information to a transaction information server which receives the transaction request, queries one or more storage records to confirm the identity of the customer to the transaction and to determine whether the customer is authorized to engage in the transaction. The point-of-transaction device communicates a transaction identifier code and at least a portion of the transaction request to a transaction authority. The transaction authority transmits a confirmation signal to the point-of-transaction device based on the transaction identifier code and the transaction request.

Background of a Point of Transaction Device with Multi-Factor Authentication

The present invention relates to transaction processing systems and methods that integrate a customer identity into the transaction as well as verifying the customer identity contemporaneous to the transaction.

Transactions are an integral component of virtually every economy. Exemplary transactions may include, but are not limited to, money transfers, deposits, prepaid cards, mobile connections, etc. For each transaction, the user (e.g., agent, retailer, bank, service provider, etc.) can be faced with competing interests. On one hand, there is a need for the user to provide a satisfactory experience for the customer. On the other hand, financial considerations and legal requirements favor the prevention of fraud, identity theft, money laundering, and the like when conducting transactions.

For some transactions (e.g., cash-based transactions), proof of identity for the customer is not always requested. For other transactions where identification of the customer is requested, the identity of the customer is not always confirmed. Furthermore, it is common that the identity of the customer is not associated or otherwise tied intrinsically with the transaction. By way of example, the user may request and be presented with a proof of identification from the customer during a transaction. Typically, the user may confirm that the proof of identification corresponds to the customer, e.g., is the same name as appears on a credit card provided by the customer. However, the user typically has no way of confirming that the proof of identification provided by the customer is authentic.

Thus, there is a need to confirm the identification of a user of a transaction, perform a multi-factor authentication and further to associate the customer identification with the transaction.

Summary of a Point of Transaction Device with Multi-Factor Authentication

In one set of illustrative embodiments, a point of transaction device is configured to include a user input module configured to receive customer input regarding a transaction, an identification capture module configured in one mode to capture biometric data and in a second mode an image of an identification document, a communication module configured to transmit customer input and at least one of the captured biometric data and captured image of identification document to a transaction information server; and On-device memory comprising Customer ID records, transaction request records and authentication rule records.

In a second set of illustrative embodiments, a method for conducting a transaction may include transmitting, from a point of transaction device, a request for a transaction to a transaction information server, the request comprising a transaction amount, a customer identifier code, and an identification parameter that is collected from a party to the transaction contemporaneous to the transaction; receiving, from the transaction information server, a transaction identifier code based on an authentication of the identification parameter; transmitting the transaction identifier code and at least a portion of the request for the transaction to a transaction authority separate from the transaction information server; and receiving an approval for the transaction from the transaction authority, the approval based on the transaction identifier code and the request.

In a third set of illustrative embodiments, a system for conducting a transaction may include at least: a point of transaction device configured to transmit a request for a transaction, the request comprising a transaction amount, a customer identifier code, and an identification parameter that is collected from a party to the transaction contemporaneous to the transaction; and a transaction information server in communication with the point of transaction device to receive the request, authenticate the identification parameter based on a record associated with the customer identifier code, communicate with a transaction authority to establish a transaction identifier code for the transaction, and transmit the transaction identifier code to the point of transaction device.

Brief Description of the Drawings of a Point of Transaction Device with Multi-Factor Authentication A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

Figure 9:
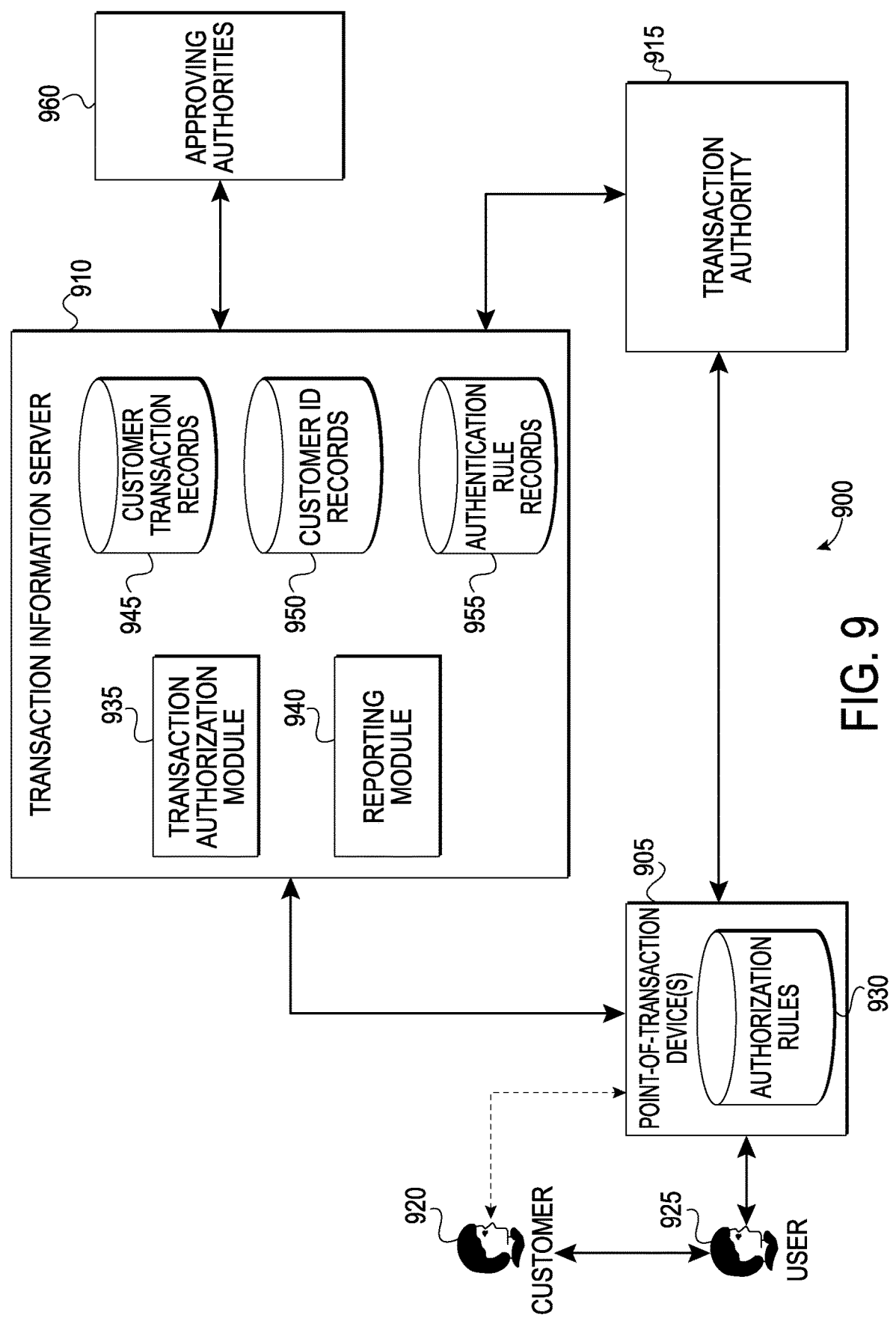
FIG. 9 is a block diagram of an example system including components configured according to various embodiments of the invention.

FIG. 9 is a block diagram of an example system including components configured according to various embodiments of the invention.

Figure 10:
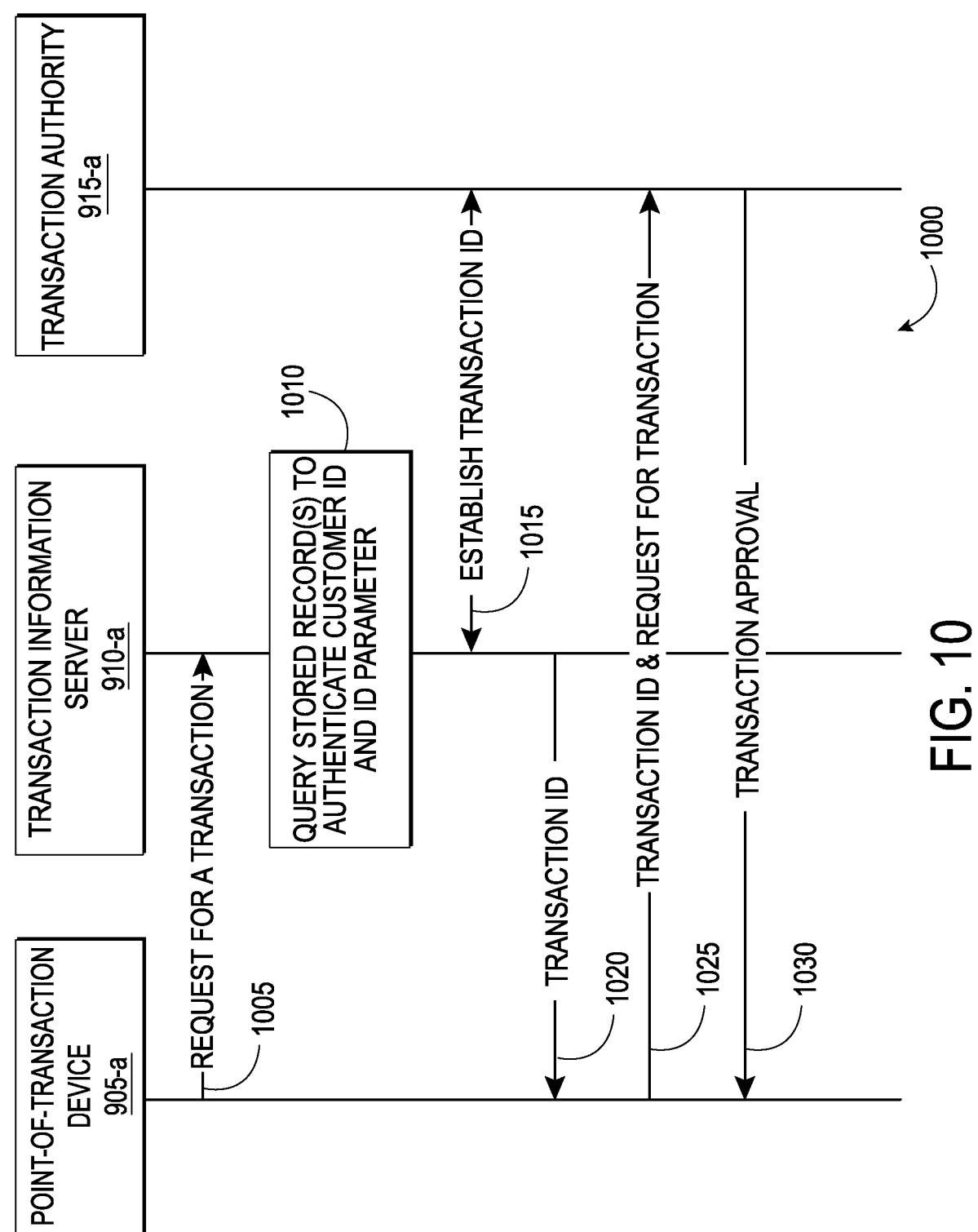
FIG. 10 is a diagram illustrating an exemplary communication flow between components configured according to various embodiments of the invention.

FIG. 10 is a diagram illustrating an exemplary communication flow between components configured according to various embodiments of the invention.

Figure 11:
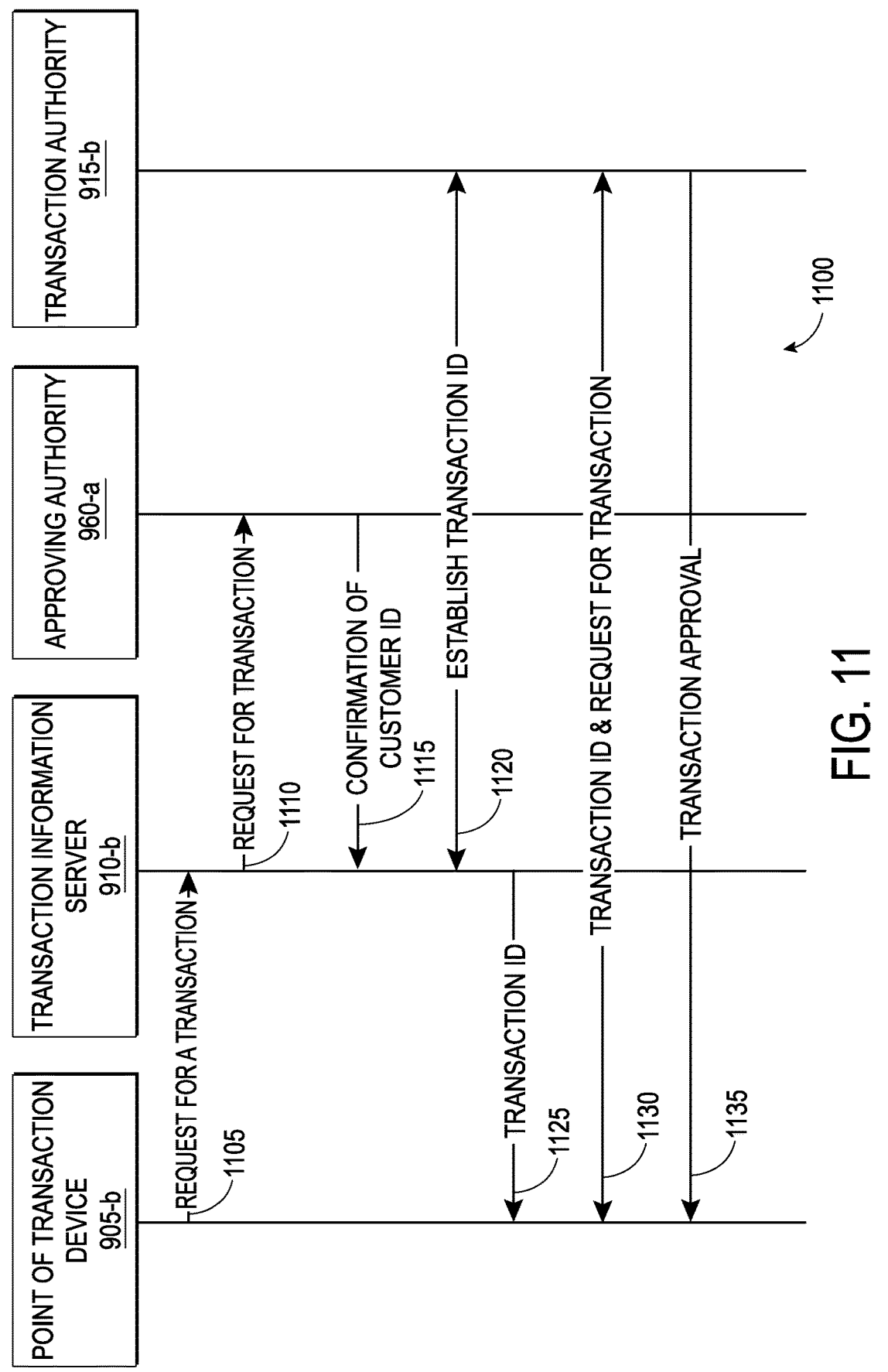
FIG. 11 is a diagram of another exemplary communication flow between components configured according to various embodiments of the invention.

FIG. 11 is a diagram of another exemplary communication flow between components configured according to various embodiments of the invention.

Figure 12:
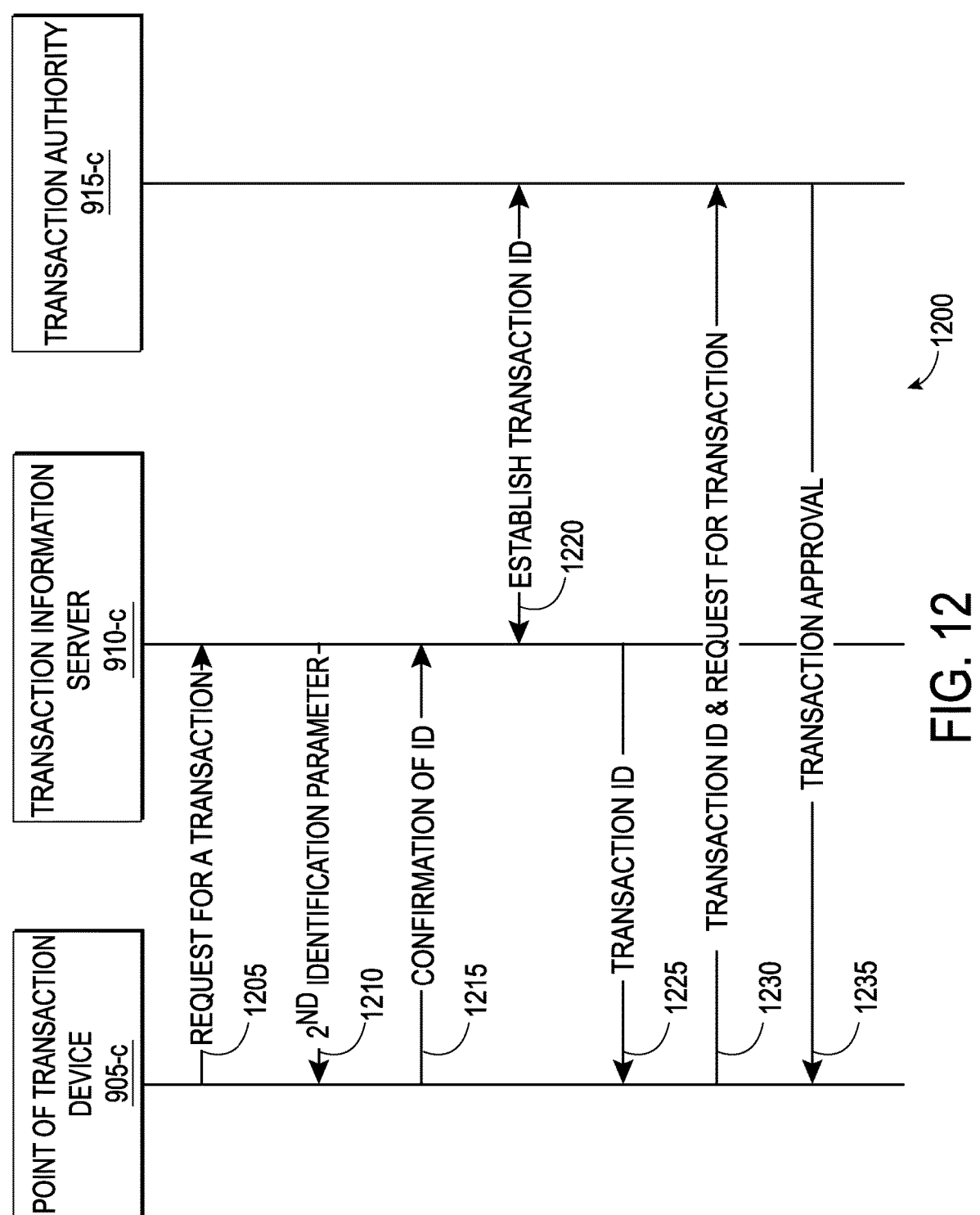
FIG. 12 is a diagram of another exemplary communication flow between components configured according to various embodiments of the invention.

FIG. 12 is a diagram of another exemplary communication flow between components configured according to various embodiments of the invention.

Figure 13:
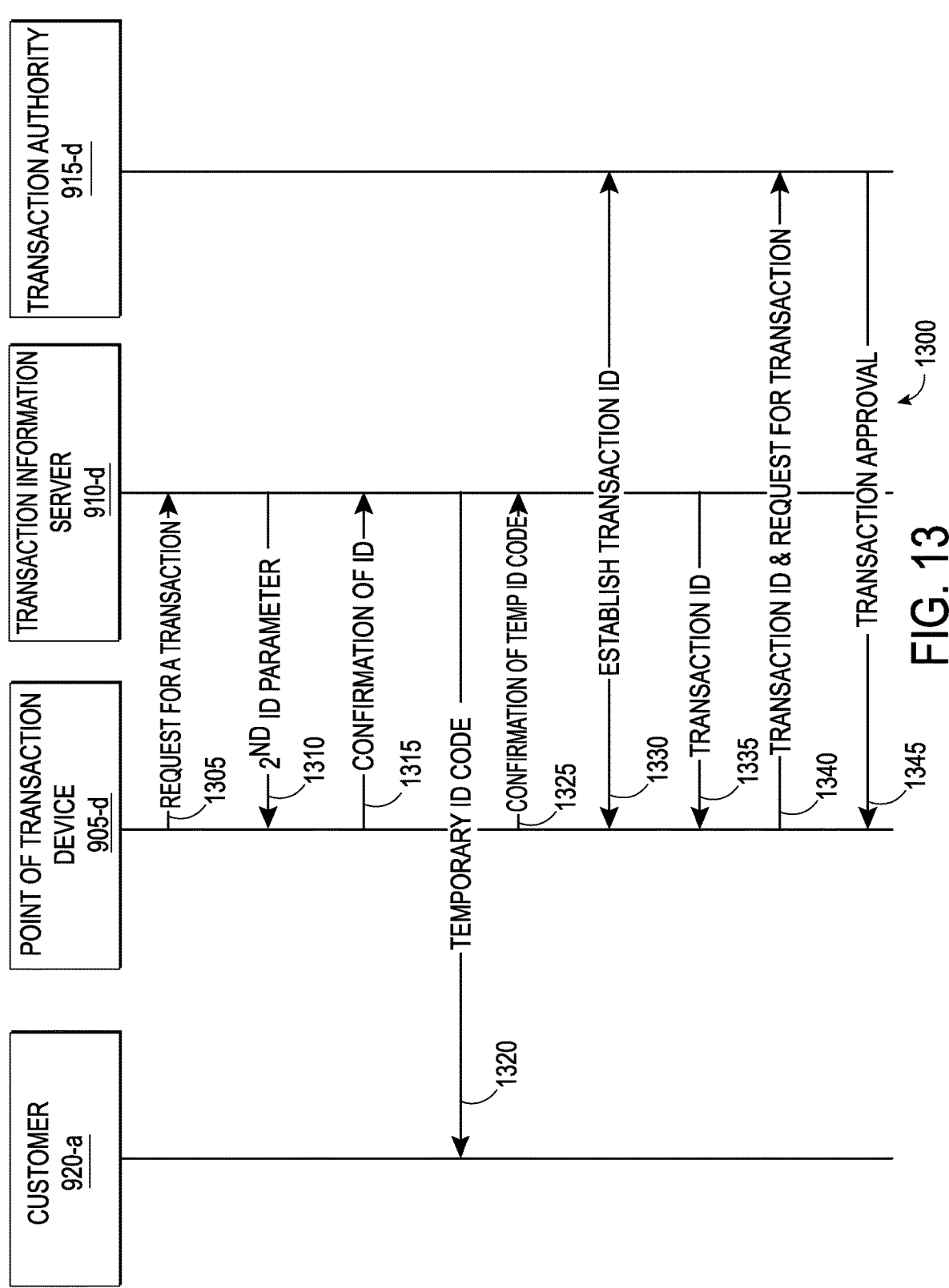
FIG. 13 is a diagram of another exemplary communication flow between components configured according to various embodiments of the invention.

FIG. 13 is a diagram of another exemplary communication flow between components configured according to various embodiments of the invention.

Figure 14:
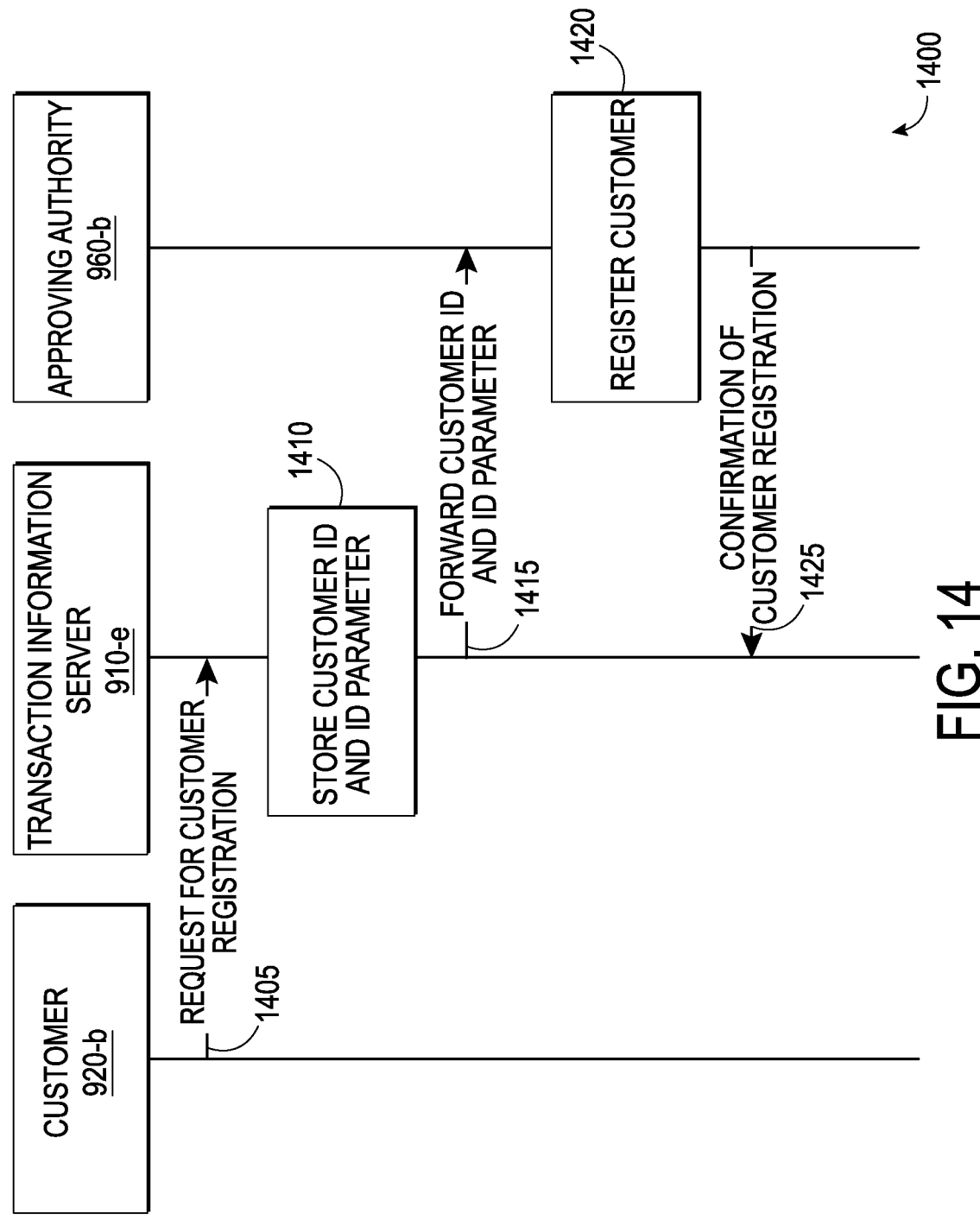
FIG. 14 is a diagram of another exemplary communication flow between components configured according to various embodiments of the invention.

FIG. 14 is a diagram of another exemplary communication flow between components configured according to various embodiments of the invention.

Figure 15:
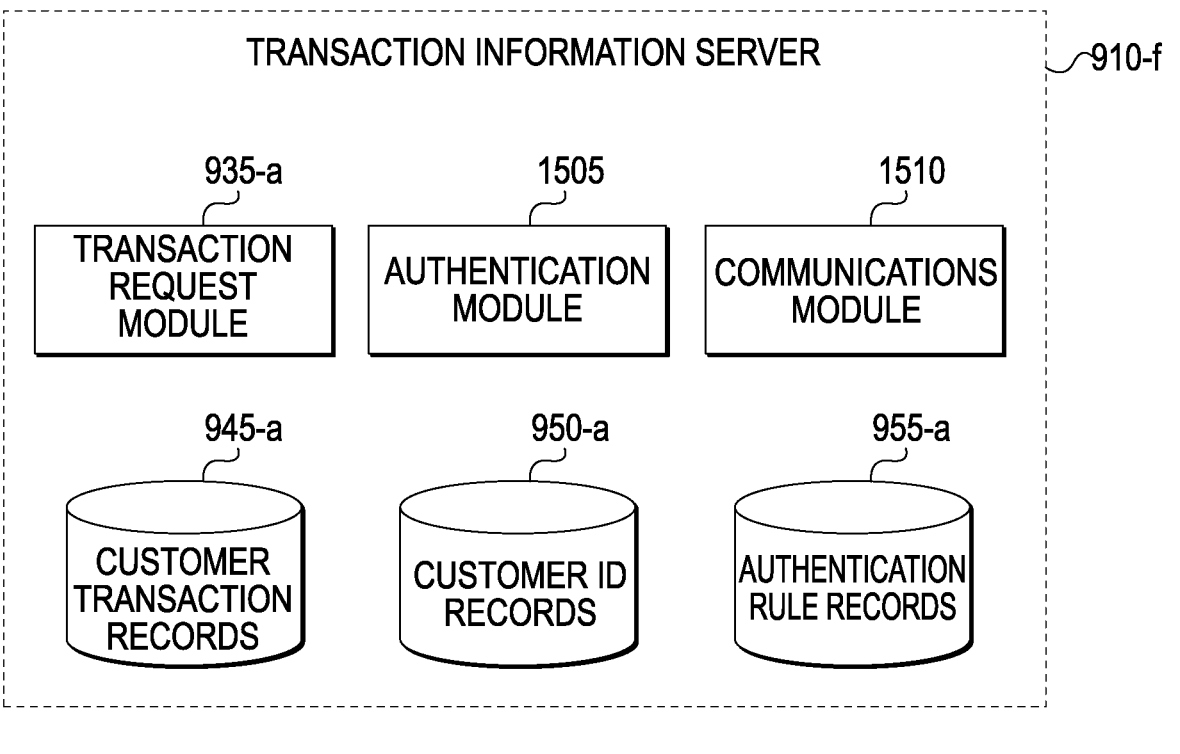
FIG. 15 is a block diagram of an example of a transaction information server according to various embodiments of the invention.

FIG. 15 is a block diagram of an example of a transaction information server according to various embodiments of the invention.

Figure 16:
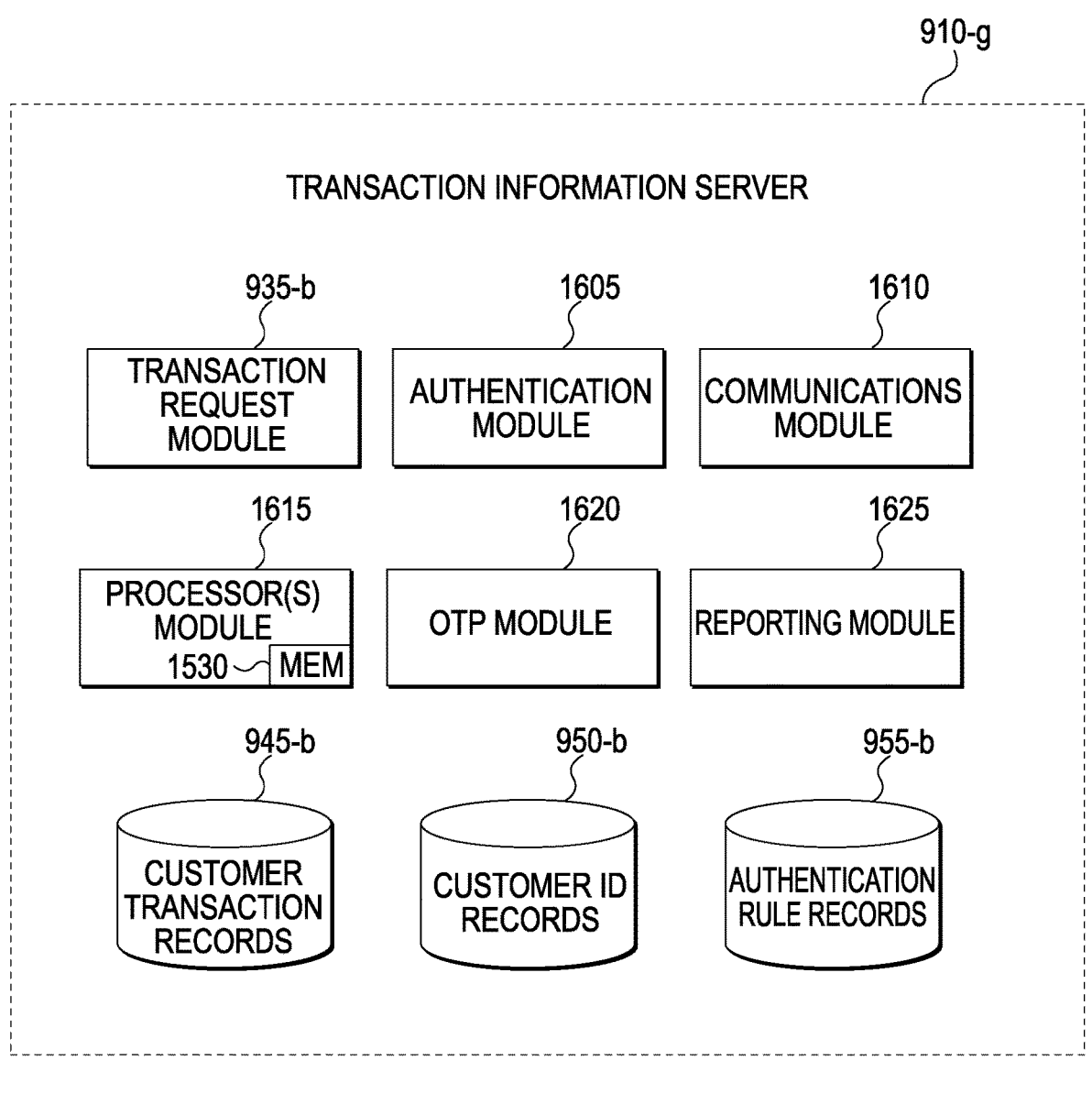
FIG. 16 a block diagram of an example of another transaction information server according to various embodiments of the invention.

FIG. 16 a block diagram of an example of another transaction information server according to various embodiments of the invention.

Figure 17:
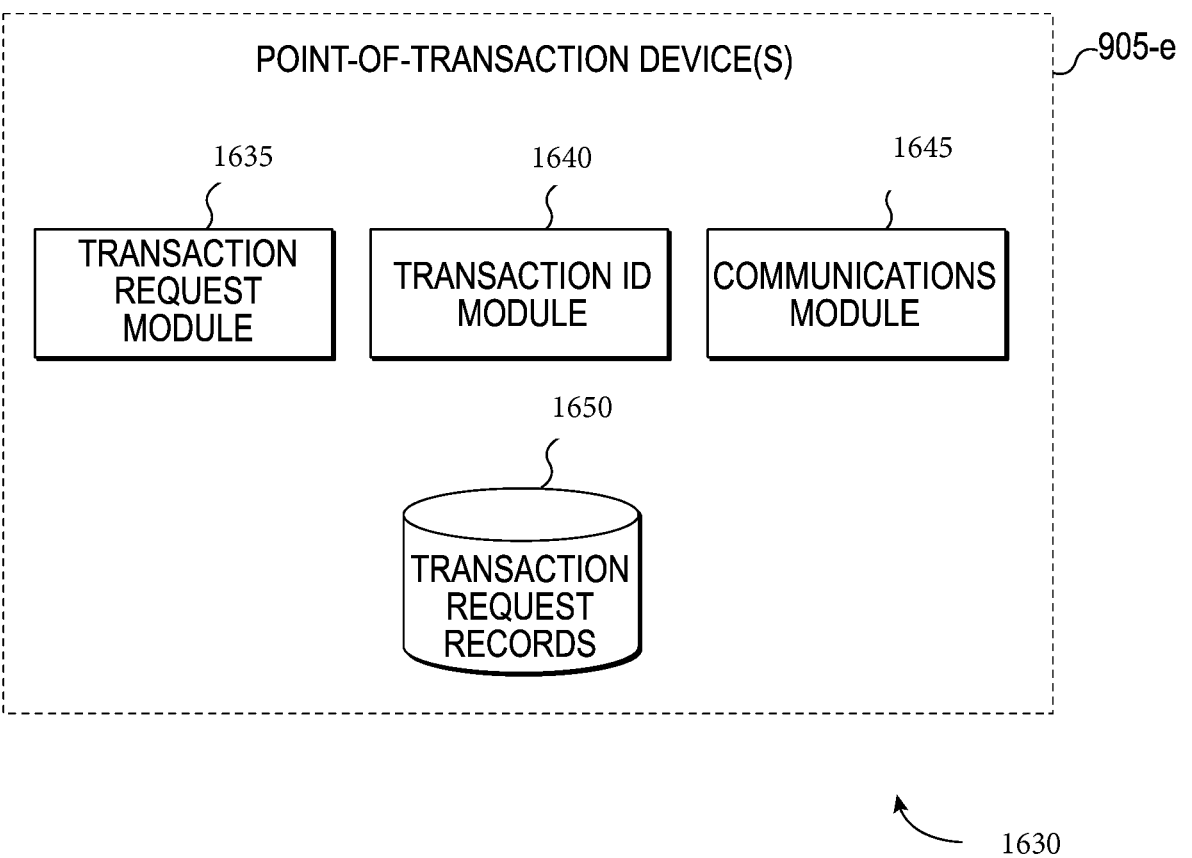
FIG. 17 is a block diagram of an example of a point-of transaction device according to various embodiments of the invention.

FIG. 17 is a block diagram of an example of a point-of transaction device according to various embodiments of the invention.

Figure 18:
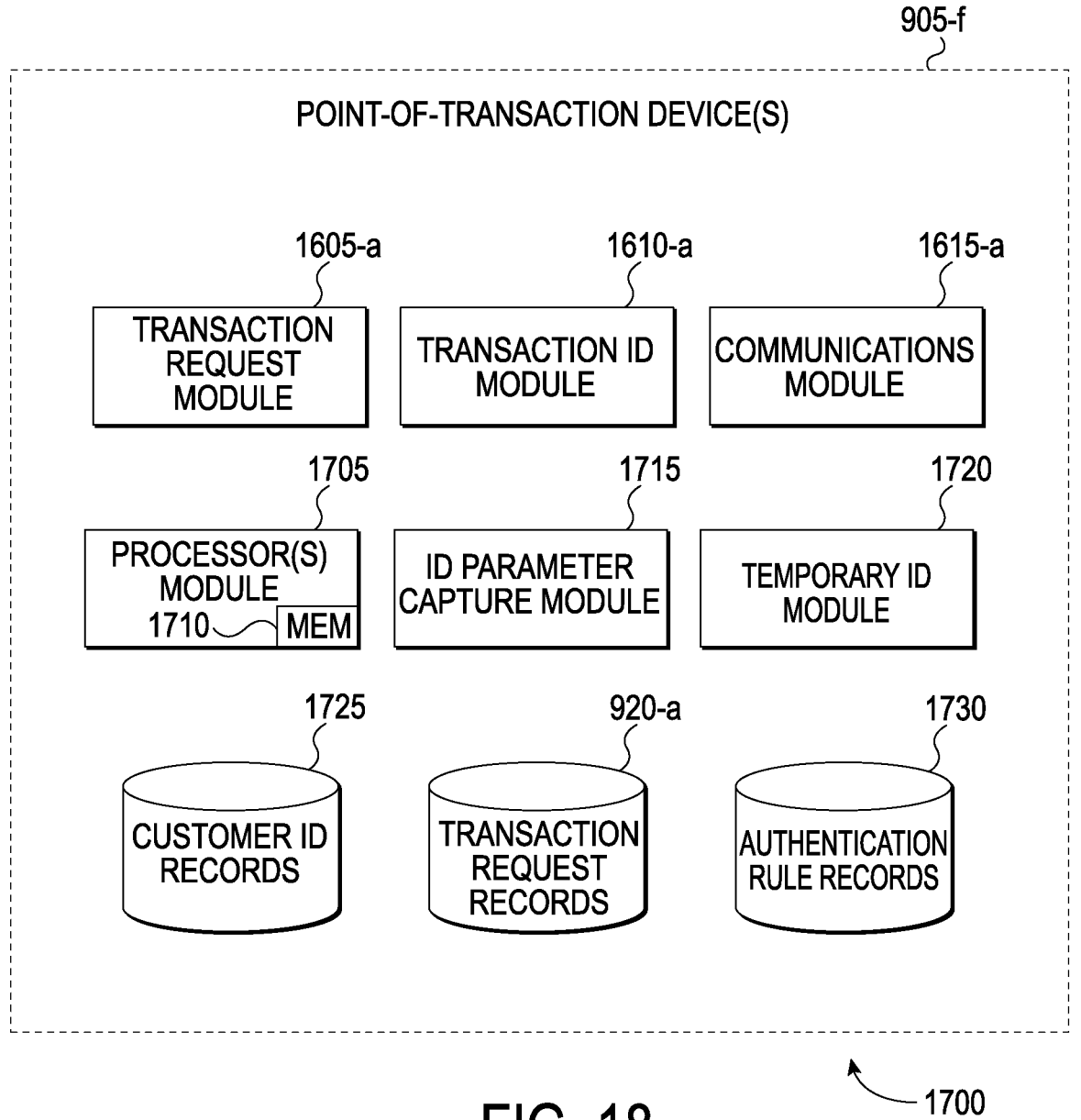
FIG. 18 is a block diagram of another example of a point-of-transaction device according to various embodiments of the invention.

FIG. 18 is a block diagram of another example of a point-of-transaction device according to various embodiments of the invention.

FIG. 19 is a flowchart diagram of an example method of conducting a transaction according to various embodiments of the invention.

FIG. 20 is a flowchart diagram of another example method of conducting a transaction according to various embodiments of the invention.

Figure 21:
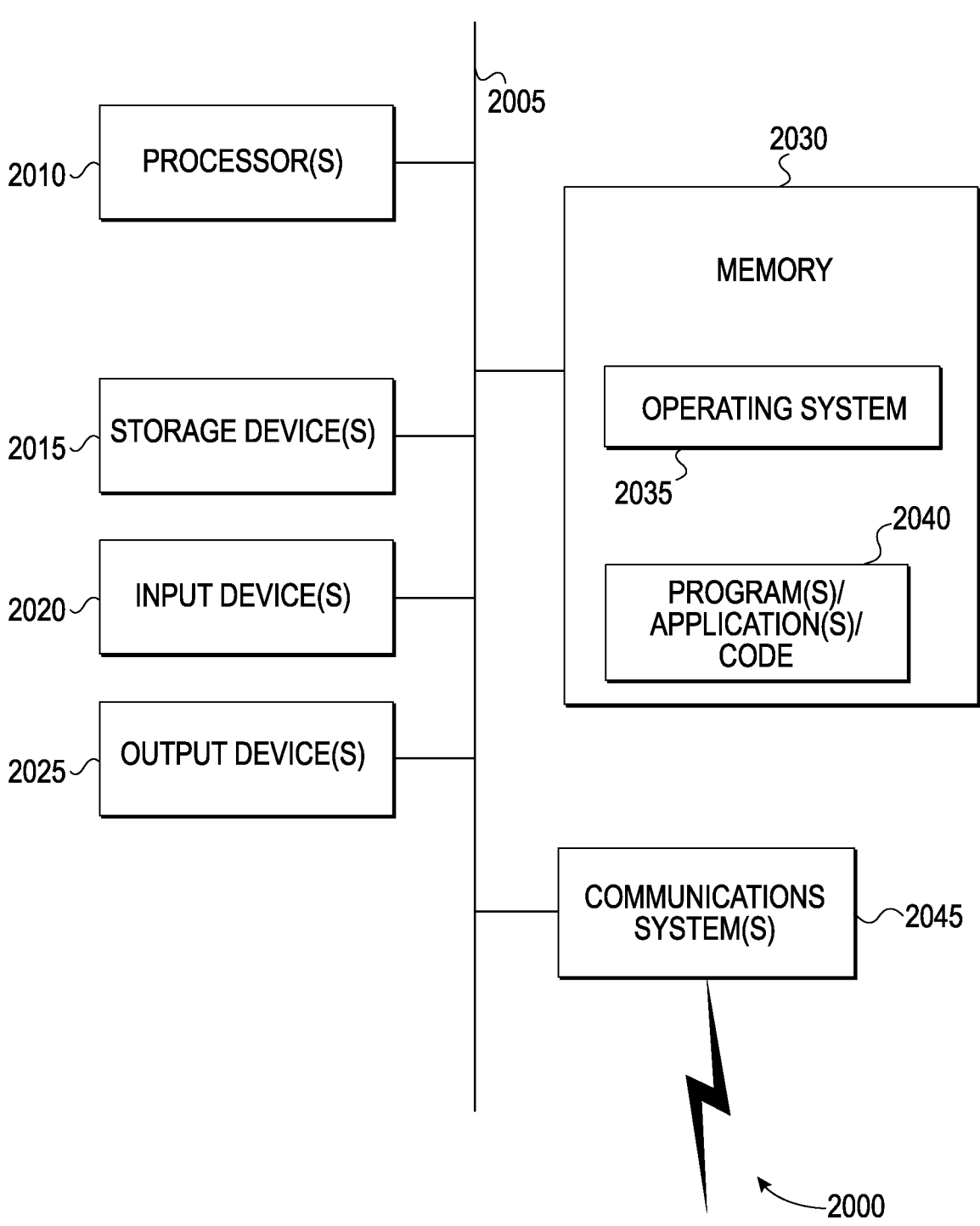
FIG. 21 is a schematic diagram that illustrates a representative device structure that may be used in various embodiments of the present invention.

FIG. 21 is a schematic diagram that illustrates a representative device structure that may be used in various embodiments of the present invention.

Figure 22:
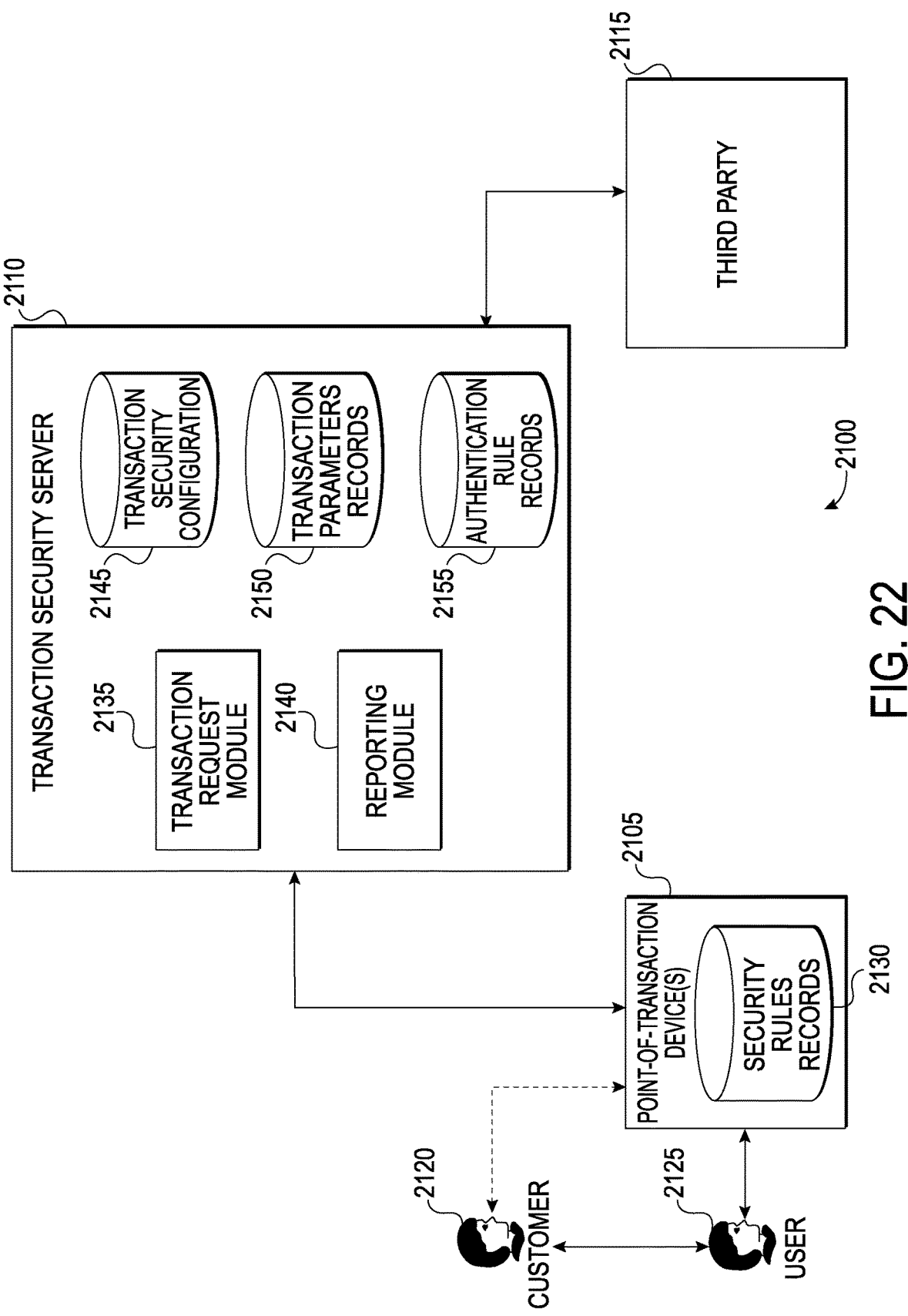
FIG. 22 is a flowchart diagram of an example method of conducting a transaction according to various embodiments of the invention.

FIG. 22 is a flowchart diagram of an example method of conducting a transaction according to various embodiments of the invention.

Detailed Description of a Point of Transaction Device with Multi-Factor Authentication Methods, systems, and devices are disclosed for conducting a transaction that authenticates the identification of the customer and also intrinsically ties the customer identity with the transaction. A transaction information server may be in communication with one or more Point-of-Transaction devices. The point-of-transaction devices can be located proximate to a user and configured to transmit a request for a transaction to the transaction information server. In one example, the point-of-transaction device is configured to permit the user to capture an identification parameter from a customer during the transaction, e.g., an image of an identification card provided by the customer, biometric data associated with the customer, etc. The point-of-transaction device can transmit the identification parameter, along with other associated transaction parameters, to the transaction information server. The transaction information server may utilize the identification parameter along with additional customer identifier data to confirm the identity of the party. According to some embodiments, the transaction information server may communicate with a transaction authority to obtain or establish a transaction identifier code that is associated with the transaction and then return the transaction identifier code to the point-of-transaction device. The user may then submit a request to the transaction authority with the associated transaction identifier code to receive a final authorization for the transaction. According to certain aspects, the transaction is a cash-based transaction.

This description provides examples, and is not intended to limit the scope, applicability or configuration of the invention. Rather, the ensuing description will provide those skilled in the art with an enabling description for implementing embodiments of the invention. Various changes may be made in the function and arrangement of elements.

Thus, various embodiments may omit, substitute, or add various procedures or components as appropriate. For instance, it should be appreciated that the methods may be performed in an order different than that described, and that various steps may be added, omitted or combined. Also, aspects and elements described with respect to certain embodiments may be combined in various other embodiments. It should also be appreciated that the following systems, methods, devices, and software may individually or collectively be components of a larger system, wherein other procedures may take precedence over or otherwise modify their application.

As used herein, the terms "user(s)" and "customer(s)" generally refer to the parties to a transaction. By way of example only, a user may be an individual, an agent, a bank teller, a service provider, a brick-and-mortar business, etc. In some situations, the user may be the party to the transaction that provides certain goods and/or services being exchanged during the transaction. The customer may be an individual, representative of a company, a group of individuals, etc. In some situations, the customer is the party to the transaction that seeks to receive the goods and/or services being provided by the user. According to one example, the user may be an agent at a money transfer business where the customer is an individual seeking to transfer money. According to another example, the user may be an agent of a government agency charged with distributing government subsidies where the customer is an individual seeking to receive the subsidies.

As used herein, the term "transaction" refers to any exchange between a user and a customer. The transaction may be monetary or non-monetary based. The transaction may be for money, for services, for information, etc. According to some examples, the transaction may be a one-way transaction, e.g., a money transfer exchange where the customer provides money to an agent to be transferred to a different location. In that instance, a second user and customer may complete another transaction at the remote location. Furthermore, a transaction is not limited to a single user and/or a single customer.

The Point of Transaction System comprises two major components, a configurable front end application that can run on a browser and enables data collection for onboarding customers for financial services. This is used to replace paper processes for customer onboarding and customer management with Mobile applications. Know Your Customer processes are integrally built in including biometrics and signatures. The system is configurable to be able to collect the data necessary for transacting—this may include Text, Numbers, Images, Signatures, and Biometrics (Fingerprint, Face, Voice and Iris). The configurable front end connects to a back-end software client in order to enable peripherals management and data management. Systems, devices, methods, and software are described for transaction processing in a system of networked devices.

FIG. 9 illustrates an example system 900 configured for transaction processing according to embodiments of the present disclosure. The system 900 includes a Point-of Transaction device(s) 905, a transaction information server 910, a transaction authority 915, and approving authorities 960. Each of these components may be in communication, directly or indirectly, via one or more of a wired and/or a wireless communications channel.

In the example of FIG. 9, the point-of-transaction device 905 is located proximate a customer 920 and/or a user 925. For example, the point-of-transaction device 905 may be located in a business establishment operated by the user 925. Generally, the point-of-transaction device 905 may be configured to permit the user 925 to input, capture, transmit, and/or receive parameters related to the transaction. The point-of-transaction device 905 may be configured to permit the user 925 to input or capture a request for a transaction that includes a transaction amount, a customer identifier code relating to the customer 920, and an identification parameter.

The transaction amount may include information or data indicative of the monetary amount involved in the transaction (e.g., the dollar amount) or some other information indicative of the item/service being exchanged during the transaction. As noted, a transaction may not necessarily involve the exchange of monetary funds. According to one example, the transaction may be for the distribution of government subsidies to individuals. In that example, the transaction amount may refer to the quantity of subsidies issued to the customer 920.

The customer identifier code may include information provided by the customer to initially identify the customer. For example, the customer identifier code may be a name, an address, a telephone number, a uniquely assigned customer ID number, etc., that is received from the customer 920 during the transaction.

The identification parameter may include information captured from the customer 920 during the transaction. For example, the point-of-transaction device 905 may be configured to capture an image, a voice print, a fingerprint, or any other form of biometric data from the customer 920 contemporaneous to the transaction. Also, or alternatively, the point-of-transaction device 905 may be configured to capture an image of an identification card provided by the customer 920 as proof of identity, e.g., an image of the customer 920ⓢ drivers license, government issued identification card, etc. As indicated by the dashed line, the customer 920 may input some of the information into the point-of-transaction device 105 during the transaction process.

The identification parameter may be collected from the customer 920 as a part of the transaction, i.e., contemporaneous to the transaction. As indicated by the dashed line, certain embodiments permit the customer 920 to input some of the parameters associated with the transaction into the point-of-transaction device 905.

The point-of-transaction device 905 is communicatively coupled to the transaction information server 910 via one or more of a wired and/or a wireless communication channel. For a given transaction, the point-of-transaction device 905 may transmit the request for the transaction to the transaction information server 910 via at least one of the communications channels.

The transaction information server 910 may include a transaction authorization module 935, a reporting module 940, a customer transaction records 945, a customer ID records 950, and a authentication rule records 955. Each of these components may be communicatively coupled via, for example, a common bus or other communications channel. The transaction information server 910 may be communicatively coupled with a number of point-of-transaction devices 905 (only one being shown in FIG. 9 for clarity), the transaction authority 915, and the approving authorities 960. Broadly, the transaction information server 910 may be configured to receive the request for a transaction from the point-of-transaction device 905, authenticate or otherwise confirm the identity of the customer based on the identification parameter and the customer identifier code, establish a transaction identifier code for the transaction, and return the transaction identifier code to the point-of-transaction device 905. The transaction information server 910 may be implemented by a single server device or by a number of related components interconnected over a network.

The customer transaction records 945 may be electronic records stored in memory and include information related to, for example, current or previous transactions for each customer 920. As one example, the customer transaction records may include information relating to all the transactions that a particular customer 920 has been a party to. Accordingly, the transaction information server 910 can associate the identity of the customer 920 with the other transaction parameters as well as determine that customer transaction history. In certain examples, the customer transaction records 945 may be organized by customer identifier code.

The customer ID records 950 may be electronic records stored in memory and include information related to a plurality of customers 920. For example, the customer identifier code contained in the request for the transaction can be the name of the customer 920. In this example, the customer ID records 950 may include an address, telephone number, date of birth, etc, for the customer 920 identified by the customer identifier code. Additionally or alternatively, the customer ID records 950 may include biometric information related to the customer 920, e.g., an image of the customer 920, a fingerprint of the customer 920, etc. According to further embodiments, when the customer transaction records 945 and/or the customer ID records 950 do not have a record stored for a customer identifier code received in a transaction request, the transaction information server 910 may also be configured to create and store a record for that customer 920 as a part of an initial registration process. Alternatively, when no records exist for the customer 920, the transaction information server 910 may enter into a customer registration process before establishing the transaction identifier code.

The authentication rule records 955 may be electronic records stored in memory and include information related to predetermined rules for given transactions. Generally, it can be appreciated that restrictions exist relating to certain transaction types, amount, frequency, etc. For example, certain rules may prohibit or control the transfer of currency, or a predetermined amount of currency, in to or out of a particular geographic region. Other rules may prohibit or control the ability of certain customers 920 to participate in some transactions (e.g., prohibit a convicted felon from purchasing a gun). Even further, some rules may limit the frequency of transactions for a particular customer 920 within a given time period (e.g., the number of times a customer 920 may be distributed certain items or provisions). The authentication rule records 955 include information relating to such transaction rules which can be utilized by each transaction as an additional form of transaction security and fraud prevention.

Each of the records 945, 950, and/or 955 may be stored in memory, in one or more database(s), etc., either locally or remotely from the transaction information system 900.

The transaction authorization module 935 includes logic, hardware, or the like to receive a request for a transaction, the request including the transaction amount, the customer identifier code, and the identification parameter. The transaction authorization module 935 may access the customer ID records 950 to retrieve information associated with the customer identifier code. According to some embodiments, the transaction authorization module 935 may compare certain of the retrieved information with the identification parameter to confirm the identity of the customer 920. For instance, if the identification parameter is an image of the customer 920 that is captured contemporaneous to the transaction, the transaction authorization module 935 may retrieve a stored image from the customer ID records 950 that is associated with the customer identifier code and use a facial recognition algorithm to confirm the identity the customer 920. Other aspects may provide for the confirmation based on fingerprint comparison. If the algorithm cannot confirm the identity of the customer 920, the transaction authorization module may reject that transaction or flag the transaction for manual review for identity confirmation.

Other embodiments may provide for the transaction authorization module 935 to access records from the customer transaction records 945 and/or the authentication rule records 955 to determine whether the customer 920 is authorized to engage in the transaction. As one example, if the customer transaction records 945 indicate that the customer 920 has engaged in four similar transactions types within a predetermined time period and the authentication rules records 955 indicate that a given customer is only permitted to engage in that type of transaction four times within the predetermined time period, the transaction authorization module 935 may determine that the customer 920, even though their identity has been confirmed, is rejected for that transaction.

Other embodiments may provide for the transaction information server 910 to communicate with the approving authorities 960 to confirm the identity of the customer 920. That is, the transaction authorization module 935 may communicate information for the customer 920 associated with the customer identifier code along with the identification parameter to the approving authority 960. According to some embodiments, the approving authority 960 accesses the information on the transaction information server 910 via a series of web pages or other network communications, for example, to confirm the identity of the customer 920. The approving authority 960 may review the information and, in some instances, additional information maintained by the approving authority 960, to confirm the identity of the customer 920. According to even further embodiments, multiple approving authorities 960 may be utilized to confirm the identity of the customer 920. Each of the multiple approving authorities 960 may confirm certain aspects of the identity of the customer 920 in a hierarchical manner where a first approving authority 960 confirms a first aspect before a second approving authority 960 confirms a second aspect. Other embodiments may provide for the second approving authority 960 to re-confirm the identity component confirmed by the first approving authority 960 as an anti-fraud measure. A confirmation signal may be provided to the transaction information server 910 by the approving authorities 960 after the customer 920 identification is confirmed.

Once the identity of the customer 920 has been confirmed and, when applicable, the customer 920 has been determined eligible for the transaction, a transaction identifier code can be established for the transaction. According to certain embodiments, the transaction information server 910 may establish the transaction identifier code and communicate the transaction identifier code to the point-of-transaction device 905. According to other embodiments, the transaction information server 910 can communicate with the transaction authority 915 to establish the transaction identifier code. In still other examples, the transaction information server 910 and the transaction authority 915 may separately determine the same transaction identifier code for a transaction based on a shared convention or protocol.

By way of example only, the transaction authority 915 may be a credit card issuing company. In this example, the transaction information server 910 can communicate information to the transaction authority 915 indicating that the identity of the customer 920 has been confirmed and, when applicable, that the customer 920 is not otherwise prohibited from engaging in the transaction. In return, the transaction authority 915 may issue the transaction identifier code to the transaction information server 910.

The transaction information server 910 may communicate the transaction identifier code to the point-of-transaction device 905. The point-of-transaction device 905 may then transmit the received transaction identifier code to the transaction authority 915, which may recognize the transaction identifier code as a valid transaction identifier code provided by the transaction information server 910. Based on this recognition, the transaction authority may approve the transaction and, in some cases, generate settlement instructions for the transaction.

The reporting module 940 may be configured to generate one or more reports relating to the records stored by the transaction information server 910. Exemplary reports may be for a particular customer 920, for a particular user 925, for a particular transaction type, may be based on one or more predetermined time periods, etc. In other embodiments the reporting module 940 may be configured to dynamically generate custom reports or store one or more predefined reports that can be retrieved for use. The transaction information server 910 may communicate the reports to, for example, the approving authority 960, the user 925, the customer 920, and/or the transaction authority 915. Other aspects provide for the transaction information server to make the reports available via a series of one or more web pages accessible using a web browser.

FIG. 10 is a diagram illustrating an exemplary communication flow 200 for transaction processing in accordance with various embodiments. Communication flow 200 may be used, for example, by the point-of-transaction device 905, the transaction information server 910, and the transaction authority 915 of FIG. 9 for transaction processing.

At 1005, the point-of-transaction device 905-*a* communicates a request for a transaction to the transaction information server 910-*a* via one or more communications channels. The transaction request may include a transaction amount, a customer identifier code, and an identification parameter. At 1010, the transaction information server 910-*a* authenticates the identity of the customer based on the customer identifier code and the identification parameter. For example, the transaction authorization module 935 may query any or all of the customer transaction records 945, the customer ID records 950, and/or the authentication rule records 955 to confirm the identity of the customer and, when necessary, confirm that the customer is authorized to engage in the transaction.

Once the identity of the customer is confirmed, at 1015 the transaction information server 910-*a* establishes the transaction identifier code. As discussed, the transaction information server 910-*a* may establish the transaction identifier code. In the exemplary communication flow 200, however, the transaction information server 910-*a* communicates with the transaction authority 915-*a* to establish the transaction identifier code. At 1020, the transaction information server 910-*a* communicates the transaction identifier code to the point-of-transaction device 905-*a*. It can be appreciated that, for certain transaction types, the point-of-transaction device 905 may approve and complete the transaction based on receipt of the transaction identifier code. For example, for a cash-based transaction, receipt of the transaction identifier code indicates that the identity of the customer has been confirmed, that the customer is authorized to engage in the transaction, and that a record associating the customer with the transaction has been stored by the transaction information server 910-a. Accordingly, the point-of-transaction device 905-a completes the transaction between the user and the customer.

In certain examples, one or more related devices associated with a merchant or service provider at the point of transaction may implement the functionality of the point-of-transaction device 910-a. For example, in certain examples a merchant may have a terminal for communicating with the transaction authority 915-a over a first network connection and a mobile device (e.g., a smartphone, tablet, special-purpose device, etc.) programmed to communicate with the transaction information server 910-a over a second network connection. In this case, the merchant may provide 1005 the transaction request to the transaction information server 910-a and receive the transaction ID 1020 from the transaction information server 910-a using the mobile device, and then provide 1025 the transaction ID to transaction authority 915-a and receive 1030 the transaction approval using the merchant terminal. In this way, the additional protections, security, and record-keeping of the transaction information server 910-a may be integrated into the transactions conducted by the merchant without need of updating the terminal for communicating with the transaction authority 915-a.

According to certain transaction types (e.g., credit/debit card transactions, subsidy distribution, etc.), the point-of-transaction device 905-a may communicate with the transaction authority 915-a before completing the transaction. That is, while the transaction information server 910-a may confirm the identity of the customer, determine whether the customer is authorized to engage in the transaction, and/or associate the customer identity with the transaction, the transaction information server 910-a may not, in some circumstances, provide the final authorization for the transaction. In the example discussed above, the transaction authority 915-a may be a credit card issuing company where the transaction authority 915-a authorizes the charge to the customer credit card. This example is illustrated at 1025 where the point-of-transaction device 905-a communicates at least a portion of the transaction request and the transaction identifier code to the transaction authority 915-a. At 1030, the transaction authority 915-a communicates the transaction approval confirmation signal to the point-of-transaction device 905-a.

FIG. 11 is a diagram illustrating an exemplary communication flow 1100 for transaction processing in accordance with various embodiments. Communication flow 1100 may be used, for example, by the point-of-transaction device 905, the transaction information server 110, the transaction authority 915, and the approving authority 960 of FIG. 9 for transaction processing. Generally, the communication flow 1100 illustrates the circumstance where the separate approving authority 960-a confirms, in whole or in part, the identity, qualifications, or eligibility of the customer with respect to the transaction.

At 1105, the point-of-transaction device 905-b communicates the request for a transaction to the transaction information server 910-b. At 1110, the transaction information server 110-b communicates at least a portion of the transaction request to the approving authority 960-a. In some examples, the transaction information server 110-b queries the customer ID records 950 using the customer identifier code to retrieve additional information associated with the customer. The transaction server 110-b may forward at least a portion of the retrieved customer information along with the identification parameter from the transaction request to the approving authority 960-a. The approving authority 960-a may utilize the communicated information to confirm the identity of the customer. In some examples, the approving authority utilizes multiple levels of approval authority wherein each level is approved before the next level approves the confirmation of the identity. At 1115, the approving authority 960-a communicates a signal to the transaction information server 110-b indicating confirmation of the customer identification.

At 1120, the transaction information server 910-b communicates with the transaction authority 915-b to establish the transaction identifier code. The transaction information server 110-b communicates the transaction identifier code to the point-of-transaction device 905-b at 1125. At 1130, the point-of-transaction device 905-b communicates at least a portion of the transaction request along with the transaction identifier code to the transaction authority 915-b for final authorization. At 1135, the transaction authority 915-b communicates a confirmation signal to the point-of-transaction device 905-b indicating that the transaction is approved.

FIG. 12 is a diagram illustrating an exemplary communication flow 1200 for transaction processing in accordance with various embodiments. Communication flow 1200 may be used, for example, by the point-of-transaction device 905, the transaction information server 910, and the transaction authority 915 of FIG. 9 for transaction processing. Generally, the communication flow 1200 illustrates the circumstance where a second identification parameter is communicated to the point-of-transaction device 905-c for further identity confirmation by a merchant or service provider associated with the point of transaction device 905-b.

At 1205, the point-of-transaction device 905-c communicates the request for a transaction to the transaction information server 110-c. At 1210, the transaction information server 110-c communicates a second identification parameter to the point-of-transaction device 905-c. According to certain embodiments, the transaction information server 110-c may query the customer ID records 950 using the customer identifier code to retrieve the second identification parameter associated with the customer. In some examples, the second identification parameter may be an image of the customer associated with the customer identifier code. The image associated with the customer identifier code may be returned to the point-of-transaction device 905-c at 1210 where the user 925 can compare the image to the customer 920 to confirm the identity of the customer. At 1215, the point-of-transaction device 905-c communicates a confirmation signal to the transaction information server 110-c confirming the identity of the customer.

At 1220, the transaction information server 910-c communicates with the transaction authority 915-c to establish the transaction identifier code. The transaction information server 110-c communicates the transaction identifier code to the point-of-transaction device 905-c at 1225. At 1230, the point-of-transaction device 905-c communicates at least a portion of the transaction request along with the transaction identifier code to the transaction authority 915-c for final authorization. At 1235, the transaction authority 915-c communicates a confirmation signal to the point-of-transaction device 905-c indicating that the transaction is approved.

FIG. A13 is a diagram illustrating an exemplary communication flow 1300 for transaction processing in accordance with various embodiments. Communication flow 1300 may be used, for example, by the point-of-transaction device 905, the transaction information server 910, and the transaction authority 915 of FIG. 9 for transaction processing. Generally, the communication flow 1300 illustrates the circumstance where a second identification parameter is returned to the point-of-transaction device 905 and also where a temporary ID code is communicated to the customer 920-*a* as additional forms of identity confirmation.

At 1305, the point-of-transaction device 905-*d* communicates the request for a transaction to the transaction information server 910-*d*. At 1310, the transaction information server 110-*d* communicates a second identification parameter to the point-of-transaction device 905-*d*. The transaction information server 110-*d* may retrieve the second identification parameter by querying the customer ID records 950 using the customer identifier code included in the transaction request. The second identification parameter may be an image of the customer associated with the customer identifier code. The image may be returned to the point-of-transaction device 905-*d* where the user can confirm the identity of the customer. At 1315, the point-of-transaction device 905-*d* communicates a confirmation signal to the transaction information server 910-*d* confirming the identity of the customer.

At 1320, the transaction information server 910-*d* communicates a temporary ID code to the customer 920-*a*. In some embodiments, the transaction information server 910-*d* may also retrieve from the records additional contact information for the customer associated with the customer identifier code (e.g., a telephone number and/or an e-mail address). Utilizing the contact information, the transaction information server 910-*d* may establish a temporary ID code, e.g., a one-time personal identification number (OTP), for the transaction and communicate the code to the customer as a text message or e-mail, for example. The customer 920-*a* may provide the temporary ID code to the user 925 to be input to the point-of-transaction device 905-*d* or the customer 920-*a* may input the temporary code into the point-of-transaction device 905-*d* directly. At 1325, the point-of-transaction device 905-*d* communicates a confirmation signal to the transaction information server 910-*d* confirming the temporary ID code was received by the customer during the transaction. The confirmation signal may be the temporary identification code where the transaction information server 910-*c* confirms that the correct temporary identification code is returned. As can be appreciated, use of the temporary ID code provides yet another form of identification verification according to various embodiments. Furthermore, it should be understood that the use of a temporary ID in this manner may be integrated into one or more of the communication flows described with reference to the other Figures of the present specification, or other embodiments of the principles described herein, to add an additional layer of security to the transaction.

At 1330, the transaction information server 910-*d* communicates with the transaction authority 915-*d* to establish the transaction identifier code. The transaction information server 910-*d* communicates the transaction identifier code to the point-of-transaction device 905-*d* at 1335. At 1340, the point-of-transaction device 905-*d* communicates at least a portion of the transaction request along with the transaction identifier code to the transaction authority 915-*d* for final authorization. At 1345, the transaction authority 915-*d* communicates a confirmation signal to the point-of-transaction device 905-*d* indicating that the transaction is approved.

FIG. 14 is a diagram illustrating an exemplary communication flow 1400 for transaction processing in accordance with various embodiments. Communication flow 1400 may be used, for example, by the point-of-transaction device 905, the transaction information server 910, and the transaction authority 915 of FIG. 9 for transaction processing. Generally, the communication flow 1400 illustrates the circumstance where a customer 920-*b* pre-registers with the transaction information server 910-*e* and/or the approving authority 960-*b*.

At 1405, the customer 920-*b* submits a request for customer registration to the transaction information server 910-*e*. The registration request may include information associated with the customer 920-*b*, e.g., the customer name, address, home/mobile telephone numbers, e-mail addresses, and the like. According to some embodiments, the request may include biometric information associated with the customer 920-*b*, e.g., an image of the customer, a fingerprint scan of the customer, and the like. According to even further embodiments, the registration request may include an image of an identification card of the customer, e.g., the customer drivers license and/or a government issued identification card.

At 1410, the transaction information server 910-*e* stores the customer identification data as well as the identification parameter submitted by the customer 920-*b*. In some examples, the transaction information server 910-*e* creates one or more records for the customer 920-*d* in memory. At 1415, the transaction information server 910-*e* may forward at least a portion of the registration request from the customer 920-*b* to the approving authority 960-*b*. In certain examples, the transaction information server 910-*e* may forward all of the customer identification data as well as the identification parameters to the approving authority 960-*b*. At 1420, the approving authority 960-*b* registers the customer 920-*b* based on the received registration request. According to certain embodiments, the approving authority 960-*b* authenticates the information submitted in the registration request based on comparison with one or more internal or external information sources containing identification data associated with the customer 920-*b*. Exemplary information sources include, but are not limited to, customer databases maintained by the transaction authority 915, information stores maintained by one or more government agencies, and the like.

At 1425, the approving authority 960-*b* communicates a confirmation signal to the transaction information server 910-*e* indicating that the customer has been registered. As can be appreciated, if the approving authority 960-*b* cannot confirm the identity of the customer based on the information in the registration request, the approving authority 960-*b* may withhold the confirmation signal 1425. According to some embodiments, in the case where the registration cannot be confirmed, the transaction information server 910-*e* and/or the approving authority 960-*b* may contact the customer 920-*b* and request that the customer visit a local agent (e.g., the user 925) to submit additional information and/or clarify certain information.

FIG. 15 is a block diagram 1500 of an example transaction information server 910-*f* for transaction processing in accordance with various embodiments of the present disclosure. The transaction information server 910-*f* may implement aspects and/or components of the transaction information servers 910 of FIGS. 9-14 as well as implementing aspects of communication flows 1000, 1100, 1200, and/or 1300. The transaction information server 910-*f* may be implemented in whole, or in part, as a processor.

Transaction information server 910-*f* includes a transaction request module 935-*a*, an authentication module 1505, a communications module 1510, a customer transactions records 945-*a*, a customer ID records 950-*a*, and an authentication rule records 955-*a*, which each may be in communication, directly or indirectly, with each other. The communications module 1510 may be configured to communicate via one or more communications channel(s). The one or more communications channels may be wired, wireless, or a combination of wired and wireless communications channels. The communications module 1510 may be configured to permit the transaction information server 910-*e* to operatively communicate with the point-of-transaction device 905, the transaction authorities 915, and/or the approving authority 960. The communications module 1510 may communicate with the point-of-transaction device 905, for example, via a first communications channel (e.g., wirelessly via a cellular network) and communicate with the transaction authority via a second communications channel (e.g., wired via the Internet). The transaction request module 935-*a* may be configured to receive the request for a transaction from the point-of-transaction device 905 (via the communications module 1510). The transaction request may include the transaction amount, the customer identifier code, and the identification parameter that is captured contemporaneously with the transaction.

The transaction request module 935-*a* may communicate with the customer ID records 950-*a* to retrieve additional information associated with the customer identifier code. The transaction request module 935-*a* and/or the authentication module 1505 may be configured to utilize the customer identifier code, the identification parameter, and the additional information retrieved from the customer ID records 950-*a* to authenticate (or confirm) the identity of the customer. Upon authentication or confirmation of the identity of the customer (e.g., using the identification parameter) or the customer|s| eligibility with respect to the transaction, the transaction information server 910-*e* may communicate, via communications module 510, with the transaction authority to establish a transaction identifier code for the transaction based on the authentication of the identification parameter. According to certain embodiments, the transaction request module 935-*a* and/or the authentication module 1505 may be configured to query the customer transaction records 945-*a* and/or the authentication rules records 955-*a* to determine whether the identified customer is authorized to engage in the transaction.

FIG. 16 a block diagram 1600 of another example transaction information server 910-*g* for transaction processing in accordance with various embodiments of the present disclosure. The transaction information server 910-*g* may implement aspects and/or components of the transaction information servers 910 of FIGS. 9-15 as well as implementing aspects of communication flows 1000, 1100, 1200, and/or 1300. Aspects of the transaction information server 910-*g* may be a processor.

Transaction information server 910-*g* includes a transaction request module 935-*b*, an authentication module 1605, a communications module 1610, a processor module 1615, a one-time PIN (OTP) module 1620, a reporting module 1625, a customer transactions records 945-*b*, a customer ID records 950-*b*, and an authentication rule records 955-*b*, which each may be in communication, directly or indirectly, with each other. The communications module 1610 may be configured to communicate via one or more communications to transmit and receive various information for transaction processing. The transaction request module 935-*b* and/or the authentication module 1605 may be configured to receive the transaction request including the parameters associated with the transaction and also the identification parameter. The modules 935-*b* and/or 1605 may be configured to query one or more of the customer transaction records 945-*b*, the customer ID records 950-*b*, and/or the authentication rule records 955-*b* to (1) retrieve additional information for the customer associated with the customer identifier code, (2) verify the identity of the customer based on the additional information and the identification parameter, (3) when necessary, determine whether the customer is authorized to engage in the transaction, and (4) establish a transaction identifier code for the transaction that is communicated to the point-of-transaction device 905.

The processor module 1615 includes a memory 1630. The memory 1630 may include random access memory (RAM) and read-only memory (ROM). The memory 1630 may store computer-readable, computer-executable software code containing instructions that are configured to, when executed, cause the processor module 1615 to perform various functions described herein (e.g., transaction processing). Alternatively, the software may not be directly executable by the processor module 1615 but may be configured to cause a computer (e.g., when compiled and executed) to perform functions described herein. The processor module 1615 may include an intelligent hardware device, e.g., a central processing unit (CPU), a microcontroller, an application specific integrated circuit (ASIC), etc.

The OTP module 1620 may be configured to establish a temporary identification code to be communicated to the customer via the communications module 1610, for example, and then determine whether a confirmation signal received from the point-of-transaction device 905 accurately reflects the temporary identification code. That is, as previously discussed, another factor of identity confirmation may include sending a temporary identification code to the customer using contact information retrieved from the customer ID records 950-*b* and associated with the customer identifier code. The customer, who is located with the user and/or the point-of-transaction device 905 may then provide the temporary identification code to be communicated back to the transaction information server 910-*g*. The OTP module 1620 is configured to receive the confirmation signal from the point-of-transaction device 905 and determine whether the correct temporary identification code has been returned. If so, the OTP module 1620 may communicate such confirmation to the transaction request module 935-*b* and/or the authentication module 1605. The modules 935-*b* and/or 1605, based on the received confirmation, may then determine that the identity of the customer has been verified.

The reporting module 1625 may be configured to query one or more of the records 945-*b*, 950-*b*, and/or 955-*b* to retrieve information related to particular transactions and/or customers. The reporting module 1625 may establish one or more reports utilizing such information and provide the reports for viewing, downloading, printing, etc. According to certain embodiments, a remote user (e.g., the transaction authority 915 and/or the approving authority 960) may access the reports module 1625 of the transaction information server 910-*g* via a series of one or more web pages presented via a web browser in order to customize, generate, and/or otherwise view the reports. Exemplary reports that the reports module 1625 can provide include, but are not limited to, a report of every transaction a given customer has engaged in, a report of every transaction for a given transaction type, a report of every transactions associated with a given point-of-transaction device 905, a report of every transaction that has been denied as a result of violation of one or more of the authentication rule records 955-*b*, etc. Further, the reports can be based on one or more predetermined time periods.

The components of the transaction information servers 910 may be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors. Each of the noted modules may be a means for performing one or more functions related to operation of the transaction information servers 910.

FIG. 17 a block diagram 1630 of an example point-of-transaction device 905-*e* for transaction processing in accordance with various embodiments of the present disclosure. The point-of-transaction device 905-*e* may implement aspects and/or components of the point-of-transaction devices 905 of FIGS. 1-5 as well as implementing aspects of communication flows 1000, 1100, 1200, and/or 1300. Aspects of the point-of-transaction device 910-*e* may be implemented by one or more processors.

Point-of-transaction device 905-*e* includes a transaction request module 1635, a transaction ID module 1640, a communications module 1645, and a transaction request records 1650. The communications module 1645 may be configured to operatively communicate via one or more communications channels. The communications channels may be wired, wireless, or combinations of wired and wireless. Exemplary communications channels include a cellular communications network, a wireless local area network (e.g., WiFi) communications network, a series of interconnected computers, etc. According to certain embodiments, the communications module 1645 is configured to operatively communicate with the transaction information server 910 and/or a transaction authority 915.

The transaction request module 1635 may be configured to receive the certain parameters associated with a transaction. For instance, the transaction request module may be configured to receive a transaction amount, a customer identifier code, and/or an identification parameter captured from a customer contemporaneously with the transaction. According to some embodiments, the user 925 and/or the customer 925 may enter the transaction parameters into the point-of-transaction device 905-*e*. Other aspects may provide for the point-of-transaction device 905-*e* to be configured to permit scanning an electro-magnetic stripe of a card to enter some of the transaction parameters. The transaction request module 1635 may be configured to communicate the transaction request (via the communications module 1645) to the transaction information server 910. For instance, the transaction request may form one or more data packets forming the transaction request in a manner that is retrievable by the transaction information server 910.

The transaction ID module 1640 may be configured to receive the transaction identifier code. As previously discussed, the transaction information server 910 may retrieve information from the customer ID records 950 that is associated with the customer identifier code, authenticate the identity of the customer based on the customer information and the identification parameter, and establish a transaction identifier code that is communicated to the point-of-transaction device 905-*e*. The transaction ID module 1640 may be configured to receive the transaction identifier code, transmit the transaction identifier code to the transaction authority, and receive an approval for the transaction from the transaction authority based on the transaction identifier code and the request.

The transaction request records 1650 may include electronic information stored by the point-of-transaction device 905-*e* that is associated with different transaction types, with different transaction parameters, etc. In some embodiments, the transaction request module 1635 receives the transaction parameters and queries the transaction request records 1650 to determine aspects of the information that is to be included in the transaction request. For example, the transaction request records 1650 may include information indicating what transaction parameters to include in the transaction request based on the transaction type, the transaction amount, etc.

FIG. 18 is a block diagram 1700 of another example point-of-transaction device 905-*f* for transaction processing in accordance with various embodiments of the present disclosure. The point-of-transaction device 905-*f* may implement aspects and/or components of the point-of-transaction devices 905 of FIG. 9-14 or 18 as well as implementing aspects of communication flows 1000, 1100, 1200, and/or 1300. Aspects of the point-of-transaction device 910-*f* may be a processor.

The point-of-transaction device 905-*f* includes a transaction request module 905-*a*, a transaction ID module 1610-*a*, a communications module 1615-*a*, a processor module 1705 having memory 1710, an ID parameter capture module 1715, a temporary ID module 1720, a customer ID records 1725, a transaction request records 1620-*a* and an authentication rule records 1730. The communications module 1615-*a* may be configured to permit the point-of-transaction device 905-*f* to operatively communicate via one or more communications channels with the transaction information server 910 and/or the transaction authority 915. The communications channels may be wired, wireless, or combinations of wired and wireless.

The transaction request module 1605-*a* is configured to receive the parameters associated with a transaction, e.g., the transaction amount, the customer identifier code, and/or an identification parameter captured from a customer contemporaneously with the transaction. The transaction request module 1605-*a* may be configured to communicate the transaction request (via the communications module 1615-*a*) to the transaction information server 910. The transaction ID module 1610-*a* may receive the transaction identifier code from the transaction information server 910 and determine whether the transaction is to be approved or denied.

The processor module 1705 includes memory 1710. The memory 1710 may include random access memory (RAM) and read-only memory (ROM). The memory 1710 may store computer-readable, computer-executable software code containing instructions that are configured to, when executed, cause the processor module 1705 to perform various functions described herein (e.g., transaction processing). Alternatively, the software may not be directly executable by the processor module 1705 but may be configured to cause a computer (e.g., when compiled and executed) to perform functions described herein. The processor module 1705 may include an intelligent hardware device, e.g., a central processing unit (CPU), a microcontroller, an application specific integrated circuit (ASIC), etc.

The ID parameter capture module 1715 may be configured to capture the identification parameter contemporaneous to the transaction. According to some embodiments, the ID parameter capture module 1715 may be in operative communication with one or more of an image capture device, a biometric capture device, and the like, either integral to the point-of-transaction device 905-*f* or as a peripheral component. The ID parameter capture module 1715 may be configured to capture the identification parameter using one or more of said components and store information indicative of the captured data. Other aspects may provide for the ID parameter capture module 1715 to be configured to capture an image of an identification card provided by the customer during the transaction. As can be appreciated, the captured identification parameter may be included in the transaction request and utilized by the transaction information server 910 to confirm the identity of the customer.

The temporary ID module 1720 may be configured to receive the temporary identification code from the customer during the transaction and communicate a confirmation signal to the transaction information server 910 indicating receipt of the code. According to certain embodiments, the temporary ID module 1720 may communicate the temporary identification code back to the transaction information server 910. The transaction request records 1725 may include electronic information being stored that is associated with different transaction types, for example. In some embodiments, the transaction request module 1605-*a* receives the transaction parameters and queries the transaction request records 1620-*a* to determine aspects of the information that is to be included in the transaction request.

According to certain embodiments, certain aspects of the functionality of the transaction information server 910 may be incorporated into the point-of-transaction device 905-*f* For instance, the customer ID records 1725 and the authentication rule records 1730 may be included in the point-of-transaction device 905-*f*. The customer ID records 1725 may be queried by the transaction request module upon receipt of identifying information from the customer to retrieve additional information associated with that customer. For instance, the customerⓈ name may be provided where the customer ID records 1725 is queried to retrieve that customerⓈ address, telephone number, e-mail address, etc. The point-of-transaction device 905-*f* may use some of all of this retrieved information associated with the customer as the customer identifier code that is communicated to the transaction information server 110 in the transaction request.

According to even further embodiments, the transaction request module 1605-*a* may, to a certain extent, query the authentication rule records to determine if the customer is authorized to engage in the transaction. For example, the authentication rule records 1730 may include stored information relating to the transaction types that can be processed using the point-of-transaction device 905-*f* If the user and/or customer attempts to process a transaction type that is forbidden, the transaction request module 1605-*a* may query the authentication rule records 1730, determine that type of transaction type is forbidden, and reject the transaction.

FIG. 18 is a flowchart of a method 1800 for transaction processing in accordance with aspects of the present disclosure. Aspects of the method 1800 may be performed by one or more of the devices 905, 910, 915, and/or 960 of FIGS. 1-9. Similarly, the method 1800 may implement aspects of the communication flows 1000, 1100, 1200, and/or 1300. In one implementation, the processor module 715 of the transaction information server 910 may execute one or more sets of codes or computer executable instructions to control the functional elements of the transaction information server 910 to perform the functions described below. In another implementation, the processor module 1605 of the point-of-transaction device 905 may execute one or more sets of codes or computer executable instructions to control the functional elements of the point-of-transaction device 905 to perform the functions described below. At block 1805, a transaction information server 910 receives a request for a transaction from a point-of-transaction device 905. The transaction request may include a transaction amount, a customer identifier code, and an identification parameter that is collected from a party to the transaction contemporaneous to the transaction.

At block 1810, the transaction information server 910 authenticates the identification parameter based on a record associated with the customer identifier code. The record may be stored in the customer ID records 950 of the transaction information server 910. According to some embodiments, the record stored in the customer ID records 950 may include additional identification parameters where the transaction information server 910 compares the identification parameters to authenticate the identity of the customer. At block 1815, the transaction information server 910, based on authenticating the identity of the customer, communicates with a transaction authority to establish a transaction identifier code for the transaction. At block 1820, the transaction information server 900 transmits the transaction identifier code to the point-of-transaction device 905 based on the authentication of the identification parameter.

FIG. 20 is a flowchart of a method 1900 for transaction processing in accordance with aspects of the present disclosure. Aspects of the method 1900 may be performed by one or more of the devices 905, 910, 915, and/or 960 of FIGS. 9-19. Similarly, the method 900 may implement aspects of the communication flows 1000, 1100, 1200, and/or 1300. In one implementation, the processor module 1605 of the point-of-transaction device 905 may execute one or more sets of codes or computer executable instructions to control the functional elements of the point-of-transaction device 905 to perform the functions described below. At block 1905, the method 1900 begins where a point-of-transaction device 905 transmits a request for a transaction to a transaction information server 910. The transaction request may include a transaction amount, a customer identifier code, and an identification parameter that is collected from a party to the transaction contemporaneous to the transaction.

At block 1910, the point-of-transaction device 905 receives a transaction identifier code from the transaction information server 910. The transaction identifier code indicates that the identity of the customer has been verified and that the customer identity has been tied to the transaction. At block 1915, the point-of-transaction device 905 transmits the transaction identifier code and at least a portion of the transaction request to the transaction authority 115. The transaction authority 915 is separate from the transaction information server 110, as illustrated above. At block 1920, the point-of-transaction device 905 receives an approval of the transaction from the transaction authority 915. The transaction authority 915 approves the transaction based on the transaction identifier code and the transaction request.

A device structure 2000 that may be used for a point-of-transaction device 905, a transaction information server 910, a transaction authority 915, or other computing devices described herein, is illustrated with the schematic diagram of FIG. 20. This drawing broadly illustrates how individual system elements of each of the aforementioned devices may be implemented, whether in a separated or more integrated manner. The exemplary structure is shown comprised of hardware elements that are electrically coupled via bus 2005, including processor(s) 2010 (which may further comprise a DSP or special-purpose processor), storage device(s) 2015, input device(s) 2020, and output device(s) 2025. The storage device(s) 2015 may be a machine-readable storage media reader connected to any machine-readable storage medium, the combination comprehensively representing remote, local, fixed, or removable storage devices or storage media for temporarily or more permanently containing computer-readable information. The communications systems interface 2045 may interface to a wired, wireless, or other type of interfacing connection that permits data to be exchanged with other devices. The communications system(s) interface 2045 may permit data to be exchanged with a network.

The structure 1900 may also include additional software elements, shown as being currently located within working memory 2030, including an operating system 2035 and other code 2040, such as programs or applications designed to implement methods of the invention. It will be apparent to those skilled in the art that substantial variations may be used in accordance with specific requirements. For example, customized hardware might also be used, or particular elements might be implemented in hardware, software (including portable software, such as applets), or both.

FIG. 22 illustrates an example system 2100 configured for conducting secured point-of-sale transactions according to embodiments of the present disclosure. The system 2100 includes a point-of-transaction device(s) 2105 acting as a point of sale device, a transaction security server 2110, and a third party 2115. Each of these components may be in communication, directly or indirectly, via one or more of a wired and/or a wireless communications channel.

In the example of FIG. 22, the point-of-transaction device 2105 is located proximate a customer 2120 and/or a user 2125. For example, the point-of-transaction device 2105 may be located in a business establishment operated by the user 2125. Generally, the point-of-transaction device 2105 may be configured to permit the user 2125 to input, capture, transmit, and/or receive selections related to the establishment of security rules as well as additional parameters related to the transaction. For instance, the point-of-transaction device 2105 may be configured to permit the user to input, capture, or otherwise receive selections of a transaction type, a selection of a triggering transaction amount, and/or a selection of at least one transaction parameter. The point-of-transaction device may also be configured to store a security rule that associates the at least one transaction parameter with the selected transaction type and the selected triggering transaction amount.

The transaction type may include information or data indicative of whether the transaction is a cash-based transaction, a card-based transaction (e.g., where the customer is paying using a credit or debit card), an exchange of goods or services transaction, or another transaction type. The triggering transaction amount may include information or data indicative of the monetary amount involved in the transaction (e.g., the dollar amount) or some other information indicative of the item/service being exchanged during the transaction. A transaction does not necessarily involve the exchange of monetary funds. According to one example, the transaction may be for the distribution of items to individuals. In that example, the transaction amount may refer to the quantity of items being distributed to the customer 2120. Accordingly, the triggering transaction amount may include information or data indicative of the amount or worth of the items/services being exchanged in the transaction. The at least one transaction parameter may include information or data indicative of an action or response that is to be initiated for a given transaction type and/or triggering transaction amount. For example, the at least one transaction parameter may include information requiring capture of a signature of the customer, capturing an image of the customer, capturing biometric data from the customer, capturing an image of an identification card from the customer, and the like.

Accordingly, the user 2125 can utilize the point-of-transaction device 2105 to establish a wide variety of security rules to be applied to differing transactions. As one example, the user can select applicable transaction parameters to establish a security rule where an image of the customer is captured for every cash-based transaction, regardless of the transaction amount. As another example, the user can select applicable transaction parameters to establish security rules where the at least one transaction parameter captured from the customer becomes progressively more restrictive as the triggering transaction amount increases. As an even further example, the user can select applicable transaction parameters to establish a security rule where biometric data is captured from the customer during the transaction, communicated to the transaction security server for verification, and a confirmation signal is received from the transaction security server before approving the transaction. Other security rules can be selected and established based on the needs of the user 2125, legal requirements, developing business practices, and the like. As can be appreciated, the user 2125 can establish a wide variety of differing security rules that vary based on the selection of, for example, the type of transaction, the value involved in the transaction, developing industry standards, and the like. As can be further appreciated, the user 2125 can dynamically edit, delete, or establish security rules dependent on varying business or social conditions. Thus, the user 2125 is provided a great deal of flexibility to establish security rules that favor the prevention of fraud, theft, and the like.

The point-of-transaction device 905 may also be configured to permit the user 2125 to input or capture an identification parameter from the customer. The identification parameter may be included as a part of the transaction request and be collected from the customer 2120 as a part of the transaction. The identification parameter may identify the customer that is a party to the transaction. As indicated by the dashed line, certain embodiments permit the customer 2120 to input some of the parameters associated with the transaction into the point-of-transaction device 2105. The identification parameter may be any information captured from the customer 2120 during the transaction. For example, the point-of-transaction device 2105 may be configured to capture an image, a voice print, a fingerprint, or any other form of biometric data from the customer 2120 contemporaneous to the transaction. Also, or alternatively, the point-of-transaction device 2105 may be configured to capture an image of an identification card provided by the customer 2120 as proof of identity, e.g., an image of the customer 2120 drivers license, government issued identification card, etc.

Once the user 2125 has established the security rules, the point-of-transaction device 2105 may be configured to, as the user 2125 and/or customer 2120 enters parameters associated with the transaction, determine which of the security rule(s) established by the user 2125 applies to that transaction and prompt the user 2125 and/or customer 2120 for the appropriate compliance measures. As one example, if a security rule input by the user 2125 requires an image of the customer for cash-based transactions over $100.00, once the point-of-transaction device 2105 determines that the transaction is a cash-based transaction for an amount in excess of the triggering transaction amount, the point-of-transaction device 2105 may prompt the user 2125 and/or customer 2120 to capture an image of the customer 2120 before proceeding with the transaction. Once the image of the customer 2120 has been captured, the point-of-transaction device 905 may be configured to permit the user 2125 to finalize the transaction.

Furthermore, the point-of-transaction device 2105 is communicatively coupled to the transaction security server 2110 via one or more of a wired and/or a wireless communication channel. For instance, the point-of-transaction device 2105 may communicate the security rule to the transaction security server 2110 and also communicate the request for the transaction to the transaction security server 2110 via at least one of the communications channels.

The transaction security server 2110 may include a transaction request module 2135, a reporting module 2140, a transaction security configuration records 2145, transaction parameters records 1450, and authentication rule records 2155. Each of these components may be communicatively coupled via, for example, a common bus or other communications channel. The transaction security server 2110 may be communicatively coupled with a number of point-of-transaction devices 2105 (only one being shown in FIG. 21 for clarity) and the third party 2115. Broadly, the transaction security server 2110 may be configured to receive the security rules and the transaction request from the point-of-transaction device 2105, store the security rule in the security configuration records 2145, authenticate or otherwise confirm the identity of the customer based on the identification parameter, determine whether the transaction request complies with the applicable security rule, and return confirmation signal to the point-of-transaction device 2105. The transaction security server 2110 may be implemented by a single server device or by a number of related components interconnected over a network.

The transaction security configuration records 2145 may be electronic records stored in memory and including information related to one or more security rules for each of the point-of-transaction devices 2105. As one example, the transaction security configuration records 2145 may include information relating to different security rules for each point-of-transaction device 2105 and/or a set of security rules that are applicable to a plurality of point-of-transaction devices 2105. Thus, the transaction security configuration records 2145 may store the security rules established by the user 2125 at the point-of-transaction device 2105.

The transaction parameter records 2150 may be electronic records stored in memory and including information related to a plurality of transaction parameters. These transaction parameters may include data identifying the customer 2120 associated with a transaction request. Examples of transaction parameters include, but are not limited to, one or more images of the customer, other biometric information related to the customer 2120 (e.g., facial recognition data, fingerprint data, retinal scan data, etc.), images of identification documents of the customer 2120 (e.g., drivers license images, proof of address images, etc.), or other information related to the customer 2120 associated with the transaction. One or more security rules stored in the transaction security configuration records 2145 may be established for a transaction or transaction type, and may specify one or more transaction parameters that are to accompany a valid transaction request. As transaction requests are received at the transaction security server 2110, the transaction parameters received with the transaction requests may be stored in the transaction parameters records 2150 and indexed according to customer identifier codes.

For example, a security rule may specify that, for a given transaction type and/or amount, an image of the customer and/or an image of the customer identification card must accompany the transaction request. In this example, the transaction request may further include a customer identifier code. Using the customer identifier code, the transaction security server 2110 may query the transaction parameters records 2150 to retrieve an address, telephone number, date of birth, etc, for the customer 2120, as well as a previously captured image of the customer. These previously stored transaction parameters, in conjunction with the new transaction parameter(s) provided with the transaction request (i.e., an image of the customer 2120 taken in connection with the current transaction) may be used to authenticating the customer and approve the transaction.

According to further embodiments, when the transaction parameters records 2150 do not have a record stored for a customer 2120 identified in a transaction request, the transaction security server 2110 may be configured to create and store a record for that customer 2120 as a part of an initial registration process (e.g., during the first transaction conducted with a given customer identification code).

The authentication rule records 2155 may be electronic records stored in memory and including information related to predetermined rules for given transactions. Generally, it can be appreciated that restrictions exist relating to certain transaction types, amount, frequency, etc. For example, certain rules may prohibit or control the transfer of currency, or a predetermined amount of currency, in to or out of a particular geographic region. Other rules may prohibit or control the ability of certain customers 2120 to participate in some transactions (e.g., prohibit a convicted felon from purchasing a gun). Even further, some rules may limit the frequency of transactions for a particular customer 2120 within a given time period (e.g., the number of times a customer 2120 may be distributed certain items or provisions). The authentication rule records 2155 include information relating to such transaction rules which can be utilized for each transaction as an additional form of transaction security and fraud prevention.

Each of the records 2145, 2150, and/or 2155 may be stored in memory, in one or more database(s), etc., either locally or remotely from the transaction information system 2100.

The transaction request module 2135 may include logic, hardware, and the like to receive the security rule and store the security rule, associated with the point-of-transaction device 2105, in the transaction security configuration records 2145. The transaction request module 2135 may also receive the transaction request from the point-of-transaction device 2105 and access the transaction security configuration to retrieve the security rule associated with the point-of-transaction device 2105 as well as the applicable at least one transaction parameter. According to some embodiments, the transaction request module 2135 may compare certain of the retrieved information with the information contained in the transaction request to confirm that the transaction request complies with the security rule. For instance, if the transaction amount at least meets the triggering transaction amount from the security rule and the at least one transaction parameter requires an identification parameter that is an image of the customer that is to be verified, the transaction request module 2135 may retrieve an image associated with the customer from the transaction parameters records 2150 and compare the images to confirm the customer identity and, thus, that the transaction request complies with the security rule. Other aspects may provide for the confirmation based on fingerprint comparison. If the transaction request module 2135 cannot confirm the identity of the customer, the transaction request module 2135 may reject that transaction or flag the transaction for manual review for identity confirmation.

As discussed, some embodiments may provide for the transaction request module 2135 to access records from the authentication rule records 2155 to determine whether the customer 2120 is authorized to engage in the transaction. As one example, if the transaction parameters records 2150 indicate that the customer 2120 has engaged in similar transaction types within a predetermined time period and the authentication rules records 2155 indicate that a given customer is only permitted to engage in that type of transaction a predetermined number of times within the time period, the transaction request module 2135 may determine that the customer 2120, even though their identity has been confirmed, is rejected for that transaction.

Other embodiments may provide for the transaction security server 2110 to communicate with the third party 2115 to confirm the identity of the customer 2120. That is, the transaction request module 2135 may communicate information associated with the customer 2120 along with the identification parameter to the third party 2115. According to some embodiments, the third party 2115 accesses the information on the transaction security server 2110 via a series of web pages, for example, to confirm the identity of the customer 2120. The third party 1460 may review the information and, in some instances, additional information maintained by the third party 2115, to confirm the identity of the customer 2120.

Once the identity of the customer 2120 has been confirmed and, when applicable, the customer 2120 has been determined eligible for the transaction, the transaction security server 2110 communicates a confirmation signal to the point-of-transaction device 2105.

The reporting module 2140 may be configured to generate one or more reports relating to the records stored by the transaction security server 2110. Exemplary reports may be for a particular customer 2120, for a particular user 2125, for a particular transaction type, for a particular transaction security rule, may be based on one or more predetermined time periods, and the like. In other embodiments the reporting module 2140 is configured to dynamically generate custom reports or store one or more predefined reports that can be retrieved. The transaction security server 2110 may communicate the reports to, for example, the third party 2115, the user 2125, and/or the customer 2120. Other aspects provide for the transaction security server 2110 to make the reports available via a series of one or more web pages accessible using a web browser.

These components may, individually or collectively, be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs) and other Semi-Custom ICs), which may be programmed in any manner known in the art. The functions of each unit may also be implemented, in whole or in part, with instructions embodied in a memory, formatted to be executed by one or more general or application-specific processors.

It should be noted that the methods, systems and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Moreover, as disclosed herein, the term "memory" or "memory unit" may represent one or more devices for storing data, including read-only memory (ROM), random access memory (RAM), magnetic RAM, core memory, magnetic disk storage mediums, optical storage mediums, flash memory devices or other computer-readable mediums for storing information. The term "computer-readable medium" includes, but is not limited to, portable or fixed storage devices, optical storage devices, wireless channels, a SIM card, other smart cards, and various other mediums capable of storing, containing or carrying instructions or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A method that more accurately detects passive liveness using a plurality of convolutional neural networks and concatenating, the method comprising:

receiving, by a computing device, an input image, wherein the input image comprises a facial portion and a first background portion;

generating, based on the input image, a cropped image, wherein the cropped image comprises the facial portion and a second background portion that is a subset of the first background portion;

generating, based on the input image and via a first convolutional neural network, a first image embedding, wherein the first convolutional neural network comprises an average pooling layer, a fully connected layer, and a plurality of depthwise convolutional layers, and wherein the first convolutional neural network comprises a first plurality of layers and a first plurality of input channels, wherein each input channel of the first plurality of input channels corresponds to a layer of the first plurality of layers;

generating, based on the cropped image and via a second convolutional neural network, a second image embedding, wherein the second convolutional neural network comprises a second plurality of input channels, wherein each input channel of the second plurality of input channels is determined by reducing a corresponding input channel of the first plurality of input channels;

concatenating the first image embedding and the second image embedding;

generating, via the concatenation of the first image embedding and the second image embedding, a combined embedding;

after the concatenating, generating, based on the combined embedding, output indicating whether the facial portion corresponds to a live person, wherein the output more accurately detects liveness than when the concatenating step is omitted; and denying, based on the output indicating whether the facial portion corresponds to the live person, access to a computer system.

2. The method of claim 1, wherein a first width parameter corresponding to input channels of the first convolutional neural network is greater than a second width parameter corresponding to input channels of the second convolutional neural network.

3. The method of claim 1, wherein the generating the cropped image comprises:

removing, from the input image, pixels corresponding to the second background portion.

4. The method of claim 1, further comprising:

training, based on a first plurality of images and a second plurality of cropped images, the first convolutional neural network and the second convolutional neural network, to output information that indicates liveness of each person in the first plurality of images.

5. The method of claim 1, further comprising:

receiving an additional image for liveness detection, wherein the additional image comprises a person; and determining, based on facial features of the person, that the additional image is not suitable for liveness detection.

6. The method of claim 1, wherein the generating, based on the first image embedding and the second image embedding, output comprises generating the output via a sigmoid function.

7. A method comprising:

generating, by a computing device and via a camera, a plurality of images, wherein each image of the plurality of images indicates a same person with a background, and wherein each image of the plurality of images is generated within a threshold time of each other;

generating, via a first convolutional neural network and based on the plurality of images, a first image embedding, wherein the first convolutional neural network comprises an average pooling layer and a fully connected layer, and wherein the first convolutional neural network comprises a first plurality of layers and a first plurality of input channels, wherein each input channel of the first plurality of input channels corresponds to a layer of the first plurality of layers;

cropping each image of the plurality of images by removing a portion of the background;

generating, via a second convolutional neural network and based on the plurality of cropped images, a second image embedding, wherein the second convolutional neural network comprises a second plurality of input channels, wherein each input channel of the second plurality of input channels is determined by reducing a corresponding input channel of the first plurality of input channels;

concatenating the first image embedding and the second image embedding to generate a combined embedding;

generating, based on the combined embedding, an output value that more accurately detects liveness of the same person in the plurality of images than when the concatenating step is omitted; and granting, to a user device and based on the output value, access to a computing system.

8. The method of claim 7, wherein the first convolutional neural network comprises a recurrent convolutional neural network.

9. The method of claim 7, wherein the by removing the portion of the background comprises removing one or more pixels corresponding to a background portion of a first image of the plurality of images.

10. The method of claim 7, further comprising:

training, based on the plurality of images and the plurality of cropped images, the first and second convolutional neural networks, to output information that indicates the liveness of the same person.

11. The method of claim 7, further comprising:

receiving an additional image for liveness detection, wherein the additional image comprises a person; and determining, based on facial features of the person, that the additional image is not suitable for liveness detection.

12. The method of claim 7, wherein the generating the output value comprises generating the output value via a sigmoid function.

13. A method comprising:

receiving, by a computing device, an input image, wherein the input image comprises a facial portion and a first background portion;

generating, based on the input image, a cropped image, wherein the cropped image comprises a subset of pixels of the input image;

generating, based on the input image and via a first convolutional neural network, a first image embedding, wherein the first convolutional neural network comprises a first plurality of layers and a first plurality of input channels, wherein each input channel of the first plurality of input channels corresponds to a layer of the first plurality of layers;

generating, based on the cropped image and via a second convolutional neural network, a second image embedding, wherein the second convolutional neural network comprises a second plurality of input channels, wherein each input channel of the second plurality of input channels is determined by reducing a corresponding input channel of the first plurality of input channels;

concatenating the first image embedding and the second image embedding;

generating, via the concatenation, a combined embedding;

generating, based on the combined embedding, output indicating whether the facial portion corresponds to a live person, wherein the output more accurately detects liveness than when the concatenating step is omitted; and denying, based on the output indicating whether the facial portion corresponds to the live person, access to a computer system.

14. The method of claim 13, further comprising:

training, based on the input image and the cropped image, the first convolutional neural network and the second convolutional neural network, to output information that indicates liveness of the live person in the input image.

15. The method of claim 13, further comprising:

receiving an additional image for liveness detection, wherein the additional image indicates a person; and determining, based on facial features of the person, that the additional image is not suitable for liveness detection.

16. The method of claim 13, wherein the generating the output comprises generating the output via a sigmoid function, and the method further comprising: granting, based on the output, access to the computer system.

* * * * *